US012809346B2

(12) United States Patent
Quigley et al.

(10) Patent No.: US 12,809,346 B2
(45) Date of Patent: Nov. 24, 2026

(54) LANDFILL GAS EMISSIONS MONITORING AND CONTROL

(71) Applicant: Loci Controls, Inc., Wareham, MA (US)

(72) Inventors: Peter Quigley, Duxbury, MA (US); Melinda Sims, Seattle, WA (US); Christopher Makselon, West Simsbury, CT (US)

(73) Assignee: Loci Controls, Inc., Wareham, MA (US)

( * ) Notice: Subject to any disclaimer, the term of this patent is extended or adjusted under 35 U.S.C. 154(b) by 314 days.

(21) Appl. No.: 18/540,407

(22) Filed: Dec. 14, 2023

(65) Prior Publication Data

US 2024/0201662 A1 Jun. 20, 2024

Related U.S. Application Data

(60) Provisional application No. 63/456,355, filed on Mar. 31, 2023, provisional application No. 63/387,869, filed on Dec. 16, 2022.

(51) Int. Cl.
*G05B 19/416* (2006.01)
*G01M 3/04* (2006.01)

(52) U.S. Cl.
CPC ............. *G05B 19/416* (2013.01); *G01M 3/04* (2013.01); *G05B 2219/41108* (2013.01)

(58) Field of Classification Search
None
See application file for complete search history.

(56) References Cited

U.S. PATENT DOCUMENTS 3,062,037 A 11/1962 Donner et al.
3,567,387 A 3/1971 Jones
(Continued)

FOREIGN PATENT DOCUMENTS

CA 2955844 C 8/2019
EP 0 743 515 A1 11/1996
(Continued)

OTHER PUBLICATIONS

Figueroa et al, "A Robust Method for Estimating Landfill Methane Emissions", 2009, J. Air & Waste Manage. Assoc., pp. 59:925-935 (Year: 2009).*
(Continued)

*Primary Examiner* — David Earl Ogg
(74) *Attorney, Agent, or Firm* — Wolf, Greenfield & Sacks, P.C.

(57) ABSTRACT

There is provided techniques for determining an estimate of gas emissions in a landfill. Some techniques provide for obtaining a plurality of measures and determining an estimate of methane emissions by using a gas emissions model to process the plurality of measures, and outputting the estimate of methane emissions. The plurality of measures may include emissions measurements such as methane emissions and/or measures of at least one environmental characteristic such as wind speed and/or direction, turbulence, and/or atmospheric stability. The estimate of gas emissions may be displayed and/or used to determine whether to cause a corrective action to be performed, such as adjusting a flow rate of landfill gas being extracted from the landfill.

20 Claims, 22 Drawing Sheets

(56) References Cited

U.S. PATENT DOCUMENTS

| | | | |
|---|---|---|---|
| 4,026,355 | A | 5/1977 | Johnson et al. |
| 4,191,541 | A | 3/1980 | Jenkins |
| 4,227,897 | A | 10/1980 | Reed |
| 4,494,380 | A | 1/1985 | Cross |
| 4,499,378 | A | 2/1985 | Miyatake et al. |
| 4,670,148 | A | 6/1987 | Schneider |
| 4,890,672 | A | 1/1990 | Hall |
| 5,063,519 | A | 11/1991 | Zison |
| 5,209,941 | A | 5/1993 | Wuest |
| 5,223,229 | A | 6/1993 | Brucker |
| 5,451,249 | A | 9/1995 | Spiegel et al. |
| 5,458,006 | A | 10/1995 | Roqueta |
| 5,665,314 | A | 9/1997 | Berger et al. |
| 5,681,360 | A | 10/1997 | Siwajek et al. |
| 5,695,641 | A | 12/1997 | Cosulich et al. |
| 5,830,262 | A | 11/1998 | Marchini et al. |
| 6,169,962 | B1 | 1/2001 | Brookshire et al. |
| 6,196,324 | B1 | 3/2001 | Giacomino et al. |
| 6,241,950 | B1 | 6/2001 | Veelenturf et al. |
| 6,399,391 | B1 | 6/2002 | Tomlin |
| 6,591,695 | B1 | 7/2003 | Brookshire et al. |
| 6,595,287 | B2 | 7/2003 | Fisher |
| 6,611,760 | B2 | 8/2003 | Bentley et al. |
| 6,749,368 | B2 | 6/2004 | Ankeny et al. |
| 6,799,477 | B2 | 10/2004 | Brookshire et al. |
| 6,999,883 | B1 | 2/2006 | Brady et al. |
| 7,187,299 | B2 | 3/2007 | Kunerth et al. |
| 7,198,433 | B2 | 4/2007 | Augenstein et al. |
| 7,243,730 | B2 | 7/2007 | Casey |
| 7,273,098 | B2 | 9/2007 | Evans et al. |
| 7,373,976 | B2 | 5/2008 | Casey |
| 7,387,163 | B2 | 6/2008 | Seegers et al. |
| 7,448,828 | B2 | 11/2008 | Augenstein et al. |
| 7,748,450 | B2 | 7/2010 | Mundell |
| 7,866,921 | B2 | 1/2011 | Stamoulis |
| 7,950,464 | B2 | 5/2011 | Atencio et al. |
| 7,972,082 | B2 | 7/2011 | Augenstein et al. |
| 8,047,276 | B2 | 11/2011 | Stamoulis |
| 8,168,121 | B2 | 5/2012 | Elkins |
| 8,186,211 | B2 | 5/2012 | Boult et al. |
| 8,840,708 | B1 | 9/2014 | Morrow et al. |
| 8,924,029 | B2 | 12/2014 | Nath et al. |
| 9,062,536 | B2 | 6/2015 | Fischer et al. |
| 10,029,290 | B2 | 7/2018 | Campanella et al. |
| 10,400,560 | B2 | 9/2019 | Campanella et al. |
| 10,408,747 | B2 | 9/2019 | Schlueter et al. |
| 10,449,578 | B2 | 10/2019 | Campanella et al. |
| 10,556,259 | B2 | 2/2020 | Campanella et al. |
| 10,576,514 | B2 | 3/2020 | Campanella et al. |
| 10,576,515 | B2 | 3/2020 | Campanella et al. |
| 10,639,687 | B2 | 5/2020 | Campanella et al. |
| 10,705,063 | B2 | 7/2020 | Campanella et al. |
| 10,882,086 | B2 | 1/2021 | Quigley et al. |
| 10,946,420 | B2 | 3/2021 | Quigley et al. |
| 11,007,555 | B2 | 5/2021 | Campanella et al. |
| 11,067,549 | B2 | 7/2021 | Campanella et al. |
| 11,072,006 | B2 | 7/2021 | Campanella et al. |
| 11,084,074 | B2 | 8/2021 | Campanella et al. |
| 11,865,594 | B2 | 1/2024 | Quigley et al. |
| 2001/0005812 | A1* | 6/2001 | Brookshire ............... B09B 1/00 702/6 |
| 2002/0101718 | A1 | 8/2002 | Negishi |
| 2003/0000281 | A1 | 1/2003 | Ketler et al. |
| 2004/0055359 | A1 | 3/2004 | Ketler et al. |
| 2004/0121201 | A1 | 6/2004 | Roche et al. |
| 2006/0034664 | A1 | 2/2006 | Augenstein et al. |
| 2006/0251540 | A1 | 11/2006 | Benning et al. |
| 2007/0224085 | A1 | 9/2007 | Tooley |
| 2007/0225923 | A1 | 9/2007 | Tooley |
| 2007/0243023 | A1 | 10/2007 | Augenstein et al. |
| 2008/0011248 | A1 | 1/2008 | Cutlip et al. |
| 2008/0127726 | A1 | 6/2008 | Elkins |
| 2009/0136298 | A1 | 5/2009 | Augenstein et al. |
| 2010/0310733 | A1 | 12/2010 | Hoffman |
| 2011/0061439 | A1 | 3/2011 | Dong et al. |
| 2011/0061874 | A1 | 3/2011 | Stamoulis |
| 2011/0081586 | A1 | 4/2011 | McAlister |
| 2011/0132104 | A1 | 6/2011 | Benson et al. |
| 2011/0198094 | A1 | 8/2011 | Stamoulis |
| 2011/0231099 | A1 | 9/2011 | Elkins |
| 2011/0272420 | A1 | 11/2011 | Landess et al. |
| 2012/0191349 | A1* | 7/2012 | Lenz ................. G01N 33/0075 702/2 |
| 2012/0206715 | A1 | 8/2012 | Laub |
| 2012/0287418 | A1 | 11/2012 | Scherer et al. |
| 2013/0180703 | A1 | 7/2013 | Colby |
| 2013/0193325 | A1 | 8/2013 | Phillips et al. |
| 2013/0247647 | A1 | 9/2013 | Mahoney et al. |
| 2013/0334418 | A1 | 12/2013 | Cowie et al. |
| 2014/0182846 | A1 | 7/2014 | Fischer et al. |
| 2014/0284935 | A1 | 9/2014 | Disbennett et al. |
| 2014/0338878 | A1 | 11/2014 | Tessnow |
| 2015/0000426 | A1 | 1/2015 | Mustang |
| 2015/0226045 | A1 | 8/2015 | Fischer et al. |
| 2015/0275632 | A1 | 10/2015 | Fischer et al. |
| 2015/0330938 | A1 | 11/2015 | Henson et al. |
| 2015/0354032 | A1 | 12/2015 | Yuan et al. |
| 2015/0362468 | A1 | 12/2015 | Gerhold |
| 2016/0011159 | A1 | 1/2016 | Sekiya et al. |
| 2016/0025696 | A1 | 1/2016 | Birks et al. |
| 2016/0033391 | A1 | 2/2016 | Stroganov et al. |
| 2016/0123946 | A1 | 5/2016 | Dufresne |
| 2016/0169826 | A1 | 6/2016 | Youssi et al. |
| 2016/0209133 | A1 | 7/2016 | Hu et al. |
| 2016/0237007 | A1 | 8/2016 | Morrow et al. |
| 2016/0238494 | A1 | 8/2016 | Chrin, II |
| 2016/0247183 | A1 | 8/2016 | Foody |
| 2016/0287870 | A1 | 10/2016 | Yip et al. |
| 2016/0377457 | A1 | 12/2016 | Zhang et al. |
| 2017/0080762 | A1 | 3/2017 | Guinart et al. |
| 2017/0122065 | A1 | 5/2017 | Fischer et al. |
| 2017/0176590 | A1 | 6/2017 | Sharonov et al. |
| 2017/0216891 | A1 | 8/2017 | Campanella et al. |
| 2017/0216892 | A1 | 8/2017 | Campanella et al. |
| 2017/0216893 | A1 | 8/2017 | Campanella et al. |
| 2017/0218730 | A1 | 8/2017 | Campanella et al. |
| 2017/0218731 | A1 | 8/2017 | Campanella et al. |
| 2017/0218732 | A1 | 8/2017 | Campanella et al. |
| 2017/0254196 | A1 | 9/2017 | Campanella et al. |
| 2017/0254787 | A1 | 9/2017 | Campanella et al. |
| 2018/0003572 | A1 | 1/2018 | Garsd et al. |
| 2018/0003684 | A1 | 1/2018 | Kerr |
| 2018/0024202 | A1 | 1/2018 | Erickson et al. |
| 2018/0154408 | A1 | 6/2018 | Ko et al. |
| 2018/0164137 | A1 | 6/2018 | Layher et al. |
| 2018/0171604 | A1 | 6/2018 | Kim et al. |
| 2018/0209248 | A1 | 7/2018 | Patel et al. |
| 2018/0304323 | A1 | 10/2018 | Campanella et al. |
| 2019/0069245 | A1 | 2/2019 | Miller et al. |
| 2019/0232346 | A1 | 8/2019 | Speer et al. |
| 2019/0277119 | A1 | 9/2019 | Campion |
| 2019/0277821 | A1 | 9/2019 | Quigley et al. |
| 2020/0086365 | A1 | 3/2020 | Campanella et al. |
| 2020/0101504 | A1 | 4/2020 | Quigley et al. |
| 2020/0101505 | A1 | 4/2020 | Quigley et al. |
| 2020/0130033 | A1 | 4/2020 | Campanella et al. |
| 2020/0197990 | A1 | 6/2020 | Quigley et al. |
| 2020/0254497 | A1 | 8/2020 | Campanella et al. |
| 2020/0306806 | A1* | 10/2020 | Quigley .................. B09B 1/006 |
| 2020/0306807 | A1 | 10/2020 | Quigley et al. |
| 2021/0046524 | A1 | 2/2021 | Quigley et al. |
| 2021/0062625 | A1 | 3/2021 | Hale et al. |
| 2021/0178436 | A1 | 6/2021 | Quigley et al. |
| 2021/0229142 | A1* | 7/2021 | Quigley .................. B09B 1/006 |
| 2021/0372977 | A1 | 12/2021 | Campanella et al. |
| 2022/0008973 | A1 | 1/2022 | Quigley et al. |
| 2022/0062959 | A1 | 3/2022 | Campanella et al. |
| 2022/0176422 | A1 | 6/2022 | Quigley et al. |

(56) References Cited

U.S. PATENT DOCUMENTS

| | | | | |
|---|---|---|---|---|
| 2023/0176023 | A1* | 6/2023 | Wang | G01N 33/0036 340/632 |
| 2024/0091831 | A1 | 3/2024 | Quigley et al. | |

FOREIGN PATENT DOCUMENTS

| | | | | | |
|---|---|---|---|---|---|
| WO | WO 2006/005014 | A2 | 1/2006 | | |
| WO | WO 2015/072989 | A1 | 5/2015 | | |
| WO | WO 2016/010985 | A1 | 1/2016 | | |
| WO | WO-2018194650 | A1 * | 10/2018 | | E21B 43/12 |
| WO | WO 2020/072457 | A1 | 4/2020 | | |
| WO | WO 2022/056152 | A1 | 3/2022 | | |
| WO | WO 2022/120046 | A1 | 6/2022 | | |

OTHER PUBLICATIONS

Mabunga et al, "Greenhouse Gas Emissions and Groundwater Leachate Leakage Monitoring of Sanitary Landfill", 2019, IEEE, pp. 1-5 (Year: 2019).*

International Search Report and Written Opinion for International Application No. PCT/US2017/020196 mailed Jun. 7, 2017.

Invitation to Pay Additional Fees for International Application No. PCT/US17/28818 mailed Jul. 10, 2017.

International Search Report and Written Opinion for International Application No. PCT/US17/28818 mailed Sep. 8, 2017.

International Search Report and Written Opinion for International Application No. PCT/US2019/020251 mailed May 31, 2019.

Extended European Search Report for European Application No. 17760717.3 dated Oct. 2, 2019.

International Search Report and Written Opinion for International Application No. PCT/US2019/054013 mailed Dec. 4, 2019.

Extended European Search Report for European Application No. 17906368.0 dated Oct. 15, 2020.

International Search Report and Written Opinion for International Application No. PCT/US2021/013850 mailed Jun. 21, 2021.

International Search Report and Written Opinion for International Application No. PCT/US2021/040653 mailed Nov. 26, 2021.

International Search Report and Written Opinion for International Application No. PCT/US2021/061609 mailed Mar. 24, 2022.

International Preliminary Report on Patentability for International Application No. PCT/US2021/061609 mailed Jun. 15, 2023.

[No Author Listed], 50% CH4, 35% CO2, 15% N2. Instrument Depot. 2015. http://www.instrumentdepot.com/50-methane-35-carbon-dioxide-15-nitrogen-c-1_27_472.html [last accessed Sep. 25, 2015].

[No Author Listed], Cloud-Based Wellwatcher Analytics Platform Offers 24/7/365 Visibility on Landfill Gas-Collection Systems. Tech Note. Loci Controls. Nov. 2016. 1 page.

[No Author Listed], Increase Landfill Gas Collection By Up To 30%. Tech Note. Loci Controls. Oct. 2016. 1 page.

[No Author Listed], Loci Controller Combines Active Flow Control With 24/7/365 Real-Time Gas-Composition Analysis to Maximize Landfill Gas Extraction. Tech Note. Loci Controls. Nov. 2016. 1 page.

[No Author Listed], Loci Sentry Utilizes Passive Flow and Gas-Composition Monitoring in Conjunction With Loci Controller and Wellwatcher Analytics to Maximize Landfill Gas Collection. Tech Note. Loci Controls. Nov. 2016. 1 page.

[No Author Listed], Methacontrol® Optimizing landfill gas recovery. Oct. 9, 2013. http://www.veolia.com/en/veolia-group/media/news/methacontrol-r. 1 page.

Bieker et al., Real-Time Production Optimization of Offshore Oil and Gas Production Systems: A Technology Survey. SPE International. 2006. 8 pages.

Collins et al., Web-based monitoring of year-length deployments of autonomous gas sensing platforms on landfill sites. 2011 IEEE Sensors Proceedings. 2011:1620-3.

Fay et al., Remote Real-Time Monitoring of Subsurface Landfill Gas Migration. Sensors. 2011;11(7):6603-29.

Xu et al., Impact of changes in barometric pressure on landfill methane emission. AGU Publications. Jul. 10, 2014. 17 pages.

U.S. Appl. No. 18/517,492, filed Nov. 22, 2023, Quigley et al.

PCT/US2017/020196, Jun. 7, 2017, International Search Report and Written Opinion.

PCT/US17/28818, Jul. 10, 2017, Invitation to Pay Additional Fees.

PCT/US17/28818, Sep. 8, 2017, International Search Report and Written Opinion.

PCT/US2019/020251, May 31, 2019, International Search Report and Written Opinion.

EP 17760717.3, Oct. 2, 2019, Extended European Search Report.

PCT/US2019/054013, Dec. 4, 2019, International Search Report and Written Opinion.

EP 17906368.0, Oct. 15, 2020, Extended European Search Report.

PCT/US2021/040653, Nov. 26, 2021, International Search Report and Written Opinion.

PCT/US2021/013850, Jun. 21, 2021, International Search Report and Written Opinion.

PCT/US2021/061609, Mar. 24, 2022, International Search Report and Written Opinion.

PCT/US2021/061609, Jun. 15, 2023, International Preliminary Report on Patentability.

Quigley et al., Greenhouse Gas Emissions Control. Co-pending U.S. Appl. No. 18/517,492, filed Nov. 22, 2023.

International Search Report and Written Opinion for International Application No. PCT/US2023/084078 mailed Jun. 17, 2024.

Invitation to Pay Additional Fees for International Application No. PCT/US2023/084078 mailed Apr. 26, 2024.

* cited by examiner

LANDFILL GAS EMISSIONS MONITORING AND CONTROL

CROSS-REFERENCE TO RELATED APPLICATIONS

This application claims the benefit of priority under § 119(e) to U.S. Provisional Application Ser. No. 63/387,869 titled "LANDFILL GAS EMISSIONS MONITORING AND CONTROL" and filed on Dec. 16, 2022, and U.S. Provisional Application Ser. No. 63/456,355 titled "LANDFILL GAS EMISSIONS MONITORING AND CONTROL" and filed on Mar. 31, 2023, each of which is incorporated by reference herein in its entirety.

BACKGROUND

Landfills typically produce landfill gas as a result of decomposition processes occurring in the waste, and methane is often a component of this landfill gas. In order to reduce emissions of methane and other contaminants in landfill gas, the landfill sites are typically capped with a layer of cover material and gas extraction systems are installed to pull landfill gas out before it can penetrate the cover layer and escape. At larger sites, these gas extraction systems can consist of a plurality of vertical and horizontal wells drilled into the landfill, which are connected with piping to one or more vacuum sources. The cover layer prevents gas from freely escaping, while the vacuum in the extraction wells pulls landfill gas into the collection system. A conventional landfill gas extraction well typically has a manual valve that adjusts the localized vacuum pressure in that well, as well as a set of ports for sampling the gas characteristics with a portable gas analyzer. Landfill gas is most often disposed of in a flare, processed for direct use, or used to power electricity generation equipment (such as generators or gas turbines).

SUMMARY

According to some aspects there is provided a control system for determining an estimate of gas emissions in a region of a landfill, the region comprising a plurality of gas collection points, each of the plurality of gas collection points comprising a gas extraction well, the control system comprising: at least one controller configured to: obtain a plurality of measures comprising: a first set of one or more measures of concentration of methane in air, each measure of concentration of methane in the first set obtained at a respective location within a threshold distance of one of the plurality of gas collection points; a second set of one or more measures of concentration of methane in air, each measure of concentration of methane in the second set obtained at one of a plurality of locations in the region of the landfill among the plurality of gas collection points; and one or more measures of at least one environmental characteristic obtained at one or more locations within the region of the landfill; determine, by using a gas emissions model to process the plurality of measures, an estimate of methane emissions in the region of the landfill; and output the estimate of methane emissions.

According to some aspects, there is provided a method for determining an estimate of gas emissions in a region of a landfill, the region comprising a plurality of gas collection points, each of the plurality of gas collection points comprising a gas extraction well, the method comprising: obtaining a plurality of measures comprising: a first set of one or more measures of concentration of methane in air, each measure of concentration of methane in the first set obtained at a respective location within a threshold distance of one of the plurality of gas collection points; a second set of one or more measures of concentration of methane in air, each measure of concentration of methane in the second set obtained at one of a plurality of locations in the region of the landfill among the plurality of gas collection points; and one or more measures of at least one environmental characteristic obtained at one or more locations within the region of the landfill; determining, by using a gas emissions model to process the plurality of measures, an estimate of methane emissions in the region of the landfill; and outputting the estimate of methane emissions.

According to some aspects, there is provided at least one non-transitory computer-readable storage medium having instructions encoded thereon, that, when executed by at least one processor, cause the at least one processor to perform a method for determining an estimate of gas emissions in a region of a landfill, the region comprising a plurality of gas collection points, each of the plurality of gas collection points comprising a gas extraction well, the method comprising: obtaining a plurality of measures comprising: a first set of one or more measures of concentration of methane in air, each measure of concentration of methane in the first set obtained at a respective location within a threshold distance of one of the plurality of gas collection points; a second set of one or more measures of concentration of methane in air, each measure of concentration of methane in the second set obtained at one of a plurality of locations in the region of the landfill among the plurality of gas collection points; and one or more measures of at least one environmental characteristic obtained at one or more locations within the region of the landfill; determining, by using a gas emissions model to process the plurality of measures, an estimate of methane emissions in the region of the landfill; and outputting the estimate of methane emissions.

BRIEF DESCRIPTION OF THE DRAWINGS

Various aspects and embodiments will be described with reference to the following figures. It should be appreciated that the figures are not necessarily drawn to scale. For purposes of clarity, not every component may be labeled in every drawing. In the drawings.

DETAILED DESCRIPTION

I. Introduction

Figure 1:
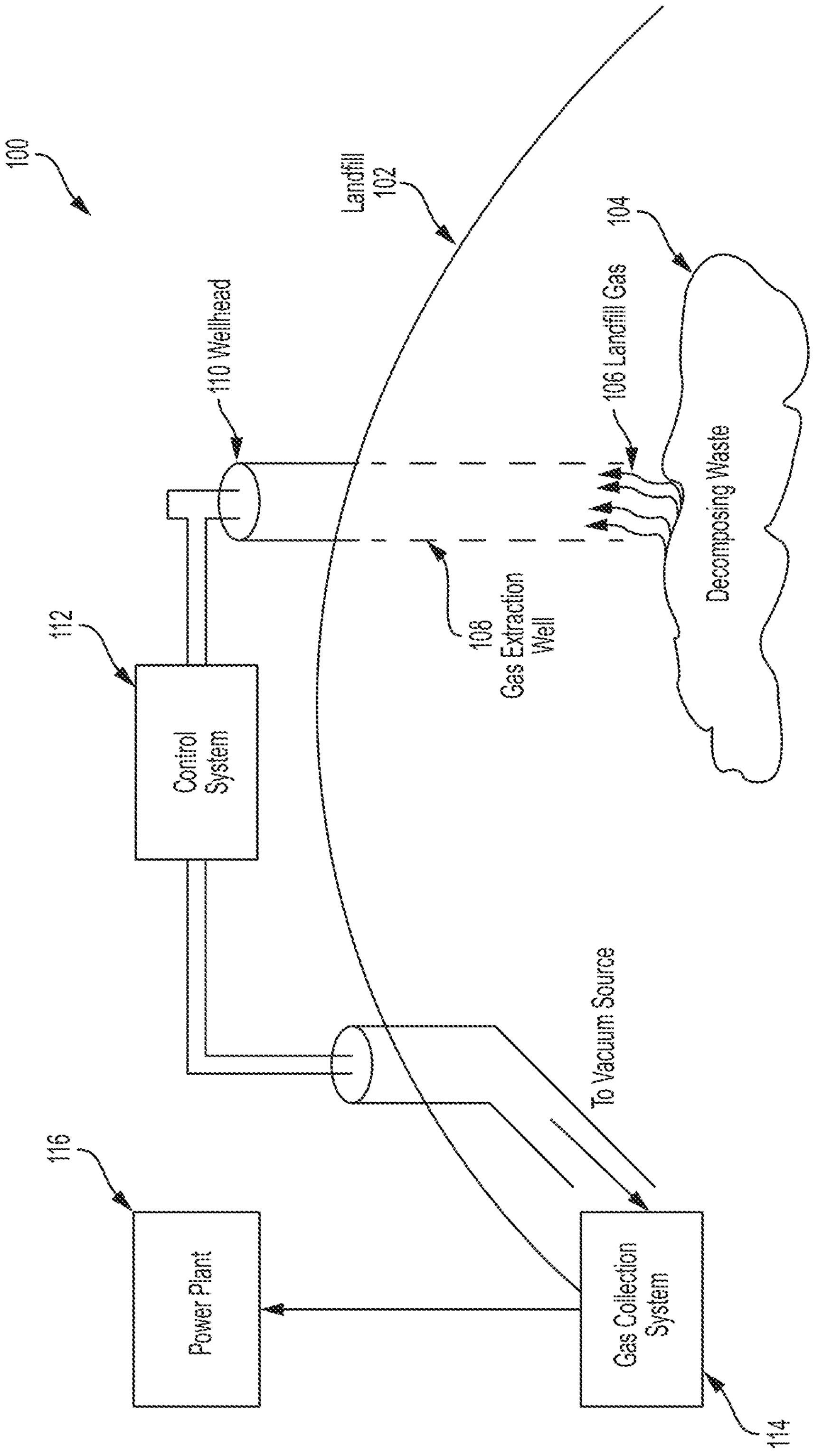
FIG. 1 is a sketch illustrating a landfill gas extraction system, according to some embodiments.

Decomposition processes of landfill waste typically produce landfill gas as a by-product. The landfill gas produced comprises a mixture of harmful gasses, including greenhouse gasses such as methane and carbon dioxide, for example. If left unchecked, such harmful gasses may rise, penetrating a cover layer at a surface of the landfill, and escaping into the atmosphere, resulting in bad odors and pollution.

To mitigate greenhouse gas emissions from a landfill, landfill gas that has accumulated underneath a surface of the landfill may be extracted via a plurality of gas extraction wells before the landfill gas is able to penetrate the surface layer of the landfill and be emitted into the atmosphere. Gas extraction may be controlled to optimize flow rates of gas extracted from a landfill.

However, harmful gasses may still escape through the landfill surface into the atmosphere in some instances, such when the surface cover in the landfill is permeable, or damaged, or there is a leak or insufficient gas extraction flow rate in a region of the landfill. The inventors have recognized that in order to manage gas emissions from a landfill, it is beneficial to understand the quantities and/or location(s) of these emissions. For example, large quantities of gas emissions may prompt corrective action. Understanding the location of increased gas emissions and developing a method to quantify the emission to the atmosphere can assist an operator in determining where and/or how to implement corrective action.

The inventors have further recognized that it may not be feasible or even possible to measure gas emissions with point measurements across an entire region for which emissions monitoring is desired. For example, equipment used to monitor gas emissions may be costly, and implementing such equipment across the entirety of a landfill may be prohibitively expensive. Accordingly, the inventors have developed a gas emissions model that estimates a measure of gas emissions in a region of a landfill based on a plurality of measures of landfill conditions, which may include at least one environmental characteristic, such as wind speed and direction, turbulence, a measure of atmospheric stability, barometric pressure, ambient temperature, topographic features of the landfill, measures of gas concentration and/or characteristics at selected locations in the landfill. A region of the landfill may be a portion of a landfill that is less than the entire landfill or the entire landfill. The region may include zero, one, or multiple locations (e.g., latitude and longitude coordinates) across the landfill at which gas emissions measurements were taken. In some instances, the region may include multiple landfill locations at which gas emissions were measured and multiple landfill locations at which gas emissions were not measured.

In some embodiments, the region of the landfill may be approximately ¼ acre. In some embodiments, the region of the landfill may be greater than or equal to 1,000 square feet. In some embodiments, the region of the landfill may be less than or equal to 10,000 square feet. In some embodiments, the region of the landfill may have a size that is greater than or equal to 1,000 square feet and less than or equal to 10,000 square feet. In some embodiments, the landfill may have a density of one gas collection point (e.g., points having gas collection wells) per acre. As described herein, the one or more measures input into the gas emissions model may be obtained at locations other than the gas collection points (e.g., in between gas collection points). In some embodiments, a measure of a respective landfill gas condition and/or characteristic obtained at at least one location/height and is input into the gas emissions model to provide a gas emissions estimate for a region of the landfill. In some embodiments, a measure of a respective landfill gas condition and/or characteristic is obtained at multiple locations/heights (e.g., at least two locations/heights) and is input into the gas emissions model to provide a gas emissions estimate for a region of the landfill.

The plurality of measures may be input into the gas emissions model and the gas emissions model may process the input measures to provide an estimate of gas emissions in the region of the landfill. The estimate of gas emissions may comprise an aggregate estimate of total gas emissions from the landfill and/or a region of the landfill that is less than the full area of the landfill. In other embodiments, the estimate of gas emissions may comprise a point estimate of gas emissions at a particular location in the region of the landfill (e.g., to identify a gas leak in the landfill cover), including locations where no measures, of the plurality of measures input into the model, have been taken. In some embodiments, the estimate of gas emissions may comprise a value representing a measure of gas emissions emanating from the landfill at a point in time and/or over a period of time (e.g., a concentration of one or more greenhouse gasses). In some embodiments, the estimate of gas emissions may comprise a flow rate of gas emissions emanating from the landfill at a point in time and/or over a period of time (e.g., a gas emissions flux such as a gas quantity, such as weight or tons, per unit time, such as per hour or day, per unit area, for example weight/hour per area or weight/day per area). In some embodiments, the estimate of gas emissions may comprise a direction of gas emissions at a point in time and/or over a period of time. In some embodiments, the estimate of gas emissions may be used to determine locations having the highest amount of gas emissions (e.g., to determine where leaks in the landfill cover may be present). Accordingly, the gas emissions model described herein provides for interpolating measures of gas emissions throughout the landfill.

In one embodiment, the gas emissions model is used to estimate methane emissions from a landfill. The inventors have recognized that using the gas emissions model to estimate methane emissions is advantageous, given the harmful effects of methane emissions. For example, methane is the primary contributor to the formation of ground-level ozone which is a pollutant and greenhouse gas. Ozone exposure can lead to death. Methane alone is also a greenhouse gas which is a significant contributor to climate change. Approximately 30% of warming since pre-industrial times can be attributed to methane emissions and rates of methane emissions are rising. Accordingly, the inventors have recognized that use of the gas emissions model to estimate methane emissions can provide a better understanding of methane emissions which may also assist in reducing methane emissions.

According to some aspects of the technology described herein, one or more corrective actions may be performed based on the estimate of gas emissions output from the gas emissions model. For example, if the estimate of gas emissions is greater than or equal to a threshold for gas emissions, one or more corrective actions may be performed, such as adjusting a flow rate of gas extraction from one or more wells in and/or outside of the region of the landfill for which emissions are estimated (e.g., by adjusting positions of one or more valves controlling flow rate of respective one or more wells and/or adjusting a system vacuum applied to a plurality (e.g., all) wells in the region of the landfill), removing liquid from gas collection wells in and/or outside of the region of the landfill, adjusting a cover of the landfill surface for one or more wells (e.g., by applying less permeable cover material to the landfill surface), and/or adjusting the number of gas collection wells in the region of the landfill (e.g., increasing gas collection well density to improve methane capture).

Gas collection system efficiency may vary throughout a landfill based on the type of cover in a portion of a landfill. In some embodiments, one or more portions of the landfill may have a permanent cover layer. For example, in these one or more portions of the landfill, the waste may be older, the landfill may not be active, and/or a cover has been applied which minimizes air intrusion and/or emissions). In the absence of the emissions monitoring systems described herein, gas collection system efficiency may be approximately 95% efficient in these permanent cover portions of the landfill. One or more portions of the landfill may have an intermediate cover layer, where the cover is more permeable and/or the waste is new. There may be a higher density of the systems described herein for measuring gas emissions in such portions of the landfill having the intermediate cover layer relative to portions of the landfill having the permanent cover layer. In the absence of the emissions monitoring systems described herein, gas collection system efficiency may be approximately 75% efficient in these intermediate cover portions of the landfill. Density of the system described herein for measuring gas emissions may be even higher in portions of the landfill having the most permeable cover, which may be regions which are close to an active face of the landfill and/or where there is frequently new waste (e.g., daily new cover). In the absence of the emissions monitoring systems described herein, gas collection system efficiency may be approximately 60% efficient in these most permeable cover portions of the landfill.

The inventors have recognized that certain measures may be less reliable, and therefore should not be used in the gas emissions model. For example, during conditions of decreased or increased turbulence and/or wind speed, and/or low atmospheric stability, measured concentrations of methane at one point may provide a less accurate representation of methane concentration at other points in the landfill. Accordingly, some aspects of the technology described herein provide for determining whether to input a measure, such as a measure of methane concentration in the atmosphere, into the gas emissions model so as to avoid use of less reliable measures with the gas emissions model.

The inventors have further recognized that it is beneficial to utilize equipment already installed at a landfill to implement the emissions monitoring techniques described herein. For example, a landfill may already be outfitted with gas extraction equipment such as wells, wellheads, and well piping. In some instances, gas extraction wells may be equipped with equipment for optimizing gas extraction, such as a chamber and one or more sensors for sampling gas. Equipment for monitoring gas emissions may be retrofit to existing equipment installed at the landfill. In some instances, equipment already installed at the landfill may be repurposed or multipurposed to perform the emissions monitoring techniques described herein.

According to some aspects, there is provided a control system for determining an estimate of gas emissions in a region of a landfill, the region comprising a plurality of gas collection points, each of the plurality of gas collection points comprising a gas extraction well, the control system comprising: at least one controller (e.g., a single controller or multiple controllers which may be co-located or positioned at different locations) configured to: obtain a plurality of measures comprising: (1) a first set of one or more measures of concentration of methane in air, each measure of concentration of methane in the first set obtained at a respective location within a threshold distance of one of the plurality of gas collection points; (2) a second set of one or more measures of concentration of methane in air, each measure of concentration of methane in the second set obtained at one of a plurality of locations in the region of the landfill among the plurality of gas collection points; and (3) one or more measures of at least one environmental characteristic obtained at one or more locations within the region of the landfill; determine, by using a gas emissions model to process the plurality of measures, an estimate of methane emissions in the region of the landfill (e.g., a point estimate of methane emissions, an estimate of methane emissions over an area, an estimate of methane emissions over time); and output the estimate of methane emissions.

In some embodiments, outputting the estimate of methane emissions comprises displaying the estimate of methane emissions. In some embodiments, displaying the estimate of methane emissions comprises outputting a graphical display of the region of the landfill having the estimate of methane emissions superimposed thereon. In some embodiments, outputting the estimate of methane emissions comprises generating a report that includes the estimate of methane emissions.

In some embodiments, the at least one controller is further configured to cause a corrective action to be performed (e.g., performing, with the at least one controller, the corrective action and/or causing another controller to perform the corrective action, for example, by controlling and/or transmitting instructions to the other controller) based on the determined estimate of methane emissions in the region of the landfill. In some embodiments, the at least one controller is further configured to determine whether the estimate of methane emissions is greater than a threshold (e.g., 100 ppm, 500 ppm, 0.1 lb. methane per hour per square foot), wherein the at least one controller is configured to cause the corrective action to be performed when it is determined that the estimate of methane emissions is greater than the threshold.

In some embodiments, the corrective action comprises adjusting a flow rate of landfill gas being extracted from the landfill at one or more of the plurality of gas collection points. In some embodiments, the corrective action comprises removing liquid from one or more of the gas extraction wells located at respective ones of the plurality of gas collection points. In some embodiments, the corrective action comprises adjusting an amount of vacuum applied to two or more of the plurality of gas collection points. In some embodiments, the corrective action comprises alerting a user to perform supplemental corrective action (e.g., adding and/or changing a material covering respective surfaces of one or more of the plurality of gas collection points, adding cover to locations in the landfill where gas leaks are identified, and/or repairing and/or replacing one or more components of one or more gas extraction wells), for example by providing the user with a message with instructions to perform the supplemental corrective action.

In some embodiments, respective ones of the first set of one or more measures of methane concentration in the air comprise at least a first measure of methane concentration in the air obtained at the respective location and at a first height above a surface of the landfill and a second measure of methane concentration in the air obtained at the respective location and at a second height above the surface of the landfill. In some embodiments, respective ones of the second set of one or more measures of methane concentration in the air comprise at least a first measure of methane concentration in the air obtained at a respective one of the plurality of locations and at a first height above the surface of the landfill and a second measure of methane concentration obtained at a respective one of the plurality of locations and at a second height above the surface of the landfill.

In some embodiments, the first set of one or more measures of methane concentration in the air is obtained by at least one first methane sensor capable of measuring methane concentration within a range of 0-10,000 ppm methane and the second set of one or more measures of methane concentration in the air is obtained by at least one second methane sensor capable of measuring methane concentration within a range of 0-10,000 ppm methane. In some embodiments, the at least one first methane sensor and the at least one second methane sensor are capable of measuring methane concentration within a range of 0-100,000 ppm methane. In some embodiments, the control system further comprises the at least one first methane sensor and/or the at least one second methane sensor. In some embodiments, the at least one first methane sensor and the at least one second methane sensor are respectively one of an optical sensor or a camera.

In some embodiments, the at least one controller is further configured to obtain one or more measures of methane concentration of landfill gas extracted from a respective gas extraction well. In some embodiments, the first set of one or more measures of methane concentration in the air are measured by a first methane sensor and the one or more measures of methane concentration of landfill gas extracted from a respective gas extraction well are measured by a second methane sensor. In some embodiments, for a first collection point of the one or more of the plurality of collection points, the first methane sensor and the second methane sensor are disposed in a same housing. In some embodiments, for a first collection point of the one or more of the plurality of collection points, the first methane sensor and the second methane sensor are a same sensor configured to measure both methane concentration of extracted landfill gas and methane concentration in the air. In some embodiments, the second methane sensor is capable of measuring methane concentration within a range of 0-70%. In some embodiments, the second methane sensor is capable of measuring methane concentration within a range of 0-100%.

In some embodiments, obtaining the plurality of measures comprises obtaining the one or more measures of the at least one environmental characteristic at different heights above a surface of the landfill. In some embodiments, the one or more measures of the at least one environmental characteristic are obtained within the threshold distance of respective ones of the plurality of gas collection points and at the plurality of locations in the region of the landfill among the plurality of gas collection points. In some embodiments, the at least one controller is further configured to, prior to providing the plurality of measures as input to the gas emissions model, associate respective ones of the one or more measures of the at least one environmental characteristic with respective ones of the first and second sets of the one or more measures of methane concentration in the air based on where the one or more measures of the at least one environmental characteristic are obtained.

In some embodiments, the at least one controller is located at a physical location different from locations at which the plurality of measures are obtained. In some embodiments, the at least one controller is located outside of the region of the landfill. In some embodiments, at least some of the plurality of measures are stored in at least one data store that is part of a cloud computing environment.

In some embodiments, respective ones of the plurality of locations in the region of the landfill among the plurality of gas collection points are located equidistant from respective at least two nearest gas collection points of the plurality of gas collection points.

In some embodiments, the region of the landfill comprises a portion of the landfill. In some embodiments, the region of the landfill comprises the entire landfill.

In some embodiments, the plurality of measures further comprise one or more measures of temperature of air in the region of the landfill and the at least one controller is further configured to determine the estimate of methane emissions by using the gas emissions model to process the one or more measures of temperature of air in the region of the landfill. In some embodiments, the plurality of measures further comprise one or more measures of barometric pressure in the region of the landfill and the at least one controller is further configured to determine the estimate of methane emissions by using the gas emissions model to process the one or more measures of barometric pressure in the region of the landfill. In some embodiments, the plurality of measures further comprise one or more measures of humidity in the region of the landfill and the at least one controller is further configured to determine the estimate of methane emissions by using the gas emissions model to process the one or more measures of humidity in the region of the landfill. In some embodiments, the plurality of measures further comprise respective heights above a reference level at which the first set of one or more measures of concentration of methane in air are obtained and respective heights above the reference level at which the second set of one or more measures of concentration of methane in air are obtained and the at least one controller is further configured to determine the estimate of methane emissions by using the gas emissions model to process the measures of respective heights above the reference level at which the first set of one or more measures of concentration of methane in air are obtained and the measures of respective heights above the reference level at which the second set of one or more measures of concentration of methane in air are obtained. In some embodiments, the plurality of measures further comprise distances between at least some of respective ones of the plurality of gas collection points and the at least one controller is further configured to determine the estimate of methane emissions by using the gas emissions model to process the measures of distances between the at least some of the respective ones of the gas collection points. In some embodiments, the plurality of measures further comprise, for each of the one or more measures of the second set of one or more measures of a concentration of methane in air, a distance to a nearest gas collection point of the plurality of gas collection points and the at least one controller is further configured to determine the estimate of methane emissions by using the gas emissions model to process the measures of the distances to the nearest gas collection point.

In some embodiments, the measure of concentration of methane in the air may be measured for multiple different heights above the landfill surface (e.g., two heights, two or more heights). Such multiple measures may be made with a single methane concentration sensor through the use of a pump and valve to pass sample of air by the sensor when measured from multiple different heights. In other embodiments, alternatively multiple (e.g., two or more) methane concentration sensors can be used to measure methane concentration at the multiple different heights above the landfill surface. For example, the system may comprise a respective sensor for measuring the concentration (e.g., methane concentration) of a gas sample at each of the respective heights from which a gas sample is obtained.

In some embodiments, the gas emissions model comprises a Gaussian Dispersion model (e.g., a Gaussian Plume model). In some embodiments, the gas emissions model comprises a Lagrangian Stochastic model. Using the gas emissions model may comprise using the Gaussian Dispersion model to determine the estimate of methane emissions in the region of the landfill at least in part by providing the plurality of measures to the Gaussian Dispersion model as input and processing the plurality of measures using the Gaussian Dispersion model to obtain the estimate of methane emissions. Using the gas emissions model may comprise using the Gaussian Plume model to determine the estimate of methane emissions in the region of the landfill at least in part by providing the plurality of measures to the Gaussian Plume model as input and processing the plurality of measures using the Gaussian Plume model to obtain the estimate of methane emissions. Using the gas emissions model may comprise using the Lagrangian Stochastic model to determine the estimate of methane emissions in the region of the landfill at least in part by providing the plurality of measures to the Lagrangian Stochastic model as input and processing the plurality of measures using the Lagrangian Stochastic model to obtain the estimate of methane emissions.

In some embodiments, the at least one controller is further configured to obtain a time stamp for each of the plurality of measures indicating when respective ones of the plurality of measures were obtained. In some embodiments, the at least one controller is further configured to input the respective times stamps for each of the plurality of measures into the gas emissions model. In some embodiments, each of the plurality of measures are obtained at a same time. In some embodiments, a first one of the one or more measures of concentration of methane in air of the first set, a first one of the one or more measures of concentration of methane in air of the second set, and a first one of the one or more measures of the at least one environmental characteristic are obtained at a first same time; and a second one of the one or more measures of concentration of methane in air of the first set, a second one of the one or more measures of concentration of methane in air of the second set, and a second one of the one or more measures of the at least one environmental characteristic are obtained at a second same time different than the first same time.

In some embodiments, the at least one controller is further configured to, prior to processing the plurality of measures with the gas emissions model, determine whether the one or more measures of the at least one environmental characteristic are within a range; and when it is determined that the one or more measures of the at least one environmental characteristic are within the range, process the plurality of measures with the gas emissions model to determine the estimate of gas emissions.

The at least one environmental characteristic may comprise wind speed, wind speed and direction, atmospheric stability, and/or one or more of wind speed, wind direction, turbulence, a thickness of a planetary boundary layer, a surface stability class, a Turner stability class, a Richardson number, and/or a sensible heat transfer fluid layer.

In some embodiments, the control system further comprises at least one sensor for obtaining the plurality of measures. In some embodiments, the control system further comprises at least one non-transitory computer-readable storage medium having encoded instructions thereon that, when executed by the at least one controller, cause the at least one controller to perform the obtaining the plurality of measures, the determining the estimate of methane emissions, and the outputting the estimate of methane emissions.

According to some aspects, there is provided a method for determining an estimate of gas emissions in a region of a landfill, the region comprising a plurality of gas collection points, each of the plurality of gas collection points comprising a gas extraction well, the method comprising: obtaining a plurality of measures comprising: (1) a first set of one or more measures of concentration of methane in air, each measure of concentration of methane in the first set obtained within a threshold distance of one of the plurality of gas collection points; (2) a second set of one or more measures of concentration of methane in air, each measure of concentration of methane in the second set obtained at one of a plurality of locations in the region of the landfill among the plurality of gas collection points; and (3) one or more measures of at least one environmental characteristic obtained at one or more locations within the region of the landfill; determining, by using a gas emissions model to process the plurality of measures, an estimate of methane emissions in the region of the landfill; and outputting the estimate of methane emissions. In some embodiments, the estimate of methane emissions comprises an estimate of methane emissions over time. In some embodiments, the estimate of methane emissions comprises an estimate of methane emissions at a point. In some embodiments, the estimate of methane emissions comprises an estimate of methane emissions over an area.

In some embodiments, outputting the estimate of methane emissions comprises displaying the estimate of methane emissions. In some embodiments, displaying the estimate of methane emissions comprises outputting a graphical display of the region of the landfill having the estimate of methane emissions superimposed thereon. In some embodiments, outputting the estimate of methane emissions comprises generating a report including the estimate of methane emissions.

In some embodiments, the method further comprises causing a corrective action to be performed (e.g., performing, with the at least one controller, the corrective action and/or causing another controller to perform the corrective action, for example, by controlling and/or transmitting instructions to the other controller) based on the determined estimate of methane emissions in the region of the landfill. In some embodiments, the method further comprises determining whether the estimate of methane emissions is greater than a threshold, and performing the corrective action comprises causing the corrective action to be performed when it is determined that the estimate of methane emissions is greater than the threshold (e.g., 100 ppm, 500 ppm, 0.1 lb. methane per hour per square foot).

In some embodiments, the corrective action comprises adjusting a flow rate of landfill gas being extracted from the landfill at one or more of the plurality of gas collection points. In some embodiments, the corrective action comprises removing liquid from one or more of the gas extraction wells located at respective ones of the plurality of gas collection points. In some embodiments, the corrective action comprises adjusting an amount of vacuum applied to two or more of the plurality of gas collection points. In some embodiments, the corrective action comprises alerting a user to perform supplemental corrective action (e.g., adding and/or changing a material covering respective surfaces of one or more of the plurality of gas collection points, adding cover to locations in the landfill where gas leaks are identified, and/or repairing and/or replacing one or more components of one or more gas extraction wells), for example by providing the user with a message with instructions to perform the supplemental corrective action.

In some embodiments, respective ones of the first set of one or more measures of methane concentration in the air comprise at least a first measure of methane concentration in the air obtained at the respective location and at a first height above a surface of the landfill and a second measure of methane concentration obtained at the respective location and at a second height above the surface of the landfill. In some embodiments, respective ones of the second set of one or more measures of methane concentration in the air comprise at least a first measure of methane concentration in the air obtained at a respective one of the plurality of locations and at a first height above the surface of the landfill and a second measure of methane concentration obtained at a respective one of the plurality of locations and at a second height above the surface of the landfill.

In some embodiments, the first set of one or more measures of methane concentration in the air is obtained by at least one first methane sensor capable of measuring methane concentration within a range of 0-10,000 ppm methane and the second set of one or more measures of methane concentration in the air is obtained by at least one second methane sensor capable of measuring methane concentration within a range of 0-10,000 ppm methane. In some embodiments, the at least one first methane sensor and the at least one second methane sensor are capable of measuring methane concentration within a range of 0-100,000 ppm methane. In some embodiments, the at least one first methane sensor and the at least one second methane sensor are respectively one of an optical sensor or a camera.

In some embodiments, the method further comprises obtaining one or more measures of methane concentration of landfill gas extracted from a respective gas extraction well. In some embodiments, the first set of one or more measures of methane concentration in the air are measured by a first methane sensor and the one or more measures of methane concentration of landfill gas extracted from a respective gas extraction well are measured by a second methane sensor. In some embodiments, for a first collection point of the one or more of the plurality of collection points, the first methane sensor and the second methane sensor are disposed in a same housing. In some embodiments, for a first collection point of the one or more of the plurality of collection points, the first methane sensor and the second methane sensor are a same sensor configured to measure both methane concentration of extracted landfill gas and methane concentration in the air. In some embodiments, the second methane sensor is capable of measuring methane concentration within a range of 0-70%. In some embodiments, the second methane sensor is capable of measuring methane concentration within a range of 0-100%.

In some embodiments, obtaining the plurality of measures comprises obtaining the one or more measures of the at least one environmental characteristic at different heights above a surface of the landfill. In some embodiments, the one or more measures of the at least one environmental characteristic are obtained within the threshold distance of respective ones of the plurality of gas collection points and at the plurality of locations in the region of the landfill among the plurality of gas collection points. In some embodiments, the method further comprises, prior to providing the plurality of measures as input to the gas emissions model, associating respective ones of the one or more measures of the at least one environmental characteristic with respective ones of the first and second sets of the one or more measures of methane concentration in the air based on where the one or more measures of the at least one environmental characteristic are obtained.

In some embodiments, the method further comprises storing at least some of the plurality of measures in at least one data store that is part of a cloud computing environment.

In some embodiments, respective ones of the plurality of locations in the region of the landfill among the plurality of gas collection points are located equidistance from respective at least two nearest gas collection points of the plurality of gas collection points.

In some embodiments, the region of the landfill comprises a portion of the landfill. In some embodiments, the region of the landfill comprises the entire landfill.

In some embodiments, the plurality of measures further comprise one or more measures of temperature of air in the region of the landfill and the method further comprises determining the estimate of methane emissions by using the gas emissions model to process the one or more measures of temperature of air in the region of the landfill. In some embodiments, the plurality of measures further comprise one or more measures of barometric pressure in the region of the landfill and the method further comprises determining the estimate of methane emissions by using the gas emissions model to process the one or more measures of barometric pressure in the region of the landfill. In some embodiments, the plurality of measures further comprise one or more measures of humidity in the region of the landfill and the method further comprises determining the estimate of methane emissions by using the gas emissions model to process the one or more measures of humidity in the region of the landfill. In some embodiments, the plurality of measures further comprise respective heights above a reference level at which the first set of one or more measures of concentration of methane in air are obtained and respective heights above the reference level at which the second set of one or more measures of concentration of methane in air are obtained and the method further comprises determining the estimate of methane emissions by using the gas emissions model to process the measures of respective heights above the reference level at which the first set of one or more measures of concentration of methane in air are obtained and the measures of respective heights above the reference level at which the second set of one or more measures of concentration of methane in air are obtained. In some embodiments, the plurality of measures further comprise distances between at least some of respective ones of the plurality of gas collection points and the method further comprises determining the estimate of methane emissions by using the gas emissions model to process the measures of distances between the at least some of the respective ones of the gas collection points. In some embodiments, the plurality of measures further comprise, for each of the one or more measures of the second set of one or more measures of a concentration of methane in air, a distance to a nearest gas collection point of the plurality of gas collection points and the method further comprises determining the estimate of methane emissions by using the gas emissions model to process the measures of the distances to the nearest gas collection point.

In some embodiments, the method further comprises, prior to processing the plurality of measures with the gas emissions model, determining whether the one or more measures of the at least one environmental characteristic are within a range; and when it is determined that the one or more measures of the at least one environmental characteristic are within the range, processing the plurality of measures with the gas emissions model to determine the estimate of gas emissions.

In some embodiments, the gas emissions model comprises a Gaussian dispersion model (e.g., a Gaussian Plume model). In some embodiments, the gas emissions model comprises a Lagrangian Stochastic model. Using the gas emissions model may comprise using the Gaussian Dispersion model to determine the estimate of methane emissions in the region of the landfill at least in party by providing the plurality of measures to the Gaussian Dispersion model as input and processing the plurality of measures using the Gaussian Dispersion model to obtain the estimate of methane emissions. Using the gas emissions model may comprise using the Gaussian Plume model to determine the estimate of methane emissions in the region of the landfill at least in party by providing the plurality of measures to the Gaussian Plume model as input and processing the plurality of measures using the Gaussian Plume model to obtain the estimate of methane emissions. Using the gas emissions model may comprise using the Lagrangian Stochastic model to determine the estimate of methane emissions in the region of the landfill at least in party by providing the plurality of measures to the Lagrangian Stochastic model as input and processing the plurality of measures using the Lagrangian Stochastic model to obtain the estimate of methane emissions.

In some embodiments, the method further comprises obtaining a time stamp for each of the plurality of measures indicating when respective ones of the plurality of measures were obtained. In some embodiments, the method further comprises inputting the respective times stamps for each of the plurality of measures into the gas emissions model. In some embodiments, each of the plurality of measures are obtained at a same time. In some embodiments, a first one of the one or more measures of concentration of methane in air of the first set, a first one of the one or more measures of concentration of methane in air of the second set, and a first one of the one or more measures of the at least one environmental characteristic are obtained at a first same time; and a second one of the one or more measures of concentration of methane in air of the first set, a second one of the one or more measures of concentration of methane in air of the second set, and a second one of the one or more measures of the at least one environmental characteristic are obtained at a second same time different than the first same time.

In some embodiments, the at least one controller is further configured to determine whether to adjust a flow rate of landfill gas being extracted from the landfill based on the estimate of landfill gas emissions (e.g., when the estimate of landfill gas emissions is determined to be greater than, or greater than or equal to, a threshold) and when it is determined to adjust the flow rate, adjust the flow rate (e.g., increasing) the flow rate of landfill gas being extracted from the landfill.

In some embodiments, the method further comprises prior to processing the plurality of measures with the gas emissions model, determining whether the one or more measures of the at least one environmental characteristic are within a range; and when it is determined that the one or more measures of the at least one environmental characteristic are within the range, processing the plurality of measures with the gas emissions model to determine the estimate of gas emissions.

The environmental characteristic may comprise wind speed, wind speed and direction, atmospheric stability, and/or one or more of wind speed, wind direction, turbulence, a thickness of a planetary boundary layer, a surface stability class, a Turner stability class, a Richardson number, and/or a sensible heat transfer fluid layer.

According to some aspects, there is provided a control system for determining an estimate of gas emissions (e.g., methane emissions) in a region of a landfill, the control system comprising: at least one controller (e.g., a single controller or multiple controllers which may be co-located or positioned at different locations) configured to: obtain one or more measures of a concentration of a gas in air (e.g., methane) in the region of the landfill; obtain a measure of at least one environmental characteristic in the region of the landfill (e.g., a wind characteristic such as wind speed, including a vertical component of wind speed, wind direction, and/or turbulence, a measure of atmospheric stability, a Turner stability class, a Richardson number, a thickness of a planetary boundary layer, and/or a surface stability class); determine whether the measure of the at least one environmental characteristic is within a range (e.g., 5-15 mph for wind speed, 4-7 for Turner stability class); when it is determined that the measure of the at least one environmental characteristic is within the range, process the one or more measures of the concentration of the gas with a gas emissions model (e.g., a Gaussian Dispersion model, a Gaussian Plume model, a Lagrangian Stochastic model); determine, based on the processing the one or more measures of the concentration of the gas with the gas emissions model, the estimate of gas emissions in the region of the landfill; and output the estimate of gas emissions; and at least one sensor for obtaining the one or more measures of the concentration of the gas in air in the region of the landfill.

Processing the one or more measures of the concentration of the gas with the gas emissions model may comprise processing the one or more measures of the concentration of the gas with the Gaussian Dispersion model at least in part by providing the one or more measures of the concentration of the gas to the Gaussian Dispersion model as input and processing the one or more measures of the concentration of the gas with the Gaussian Dispersion model to obtain the estimate of gas emissions. Processing the one or more measures of the concentration of the gas with the gas emissions model may comprise processing the one or more measures of the concentration of the gas with the Gaussian Plume model at least in part by providing the one or more measures of the concentration of the gas to the Gaussian Plume model as input and processing the one or more measures of the concentration of the gas with the Gaussian Plume model to obtain the estimate of gas emissions. Processing the one or more measures of the concentration of the gas with the gas emissions model may comprise processing the one or more measures of the concentration of the gas with the Lagrangian Stochastic model at least in part by providing the one or more measures of the concentration of the gas to the Lagrangian Stochastic model as input and processing the one or more measures of the concentration of the gas with the Lagrangian Stochastic model to obtain the estimate of gas emissions.

In some embodiments, the at least one controller is further configured to obtain a time stamp for each of the one or more measures of concentration of the gas and the measure of the at least one environmental characteristic. In some embodiments, each of the one or more measures of the concentration of the gas and the measure of the at least one environmental characteristic are obtained at a same time.

In some embodiments, the at least one controller is further configured to determine whether to adjust a flow rate of landfill gas being extracted from the landfill based on the estimate of gas emissions and when it is determined to adjust the flow rate, adjust flow rate of landfill gas being extracted from the landfill.

According to some embodiments, there is provided a method for determining an estimate of gas emissions (e.g., methane emissions) in a region of a landfill, the method comprising: obtaining one or more measures of a concentration of a gas in air (e.g., methane) in the region of the landfill; obtaining a measure of a at least one environmental characteristic in the region of the landfill (e.g., a wind characteristic such as wind speed, including a vertical component of wind speed, wind direction and/or turbulence, a measure of atmospheric stability, a Turner stability class, a Richardson number, a thickness of a planetary boundary layer, and/or a surface stability class); determining whether the measure of the at least one environmental characteristic is within a range (e.g., 5-15 mph for wind speed, 4-7 for Turner stability class); when it is determined that the measure of the at least one environmental characteristic is within the range, processing the one or more measures pf the concentration of the gas with a gas emissions model (e.g., a Gaussian Dispersion model, a Gaussian Plume model, a Lagrangian Stochastic model); determining, based on the processing the one or more measures of the concentration of the gas with the gas emissions model, the estimate of gas emissions in the region of the landfill; and outputting the estimate of gas emissions.

Using the gas emissions model may comprise using the Gaussian Dispersion model to determine the estimate of methane emissions in the region of the landfill at least in part by providing the plurality of measures to the Gaussian Dispersion model as input and processing the plurality of measures using the Gaussian Dispersion model to obtain the estimate of methane emissions. Using the gas emissions model may comprise using the Gaussian Plume model to determine the estimate of methane emissions in the region of the landfill at least in part by providing the plurality of measures to the Gaussian Plume model as input and processing the plurality of measures using the Gaussian Plume model to obtain the estimate of methane emissions. Using the gas emissions model may comprise using the Lagrangian Stochastic model to determine the estimate of methane emissions in the region of the landfill at least in part by providing the plurality of measures to the Lagrangian Stochastic model as input and processing the plurality of measures using the Lagrangian Stochastic model to obtain the estimate of methane emissions.

In some embodiments, the method further comprises obtaining a time stamp for each of the one or more measures of concentration of the gas and the measure of the at least one environmental characteristic. In some embodiments, each of the one or more measures of the concentration of the gas and the measure of the at least one environmental characteristic are obtained at a same time.

In some embodiments, the method further comprises determining whether to adjust a flow rate of landfill gas being extracted from the landfill based on the estimate of landfill gas emissions (e.g., when the estimate of landfill gas emissions is determined to be greater than, or greater than or equal to, a threshold) and when it is determined to adjust the flow rate, adjusting the flow rate (e.g., increasing) the flow rate of landfill gas being extracted from the landfill.

According to some aspects, there is provided a control system for measuring gas concentration, the control system comprising: a chamber; at least one sensor disposed in the chamber for measuring gas concentration; piping coupled to the chamber, the piping comprising: a first port configured such that a first sample of ambient air at a first height above a surface of a landfill enters the piping via the first port; and a second port configured such that a second sample of ambient air at a second height above the surface of the landfill enters the piping via the second port, wherein the first height is different than the second height; at least one valve disposed in the piping; and at least one controller (e.g., a single controller or multiple controllers which may be co-located or positioned at different locations) configured to: control the at least one valve to selectively expose the chamber to the first sample of ambient air entering the piping via the first port or the second sample of ambient air entering the piping via the second port; and control the at least one sensor to measure a gas concentration of the first sample and/or the second sample. In some embodiments, the control system further comprises piping coupled to at least one well through which landfill gas is extracted from the landfill.

In some embodiments, the at least one controller is further configured to control the at least one sensor to measure a gas concentration of a sample of landfill gas extracted from the landfill via the piping coupled to the at least one well. In some embodiments, the at least one sensor comprises a first sensor for measuring gas concentration of the first and/or second samples of ambient air and a second sensor for measuring gas concentration of the sample of landfill gas. In some embodiments, the at least one sensor comprises a single sensor for measuring gas concentration of the first and/or second samples of ambient air and the sample of landfill gas. In some embodiments, the at least one controller is further configured to control the at least one valve to selectively expose the chamber to the sample of landfill gas.

In some embodiments, the at least one valve comprises a first valve disposed between the first port and the chamber and a second valve disposed between the second port and the chamber. In some embodiments, the at least one valve comprises a three-way valve disposed between the first and second ports and the chamber. In some embodiments, the at least one valve comprises a first valve disposed between the well and the chamber and at least one second valve disposed between the first and second ports and the chamber.

In some embodiments, the at least one controller is further configured to determine whether to adjust a flow rate of landfill gas being extracted from the landfill based on the estimate of landfill gas emissions (e.g., when the estimate of landfill gas emissions is determined to be greater than, or greater than or equal to, a threshold) and when it is determined to adjust the flow rate, adjusting the flow rate (e.g., increasing) the flow rate of landfill gas being extracted from the landfill.

According to some aspects, there is provided a method for measuring gas concentration, the method comprising: performing, with at least one controller: controlling at least one valve to selectively expose a chamber to a first sample of ambient air or a second sample of ambient air, wherein the at least one valve is disposed in piping between a chamber, a first port of the piping configured such that the first sample of ambient air enters the piping at a first height above a surface of a landfill, and a second port of the piping configured such that a second sample of ambient air enters the piping at a second height above the surface of the landfill different from the first height; and control at least one sensor disposed in the chamber to measure a gas concentration of the first sample and/or the second sample.

In some embodiments, the method further comprises controlling the at least one sensor to measure a gas concentration of a sample of landfill gas extracted from the landfill via piping coupled to at least one well. In some embodiments, the at least one sensor comprises a first sensor for measuring gas concentration of the first and/or second samples of ambient air and a second sensor for measuring gas concentration of the sample of landfill gas. In some embodiments, the at least one sensor comprises a single sensor for measuring gas concentration of the first and/or second samples of ambient air and the sample of landfill gas. In some embodiments, the method further comprises controlling the at least one valve to selectively expose the chamber to the sample of landfill gas.

In some embodiments, the at least one valve comprises a first valve disposed between the first port and the chamber and a second valve disposed between the second port and the chamber. In some embodiments, the at least one valve comprises a three-way valve disposed between the first and second ports and the chamber. In some embodiments, the at least one valve comprises a first valve disposed between the well and the chamber and at least one second valve disposed between the first and second ports and the chamber.

According to some aspects, there is provided a control system comprising: at least one controller (e.g., a single controller or multiple controllers which may be co-located or positioned at different locations); and at least one non-transitory computer-readable storage medium having instructions encoded thereon that, when executed by the at least one controller, cause the at least one controller to perform a method for controlling extraction of landfill gas from a landfill comprising: obtaining one or more measures of a concentration of a gas (e.g., methane) in air in the region of the landfill; obtaining a measure of at least one environmental characteristic in the region of the landfill; determining whether the measure of the at least one environmental characteristic is within a range; when it is determined that the measure of the at least one environmental characteristic is within the range, using the one or more measures of the concentration of gas in air to determine whether to cause a corrective action (e.g., adjusting a flow rate of landfill gas being extracted from the landfill) to be performed (e.g., by performing, with the at least one controller, the corrective action and/or causing another controller to perform the corrective action, for example, by controlling and/or transmitting instructions to the other controller); and responsive to determining to cause the corrective action to be performed, causing the corrective action to be performed.

In some embodiments, determining whether to cause the corrective action to be performed comprises determining whether the one or more measures of the concentration of gas in air are greater than a threshold and responsive to determining that the one or more measures of the concentration of gas in air are greater than the threshold, determining to cause the corrective action to be performed.

According to some aspects, there is provided a method for controlling extraction of landfill gas from a landfill, the method comprising: obtaining one or more measures of a concentration of a gas (e.g., methane) in air in the region of the landfill; obtaining a measure of at least one environmental characteristic in the region of the landfill; determining whether the measure of the at least one environmental characteristic is within a range; when it is determined that the measure of the at least one environmental characteristic is within the range, using the one or more measures of the concentration of gas in air to determine whether to cause a corrective action (e.g., adjusting a flow rate of landfill gas being extracted from the landfill) to be performed (e.g., by performing, with the at least one controller, the corrective action and/or causing another controller to perform the corrective action, for example, by controlling and/or transmitting instructions to the other controller); and responsive to determining to cause the corrective action to be performed, causing the corrective action to be performed.

In some embodiments, determining whether to cause the corrective action to be performed comprises determining whether the one or more measures of the concentration of gas in air are greater than a threshold and responsive to determining that the one or more measures of the concentration of gas in air are greater than the threshold, determining to cause the corrective action to be performed.

According to some aspects there is provided a control system for determining an estimate of gas emissions in a region of a landfill, the region comprising a plurality of gas collection points, each of the plurality of gas collection points comprising a gas extraction well, the control system comprising: at least one controller (e.g., a single controller or multiple controllers which may be co-located or positioned at different locations); and at least one non-transitory computer-readable storage medium having encoded thereon instructions that, when executed by the at least one controller, cause the at least one controller to perform a method comprising: obtaining a plurality of measures comprising: a first set of one or more measures of concentration of methane in air, each measure of concentration of methane in the first set obtained at a respective location within a threshold distance of one of the plurality of gas collection points, the first set of one or more measures of concentration of methane in air comprising: first and second measures of concentration of methane in air measured at respective different heights above ground at a first respective location; and first and second measures of concentration of methane in air measured at respective different heights above ground at a second respective location; a second set of one or more measures of concentration of methane in air, each measure of concentration of methane in the second set obtained at one of a plurality of locations in the region of the landfill among the plurality of gas collection points, the second set of one or more measures of concentration of methane in air comprising: first and second measures of concentration of methane in air measured at respective different heights above ground at a first one of the plurality of locations; and first and second measures of concentration of methane in air measured at respective different heights above ground at a second one of the plurality of locations; one or more measures of wind speed and direction obtained at one or more locations within the region of the landfill; determining, by using a gas emissions model to process the plurality of measures, an estimate of methane emissions in the region of the landfill, wherein the gas emissions model comprises a Gaussian dispersion model; determining whether the estimate of methane emissions is greater than a threshold; and responsive to determining that the estimate of methane emissions is greater than the threshold, causing a corrective action to be performed (e.g., performing, with the at least one controller, the corrective action and/or causing another controller to perform the corrective action, for example, by controlling and/or transmitting instructions to the other controller), the corrective action comprising adjusting a flow rate of landfill gas being extracted from the landfill at one or more of the plurality of gas collection points.

Using the gas emissions model may comprise using the Gaussian Dispersion model to determine the estimate of methane emissions in the region of the landfill at least in part by providing the plurality of measures to the Gaussian Dispersion model as input and processing the plurality of measures using the Gaussian Dispersion model to obtain the estimate of methane emissions.

According to some aspects, there is provided a method for determining an estimate of gas emissions in a region of a landfill, the region comprising a plurality of gas collection points, each of the plurality of gas collection points comprising a gas extraction well, the method comprising: obtaining a plurality of measures comprising: a first set of one or more measures of concentration of methane in air, each measure of concentration of methane in the first set obtained at a respective location within a threshold distance of one of the plurality of gas collection points, the first set of one or more measures of concentration of methane in air comprising: first and second measures of concentration of methane in air measured at respective different heights above ground at a first respective location; and first and second measures of concentration of methane in air measured at respective different heights above ground at a second respective location; a second set of one or more measures of concentration of methane in air, each measure of concentration of methane in the second set obtained at one of a plurality of locations in the region of the landfill among the plurality of gas collection points, the second set of one or more measures of concentration of methane in air comprising: first and second measures of concentration of methane in air measured at respective different heights above ground at a first one of the plurality of locations; and first and second measures of concentration of methane in air measured at respective different heights above ground at a second one of the plurality of locations; one or more measures of wind speed and direction obtained at one or more locations within the region of the landfill; determining, by using a gas emissions model to process the plurality of measures, an estimate of methane emissions in the region of the landfill, wherein the gas emissions model comprises a Gaussian dispersion model; determining whether the estimate of methane emissions is greater than a threshold; and responsive to determining that the estimate of methane emissions is greater than the threshold, causing a corrective action to be performed (e.g., performing, with the at least one controller, the corrective action and/or causing another controller to perform the corrective action, for example, by controlling and/or transmitting instructions to the other controller), the corrective action comprising adjusting a flow rate of landfill gas being extracted from the landfill at one or more of the plurality of gas collection points.

Using the gas emissions model may comprise using the Gaussian Dispersion model to determine the estimate of methane emissions in the region of the landfill at least in part by providing the plurality of measures to the Gaussian Dispersion model as input and processing the plurality of measures using the Gaussian Dispersion model to obtain the estimate of methane emissions.

According to some aspects, there is provided at least one non-transitory computer-readable storage medium having instructions encoded thereon, that, when executed by at least one processor, cause the at least one processor to perform any of the methods described herein.

As used herein, a measure of a characteristic (e.g., a measure of concentration of a particular gas such as methane, a measure of an environmental characteristic such as wind speed, wind direction, turbulence, atmospheric stability, a thickness of a planetary boundary layer, a Turner stability class, a Richardson number, a surface stability class, sensible heat transfer fluid layer, etc.) may be a measurement of the characteristic obtained from a sensor (e.g., by controlling the sensor to obtain the measurement directly or receiving the measurement from another controller that controls the sensor to obtain the measurement). However, a measure of a characteristic is not limited to be the measurement of the characteristic and may, instead, be derived from (e.g., calculated using, estimated using, etc.) one or more measurements of the characteristic and/or one or more measurements of one or more other related characteristics. For example, a measure of a characteristic may have different units than the measurement of the characteristic and may be calculated from the measurement in accordance with the formula(s) for changing the units. As another example, a measure of a characteristic (a measure of concentration of balance gas) may be estimated based on measurements of concentrations of other gasses obtained by using other sensors (e.g., a measure of balance gas may be estimated as the difference between 100% and measurements of concentrations of carbon dioxide, methane, and oxygen in the landfill gas).

As used herein, obtaining a measure of a characteristic may comprise measuring (e.g., controlling a sensor to obtain a measurement) the characteristic, performing one or more calculations to determine the value of the measure of the characteristic using, for example, one or more measurements, or simply receiving the measure of the characteristic (already determined and/or calculated) from another device.

As used herein, obtaining a measure within a threshold distance of a location (e.g., a gas collection point) means obtaining a measurement measured at a location that is within the threshold distance of the location or obtaining a measure derived from one or more measurements measured at one or more locations that are all within the threshold distance of the location.

At least one controller may comprise a single controller or multiple controllers (which may be co-located or positioned at different locations).

In some embodiments, causing a corrective action to be performed can include performing, with at least one controller, the corrective action. In some embodiments, causing the corrective action to be performed includes causing another controller to perform the corrective action (e.g., by controlling and/or transmitting instructions to the other controller).

In some embodiments, alerting a user to perform a supplemental corrective action may include providing the user with a message with one or more instructions to perform the supplemental corrective action. The instructions may include an indication that the supplemental corrective action must or should be performed. In some embodiments, the instructions may include one or more steps indicating how the supplemental corrective action is to be performed.

Various systems are described herein having at least one controller. The at least one controller may be configured to execute instructions encoded on at least one non-transitory computer-readable storage medium that, when executed by the at least one controller cause the at least one controller to perform one or more methods encoded by the instructions. The systems described herein may further comprise the at least one non-transitory computer-readable storage medium.

The aspects and embodiments described above, as well as additional aspects and embodiments, are described further below. These aspects and/or embodiments may be used individually, all together, or in any combination, as the application is not limited in this respect.

II. Example Systems for Performing Landfill Gas Extraction

FIG. 1 illustrates an example environment 100 in which aspects of the technology described herein may be implemented. The illustrative environment 100 includes a landfill 102 which holds decomposing waste 104. The decomposing waste 104 produces landfill gas 106 which is extracted through a gas extraction well 108. The gas extraction well includes a wellhead 110 through which a control system 112 is coupled to the gas extraction well 108. The control system 112 may be configured to control extraction of gas via the gas extraction well 108. A gas collection system 114 collects the landfill gas 106 extracted through the gas extraction well 108. The gas collection system 114 supplies the extracted landfill gas to a power plant 116. Although in the example embodiment shown in FIG. 1, a single wellhead 110 is shown, in some embodiments, the environment 100 may include multiple wellheads at multiple sites. In such embodiments, the landfill gas may be extracted from the multiple sites.

In some embodiments, the gas collection system 114 includes a vacuum source. The vacuum source generates a negative pressure differential between the gas collection system 114 and the landfill 102. The negative pressure differential causes the landfill gas 106 to flow from the landfill 102 to the gas collection system 114 through the gas extraction well 108. In some embodiments, the gas collection system 114 may comprise an additional location where extracted landfill gas is stored, and where the extracted landfill gas may be treated (e.g., by removing impurities) before being supplied to the power plant or to the pipeline infrastructure 116. The power plant 116 may be configured to convert the extracted landfill gas into electrical power. For example, the power plant 116 may be configured to burn the extracted landfill gas to turn a rotor of an electricity generator or a turbine.

It should be appreciated, that although FIG. 1 illustrates supplying of extracted landfill gas from the collection system 114 to a power plant 116, the extracted landfill gas may additionally or alternatively be supplied to one or more other locations, and/or used for other purposes. For example, the gas collection system 114 may be configured to supply gas to existing gas pipelines, boilers, greenhouses, heating units, and/or other locations, as aspects of the technology described herein are not limited with respect to where the extracted landfill gas is supplied.

In some embodiments, the control system 112 controls extraction of the landfill gas 106 through the gas extraction well 108. In some embodiments, the control system 112 may be configured to operate to control extraction of landfill gas to achieve a desired outcome or outcomes with respect to energy content of extracted landfill gas, composition of extracted landfill gas, flow rate of gas extraction, regulatory requirements, and/or other parameters. In some embodiments, the control system 112 may include multiple components that operate to achieve the outcome(s), as discussed in more detail herein.

Figure 2:
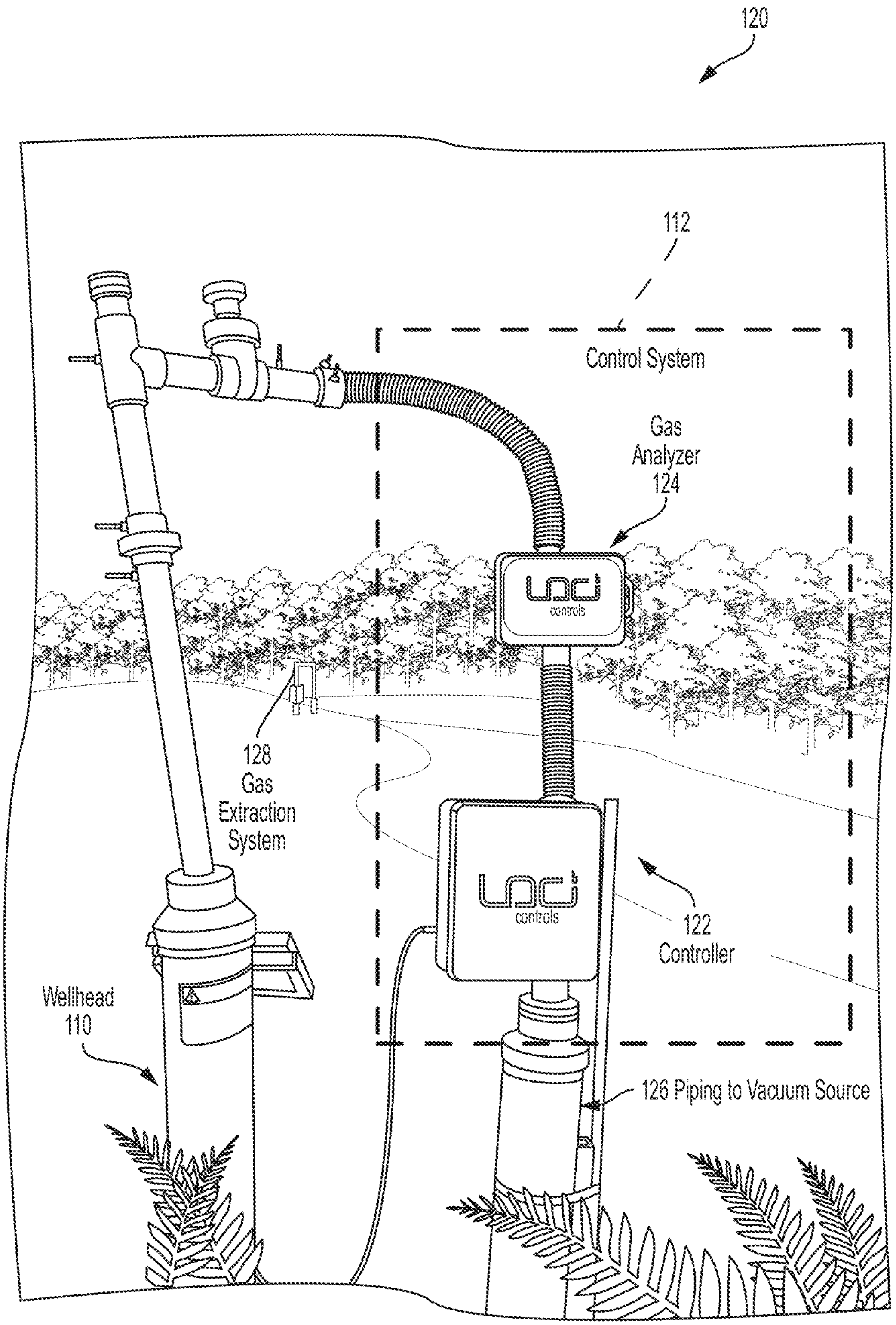
FIG. 2 shows an example control system for landfill gas extraction, according to some embodiments.

FIG. 2 illustrates an example implementation of the control system 112 for a landfill gas extraction system 120. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. The control system 112 includes a gas analyzer 124 which the control system 112 uses to determine one or more characteristics of the extracted landfill gas. The control system 112 includes a controller 122 that uses the determined characteristic(s) to control extraction of landfill gas. In some embodiments, the controller 122 may be configured to use the measured characteristic(s) to control a flow rate of landfill gas extraction. For example, the controller 122 may be configured to use the measured characteristic(s) to control a position of a valve that controls the flow rate of landfill gas being extracted.

In some embodiments, the gas analyzer 124 may be configured to collect and analyze extracted landfill gas. The gas analyzer 124 may be configured to include one or more sensors to measure the characteristic(s) of the extracted landfill gas. In some embodiments, the gas analyzer 124 may be configured to use the sensor(s) to measure composition, temperature, and/or other characteristic of the extracted landfill gas. In some embodiments, the gas analyzer may be configured to use the sensor(s) to measure the characteristic (s) of landfill gas when the gas is extracted (e.g., before being analyzed by the gas analyzer 124). The sensor(s) may comprise, for example, infrared sensors, catalytic beads, electrochemical sensors, photoionization detectors, zirconium oxide sensors, thermal conductive detectors, and/or any other suitable sensing technology for measuring the characteristic(s) of the landfill gas, as aspects of the technology described herein are not limited to using a particular type of sensor.

In some embodiments, the gas analyzer 124 may be configured to heat the landfill gas within gas composition chamber prior to measuring the characteristic(s) to obtain more accurate and/or consistent measurements of the characteristic(s). In some embodiments, the gas analyzer 124 may be configured to heat the extracted landfill gas prior to measuring the characteristic(s) of the landfill gas. In some embodiments, the gas analyzer 124 may be configured to heat the extracted landfill gas to a temperature that is a threshold temperature (e.g., 1 degree Celsius, 10 degrees Celsius, 25 degrees Celsius) greater than a temperature of the gas in the landfill and/or a temperature of the gas when it is extracted. The gas analyzer 124 may be configured to obtain measurements of the characteristic(s) of the extracted landfill gas at the higher temperature. By heating the extracted landfill gas in this manner prior to measuring the characteristic(s), the obtained measurements may be more accurate and precise. Further, the warmer landfill gas may reduce deterioration of hardware components in the gas analyzer 124 by preventing condensation of water vapor on the hardware components.

In some embodiments, the gas analyzer 124 may be configured to additionally or alternatively treat the gas sample in other ways. For example, the gas analyzer 124 may be configured to treat a gas sample by cooling the gas sample, and/or drying the gas sample. In another example, the gas analyzer 124 may be configured to filter the gas to remove particles, filter the gas to remove contaminants or other chemicals, pressurize the gas, de-pressurize the gas, or treating the gas in another manner. In some embodiments, the gas analyzer 124 may be configured to obtain measurements of the characteristic(s) of a landfill gas sample after treating the gas sample.

In some embodiments, the gas analyzer 124 may be configured to determine one or more characteristics of the environment (e.g., ambient temperature, atmospheric pressure, wind direction, wind speed, precipitation, humidity), and/or gas in the landfill (e.g., temperature, composition, humidity). The gas analyzer 124 may include one or more sensors to obtain measurements of the characteristic(s). The sensors can include, for example, temperature sensors, humidity sensors, pH sensors, pressure sensors and/or any other type of sensor(s) for sensing environmental characteristics.

In some embodiments, the controller 122 may be configured to control one or more parameters of landfill gas extraction. In some embodiments, the controller 122 may be configured to control a flow rate of landfill gas being extracted from the landfill 102. In some embodiments, the control system 112 may include a flow control mechanism to control a flow rate of landfill gas extraction. For example, the control system 112 may include one or more valves and a valve actuator for changing the position of the valve(s) to control the flow rate. The controller 122 may be configured to determine and apply settings to the valve(s) to control the flow rate of landfill gas extraction (e.g., operate the valve actuator to change the position of the valve to a determined position). In some embodiments, the control mechanism is placed between the gas extraction well 108 and the gas collection system 114 such that gas being extracted through the gas extraction well 108 flows through the control mechanism on its way to the gas collection system 114.

In some embodiments, the controller 122 may be coupled to the gas analyzer 124. The controller 122 may be configured to use measurements obtained by the gas analyzer 124 to determine the control parameter(s). In some embodiments, the controller 122 may be configured to regulate the landfill gas flow rate based on the measurements obtained by the gas analyzer 124. To adjust the flow rate, in some embodiments, the controller 122 may be configured to adjust a valve position to modify the flow rate. The controller 122 may be configured to control a valve actuator (e.g., a valve drive buffer) to move the position of the valve in order to obtain a position. In some embodiments, the controller 122 may be configured to determine a target flow rate based on the measurements of the characteristic(s) obtained by the gas analyzer 124. The controller 122 may be configured to adjust the control mechanism (e.g., valve position) such that the flow rate is the target flow rate.

In some embodiments, the control system 112 may be configured to determine a measure of energy content of landfill gas being extracted from the landfill 102. The gas analyzer 124 may be configured to obtain a measurement of concentration of methane in extracted landfill gas. The controller 122 may be configured to determine a flow rate of the gas being extracted from the landfill. The control system 112 may be configured to determine an energy content of the landfill gas being extracted from the landfill 102 based on the concentration of methane and the flow rate. The controller may be configured to determine a target energy content of landfill gas being extracted from the landfill 102 and control a flow control mechanism to set the flow rate such that the energy content of the landfill gas being extracted reaches the target energy content.

Example systems and techniques for controlling extraction of landfill gas are further described in U.S. Pat. No. 10,449,578 entitled "DEVICES AND TECHNIQUES RELATING TO LANDFILL GAS EXTRACTION" filed on Mar. 13, 2017 and issued on Oct. 22, 2019, U.S. Pat. No. 10,576,514 entitled "DEVICES AND TECHNIQUES RELATING TO LANDFILL GAS EXTRACTION" filed on Apr. 21, 2017 and issued on Mar. 3, 2020, U.S. patent application Ser. No. 16/589,372 entitled "LANDFILL GAS EXTRACTION SYSTEMS AND METHODS" filed on Oct. 1, 2019 each of which are incorporated by reference herein in their entireties. Some embodiments may include one or more features of embodiments described in the referenced applications.

In some embodiments, multiple wells or gas extraction systems may be located at a landfill to extract gas from the landfill. For example, FIG. 2 illustrates another well and gas extraction system 128 located at the landfill. In some embodiments, multiple gas extraction systems at the landfill may include the control system 112 for controlling extraction of landfill gas from the landfill. For example, gas extraction system may include the control system 112 to control extraction of landfill gas via the gas extraction system 128.

Although the gas analyzer 124 and the controller 122 are shown as separate components in FIG. 1, in some embodiments, the gas analyzer 124 and controller 122 may be portions of a single unit. Some embodiments are not limited to any particular arrangement or combination of the gas analyzer 124 and the controller 122. Furthermore, functionality described for each of the gas analyzer 124 and the controller 122 may be interchanged between the two components, as some embodiments of the technology described herein are not limited in this respect.

Figure 3:
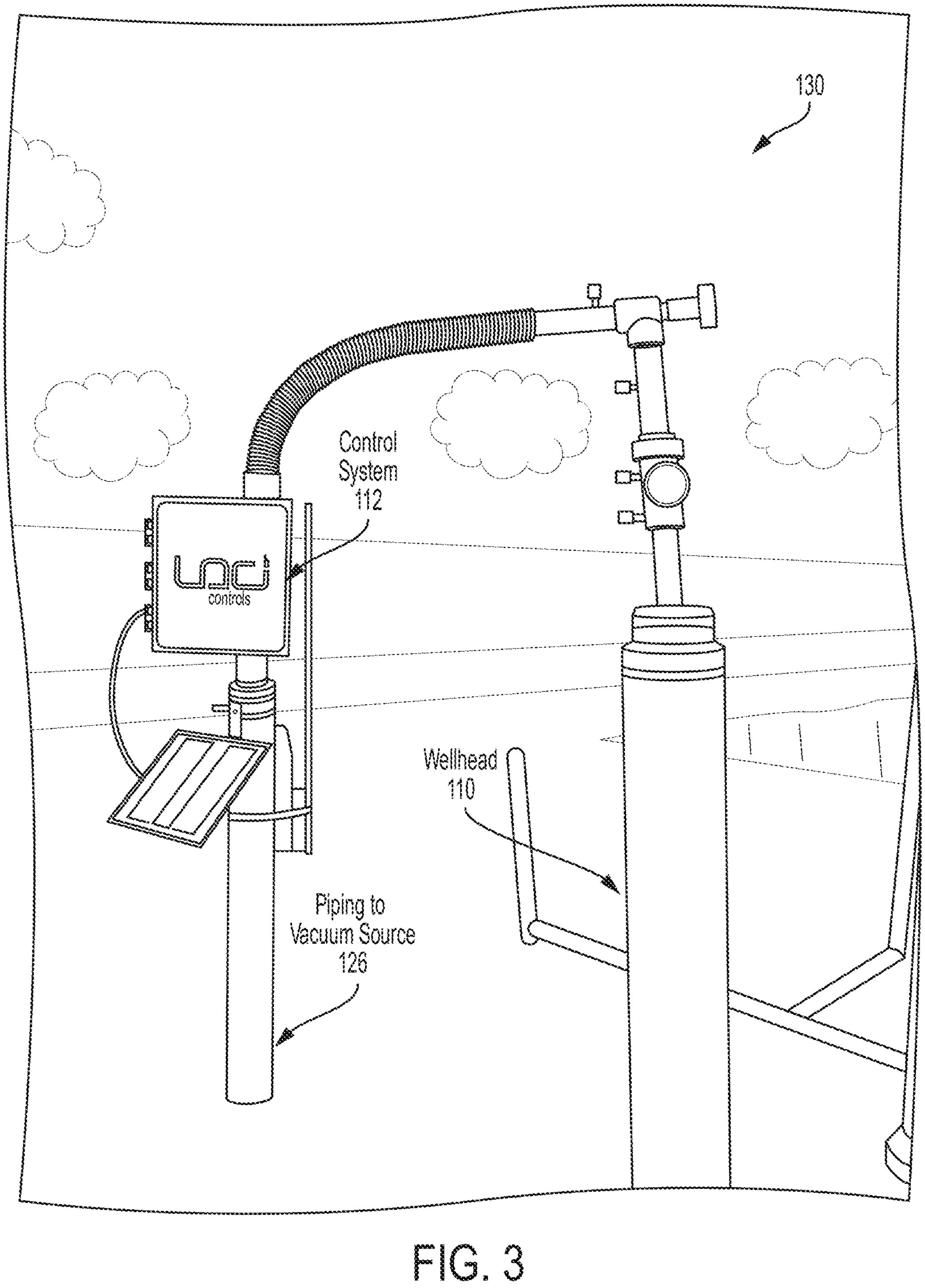
FIG. 3 shows another example control system for landfill gas extraction, according to some embodiments.

FIG. 3 illustrates an example implementation of the control system 112 for a landfill gas extraction system 130. In some embodiments, the gas analyzer and the controller described with reference to FIG. 2 are portions of the control system 112 shown in FIG. 3. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. In some embodiments, the control system 112 may be configured to operate as described above with reference to FIG. 2. For example, the control system 112 may be configured to use a gas analyzer and controller in the control system 112 to obtain measurements of one or more characteristics of the landfill gas being extracted via the gas extraction system and control extraction of the gas based on the measurements of the characteristic(s).

Figure 4:
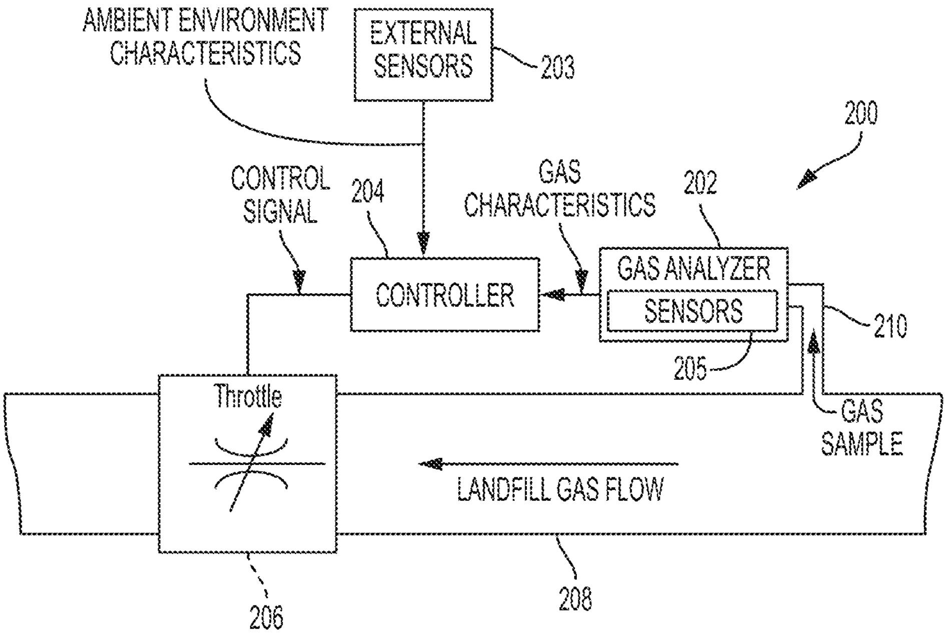
FIG. 4 is a block diagram illustrating an in situ control mechanism for landfill gas extraction, according to some embodiments.

A block diagram of some embodiments of an In Situ Control Mechanism 200 is presented in FIG. 4. In some embodiments, an In Situ Control Mechanism may include one or more mechanisms configured to control the flow of landfill gas from one or more wells to gas collection system 114 through gas extraction system 120. Any suitable flow-control mechanism 206 may be used, including, without limitation, a valve (e.g., a solenoid valve, latching solenoid valve, pinch valve, ball valve, butterfly valve, ceramic disc valve, check valves, choke valves, diaphragm valves, gate valves, globe valves, knife valves, needle valves, pinch valve, piston valve, plug valve, poppet valve, spool valve, thermal expansion valve, pressure reducing valve, sampling valve, safety valve) and/or any other suitable type of flow-control mechanism.

In some embodiments, an In Situ Control Mechanism may include one or more actuation devices configured to control operation of the one or more flow-control mechanisms (e.g., to open a flow-control mechanism, close a flow-control mechanism, and/or adjust a setting of a flow-control mechanism). In some embodiments, an In Situ Control Mechanism may include a controller 204 configured to determine the settings to be applied to the one or more flow-control mechanisms (e.g., via the actuation devices), and/or configured to apply the settings to the one or more flow-control mechanisms (e.g., via the actuation devices). In some embodiments, the settings to be applied to the one or more flow-control mechanisms (e.g., via the actuation devices) may be determined remotely and communicated to the In Situ Control Mechanism (e.g., by a remotely located controller) using any suitable communication technique, including, without limitation, wireless communication, wired communication, and/or power line communication.

In some embodiments, an In Situ Control Mechanism may include one or more sensor devices configured to sense one or more attributes associated with the landfill, including, without limitation, attributes of the landfill, attributes of the landfill gas, attributes of an area adjacent to the landfill, and/or attributes of the landfill's gas extraction system. In some embodiments, the In Situ Control Mechanism may include one or more actuation devices configured to control operation of the one or more sensor devices (e.g., to activate a sensor device, deactivate a sensor device, and/or collect data from the sensor device). In some embodiments, an In Situ Control Mechanism may include a controller 204 configured to determine the settings (e.g., control signals) to be applied to the one or more actuation and/or sensor devices, configured to apply the settings to the one or more actuation and/or sensor devices, and/or configured to collect data (e.g., measurements) obtained by the one or more sensor devices. In some embodiments, the settings to be applied to the one or more actuation and/or sensor devices may be determined remotely and communicated to the In Situ Control Mechanism (e.g., by a remotely located controller) using any suitable communication technique, including, without limitation, wireless communication, wired communication, and/or power line communication. In some embodiments, the In Situ Control Mechanism may communicate the one or more sensed attributes associated with the landfill (e.g., to a remotely located controller).

In some embodiments, the one or more sensor devices may include a Gas Analyzer 202. In some embodiments, a Gas Analyzer 202 may collect a sample of landfill gas from the gas extraction piping 208 through an input port 210, determine (e.g., compute, measure and/or sense) one or more characteristics of that gas, and/or report the one or more characteristics of the gas to a controller (e.g., local controller 204 and/or a remotely located controller). In some embodiments, the Gas Analyzer may determine the gas temperature, pressure, flow rate, humidity, energy content (e.g., energy density), gas composition (partial pressure or concentration of methane, oxygen, carbon dioxide, carbon monoxide, hydrogen sulfide, nitrogen and/or any other suitable gas) and/or any other characteristics of the landfill gas coming from the gas extraction well(s) upstream from the location where the In Situ Control Mechanism is installed.

Accordingly, in some embodiments, Gas Analyzer 202 may include sensors 205 configured to make such measurements. Sensors 205 may be of any suitable type. In some embodiments, sensors 205 may include a sensor configured to detect partial pressure and/or concentration of methane in landfill gas, a sensor configured to detect partial pressure and/or concentration of oxygen in landfill gas, a sensor configured to detect partial pressure and/or concentration of carbon dioxide in landfill gas, a sensor configured to detect partial pressure and/or concentration of carbon monoxide in landfill gas, a sensor configured to detect partial pressure and/or concentration of hydrogen sulfide in landfill gas, a sensor configured to detect partial pressure and/or concentration of nitrogen in landfill gas, and/or a sensor to detect partial pressure or concentration of any suitable gas in landfill gas.

In some embodiments, sensors 205 may include one or more non-dispersive infrared (NDIR) sensors, mid infrared optical sensors, catalytic beads, electrochemical sensors, pellistors, photoionization detectors, zirconium oxide sensors, thermal conductivity detectors, and/or any other sensing technology. Gas Analyzer 202 may be configured to measure flow rate by using one or more sensors 205 to determine a pressure differential across a venturi, orifice plate, or other restriction to the flow of gas; by pitot tube, mechanical flow meter, heated wire or thermal mass flow meter, and/or using any other suitable technique. Gas Analyzer 202 may be configured to measure temperature with a thermocouple, a negative or positive temperature coefficient resistor, capacitor, inductor, a semiconducting device, and/or using any other suitable technique.

In some embodiments, one or more external sensors 203 may be used to measure one or more characteristics of the ambient environment outside of Gas Analyzer 202 (e.g., outside of In Situ Control Mechanism 200). The external sensor(s) 203 may provide obtained measurements to In Situ Control Mechanism 200 (e.g., to controller 204) and/or to one or more computing devices located remotely from In Situ Control Mechanism 200 (e.g., by using a wireless link, a wired link, and/or any suitable combination of wireless and wired links). In some embodiments, external sensor(s) 203 may include one or more temperature sensors configured to measure temperature outside the control mechanism 200 (e.g., the ambient atmospheric temperature) and/or any other suitable location. In some embodiments, external sensor(s) 203 may include one or more atmospheric pressure sensor(s) configured to measure atmospheric pressure outside of the control mechanism 200 (e.g., ambient atmospheric pressure) and/or any other suitable location. In some embodiments, sensors 203 may be used to measure one or more characteristics of the ambient environment. Additionally or alternatively, in some embodiments, information about the characteristic(s) of the ambient environment may be obtained from an external data source (e.g., external forecast data, National Oceanic and Atmospheric Administration (NOAA) data for temperature and/or barometric pressure).

In some embodiments, the gas characteristics may be sampled once in each reading, or may be sampled many times and statistics about the distribution of values may be determined. The gas characteristics may be continuously determined, or they may be determined at discrete time intervals. In some embodiments, the Gas Analyzer may analyze gas in the main flow of landfill gas (e.g., within gas extraction piping 208). In some embodiments, the Gas Analyzer may draw a small sample of gas into a separate chamber for analysis. In some embodiments, certain parameters (for example flow rate, pressure, temperature, humidity, and the like) may be measured in the main gas stream (e.g., may be measured by sensors disposed directly within extraction gas piping), and others may be analyzed in a separate chamber.

In order to improve measurement accuracy, measurement resolution, measurement repeatability, sensor lifetime, and/or sensor reliability, a sample of gas from the well may be pre-treated before analysis, which pre-treatment may include heating, cooling, drying, and/or any other suitable pre-treatment processing (e.g., through forced condensation, passing through a desiccant, or any other suitable technique), filtered to remove particles, filtered to remove contaminants or other chemicals, pressurized, de-pressurized, and/or otherwise treated before being analyzed. After analyzing and reporting gas characteristics (e.g., to local controller 204 and/or to a remotely located controller), the Gas Analyzer may purge the gas sample from the chamber and vent it to the atmosphere, or return it to the main gas flow. In some embodiments, the analyzed gas sample may be purged prior to reporting the gas characteristics to a controller.

In some embodiments, the Gas Analyzer may utilize non-dispersive infrared (NDIR) sensors, catalytic beads, electrochemical sensors, pellistors, photoionization detectors, zirconium oxide sensors, thermal conductivity detectors, and/or any other sensing technology. Flow rate may be measured by a pressure differential across a venturi, orifice plate, or other restriction to the flow of gas; by pitot tube, mechanical flow meter, heated wire or thermal mass flow meter, and/or using any other suitable technique. Temperature may be measured with a thermocouple, a negative or positive temperature coefficient resistor, capacitor, inductor, a semiconducting device, and/or using any other suitable technique. Temperature may be measured inside the well, in the main gas flow from the well to the collection system, inside a sampling chamber, outside of the control mechanism (e.g., ambient atmospheric temperature), and/or at any other suitable point. Atmospheric pressure may be measured outside of the control mechanism (e.g., ambient atmospheric pressure) and/or at any other suitable location. Temperature, pressure, gas composition, and/or other readings from different points within the gas extraction well, the In Situ Control Mechanism, and/or the gas collection system may be used in conjunction with each other to obtain a more complete analysis of the operating state of the landfill gas collection system.

III. Landfill Gas Emissions Monitoring and Control

As described herein, the inventors have developed techniques for controlling landfill gas extraction based at least in part on a characteristic of at least one greenhouse gas emitted from the landfill, aspects of which are further described herein.

a. Example Systems for Landfill Gas Emissions Monitoring and Control

Figure 5A:
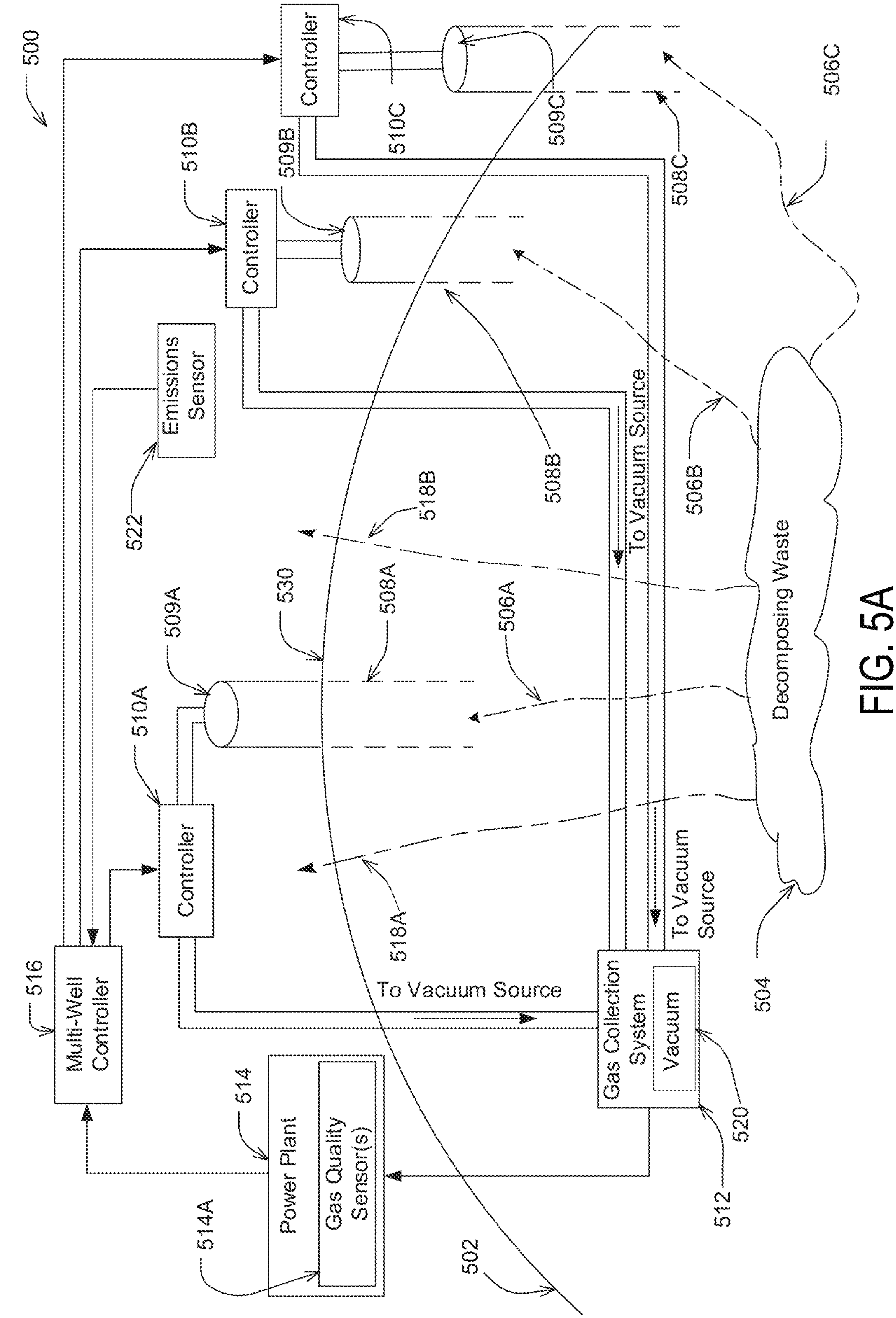
FIG. 5A is a block diagram of an example gas extraction system having a plurality of wells, according to some embodiments.

FIG. 5A is a block diagram of an example system for controlling landfill gas extraction based on landfill gas emissions characteristics. As shown in FIG. 5A, landfill gas collected from multiple different extraction wells in a landfill may be aggregated at a gas output. For example, the gas output may be a power plant that uses the aggregated landfill gas to generate electricity. In another example, the gas output may be a processing plant where landfill gas collected from the extraction wells undergoes treatment. The multiple wells may each have a valve disposed in well piping coupled to the well that modulates a flow rate of landfill gas being extracted from the well. In some embodiments, the control system may obtain a value indicating a characteristic of the landfill gas emitted from the plurality of wells (e.g., a mass flow rate of a greenhouse gas, a concentration of a greenhouse gas measured a fixed distance from a surface of the landfill), and determine whether the characteristic is outside of a target range (e.g., greater than an upper endpoint and/or less than a lower endpoint) or different from a target value for the characteristic. In response to determining that the measured characteristic is outside of the target range, for example, the control system may adjust a flow rate of landfill gas being extracted from one or more of the plurality of wells. For example, the control system may control the valves disposed in the well piping to control flow rates of landfill gas being extracted from the multiple wells. The controller may change the degree to which one or more of the valves is open to change the flow rates of one or more of the multiple gas extraction wells. In some embodiments, the control system may control flow rates of landfill gas being extracted from the multiple wells by adjusting an applied vacuum to the plurality of wells.

FIG. 5A illustrates an example control system 500 in which aspects of the technology described herein may be implemented. The control system 500 includes a landfill 502, which holds decomposing waste 504. The decomposing waste 504 produces landfill gas 506A-C which flows out from the landfill 502 through gas extraction wells 508A-C. A gas extraction well may also be referred to herein as a "well." The gas extraction wells 508A-C include respective wellheads 509A-C. Each of the gas extraction wells 508A-C is coupled to a respective one of the controllers 510A-C through the wellhead of the gas extraction well. Each of the controllers 510A-C may be configured to locally control extraction of gas from the gas extraction well that the controller is coupled to. A controller coupled to a particular well may be referred to herein as a "local controller." A gas collection system 512 collects the landfill gas extracted from the wells 508A-C. The gas collection system 512 supplies the extracted landfill gas to a power plant 514. The power plant 514 may be communicatively coupled to a multi-well controller 516. The multi-well controller 516 is communicatively coupled to the controllers 510A-C associated with wells 508A-C. The multi-well controller 516 receives, from the power plant 514, information indicating gas quality of landfill gas aggregated from the wells 508A-C. It should be appreciated that although three wells are shown in FIG. 5A, this is by way of example and not limitation, as a site may include any suitable number of wells (e.g., at least 10, at least 50, at least 100, at least 250, between 50 and 1000 wells).

The system 500 further includes at least one emissions sensor 522. The emissions sensor 522 is configured to obtain a measure of one or more characteristics of landfill gas emitted from the landfill 502. For example, as shown in FIG. 5A, in some instances, at least some landfill gas 518A, 518B penetrates a surface 530 of the landfill 502 and is emitted into the atmosphere. The landfill gas 518A, 518B being emitted into the atmosphere comprises harmful greenhouse gasses such as methane and carbon dioxide. The emissions sensor 522 is configured to measure one or more characteristics of the emitted gas 518A, 518B, and extraction of landfill gas via the plurality of wells 508A-C may be controlled based at least in part of the measured characteristics.

The emissions sensor 522 measures gas emissions characteristics of a sample obtained from above the surface of the landfill. Above the surface of the landfill comprises above ground whereas below the surface of the landfill comprises below ground. In particular above the surface of the landfill is atmosphere such that obtaining a sample from above the surface of the landfill comprises obtaining a sample of ambient air. The sample may be obtained from any suitable height above the surface of the landfill. The inventors have recognized that it is advantageous to obtain samples close to the surface of the landfill in certain locations. For example, in some embodiments, the emissions sensor 522 may be configured to obtain measurements of one or more gas emissions characteristics of a sample obtained at a height greater than or equal to 5 cm above the surface of the landfill and less than or equal to 10 cm above the surface of the landfill. For example, in some embodiments, the emissions sensor 522 is configured to obtain measurements of one or more gas emissions characteristics of a sample obtained at a height that is approximately 5 cm above the surface of the landfill, approximately 6 cm above the surface of the landfill, approximately 7 cm above the surface of the landfill, approximately 8 cm above the surface of the landfill, approximately 9 cm above the surface of the landfill, or approximately 10 cm above the surface of the landfill. This configuration whereby samples are obtained close to the surface of the landfill may be advantageous at penetration points in the landfill (e.g., points where there is a gas collection well, vacuum riser, or other piping which extends from below the surface of the landfill, through, and above the surface of the landfill). By contrast, the inventors have recognized that it may be advantageous to obtain samples to be measured by the gas emissions sensor 522 at a higher elevation (e.g., greater than 10 cm, 1 meter or greater, 2 meters or greater, etc.) at other locations (e.g., locations not having a penetration point).

In some embodiments, the emissions sensor 522 may be disposed at approximately the same height above the surface of the landfill at which the sample measured by the emissions sensor 522 is obtained. In some embodiments, the emissions sensor 522 may be disposed at a different height, including above or below the surface of the landfill, and the sample measured by the emissions sensor 522 may be obtained via piping having a port disposed at the height above the surface of the landfill at which it is desired to test emissions.

The emissions sensor 522 may be any suitable sensor for measuring one or more emissions characteristics. For example, in some embodiments, the emissions sensor 522 comprises at least one optical sensor such as a spectrometer, an infrared sensor, a camera, a hyperspectral imaging device, a light detection and ranging (LiDAR) sensor, any other gas composition sensor described herein, etc. In some embodiments, the emissions sensor 522 may obtain information regarding weather, atmosphere, wind, geolocation, and/or any other suitable information. In some embodiments, the optical emissions sensor 522 is an aerial sensor. The aerial sensor may be mounted to a moving object, such as an aerial vehicle (e.g., a helicopter, drone, plane, etc.). In some embodiments, the moving object is autonomous. Such aerial sensors allow for monitoring of wide-spread areas and/or areas which may be difficult to access by ground. In some embodiments, the emissions sensor additionally or alternatively comprises at least one ground-based sensor, such as a spectrometer.

In some embodiments, the emissions sensor 522 is configured to measure a mass flow rate (mass per unit time) of a greenhouse gas in landfill gas 518A, 518B being emitted from the landfill 502. For example, the emissions sensor 522 may be configured to measure a mass flow rate of methane being emitted from the landfill 502. In some embodiments, the emissions sensor 522 is configured to measure a mass flow rate of carbon dioxide being emitted from the landfill 502. In some embodiments, the emissions sensor 522 may additionally or alternatively be configured to obtain a measure of a concentration of a greenhouse gas in landfill gas 518A, 518B emitted from the landfill 502 measured at a fixed distance above the surface 530 of the landfill 502. For example, the emissions sensor 522 may be configured to obtain a concentration of methane measured a fixed distance (e.g., 1 meter) above the surface 530 of the landfill 502. In some embodiments, the emissions sensor 522 is configured to obtain a concentration of carbon dioxide measured a fixed distance (e.g., 1 meter) above the surface 530 of the landfill 502. As described herein, the emissions measurements may be used to control flow rates of one or more of the plurality of gas extraction wells 508A-C. In some embodiments, the emissions sensor 522 may be further configured to obtain location data identifying a location from which an emissions measurement was obtained. In some embodiments, the emissions sensor 522 is further configured to obtain a visual image of the location from which an emissions measurement was obtained.

For example, the emissions sensor 522 may be in communication with the multi-well controller 516 and/or one or more of the local controllers 510A-C. The emissions sensor

522 may communicate emissions measurements to the multi-well controller 516 and/or the one or more of the local controllers 510A-C which may be used to determine whether and/or how to adjust flow rates of one or more of the plurality of gas extraction wells 508A-C. In some embodiments, the emissions sensor 522 wirelessly communicates with the one or more controllers (e.g., via cloud communication or other network communication). In some embodiments, the emissions sensor 522 is in wired communication with the one or more controllers. Although not shown in FIG. 5A, in some embodiments, the emissions sensor 522 is in communication with one or more other devices, for example, a reporting interface as described herein.

The multi-well controller 516 and/or one or more of the local controllers 510A-C may send instructions to the emissions sensor 522 for controlling operation of the emissions sensor 522. For example, in some embodiments, the instructions may direct the emissions sensor 522 to obtain a measurement. In some embodiments, the instructions may direct the emissions sensor 522 to begin obtaining repeated measurements at a particular frequency (e.g., at least once per month, at least once per week, at least once per day, at least once per hour). In other embodiments, the emissions sensor 522 may be configured to obtain measurements autonomously, without receiving instructions from the one or more controllers.

In some embodiments, the emissions sensor 522 may be configured to detect the presence of a gas (e.g., a greenhouse gas such as methane, carbon dioxide, hydrogen sulfide, etc.) in a region. In some embodiments, the emissions sensor 522 may be configured to detect a mixture of gasses in a region. Detection of the presence of a greenhouse gas may facilitate detection of leaks of landfill gas that has penetrated the surface 530 of the landfill 502. The control system 500 may be configured to take corrective action in response to identification of a landfill gas leak. For example, in some embodiments, the control system 500 may transmit an alert in response to identification of a landfill gas leak. In some embodiments, the control system 500 may adjust flow rates of one or more of the plurality of wells 508A-C in response to identification of a landfill gas leak, for example, according to the techniques described herein.

The emissions sensor 522 may comprise a power source for powering the emissions sensor. In some embodiments, the power source comprises a battery. In some embodiments, the power source comprises an AC power source. In some embodiments, the emissions sensor 522 may additionally or alternatively be solar powered.

As described herein, the emissions sensor 522 may be configured to obtain emissions characteristics from a region of the landfill 502. In some embodiments, the region monitored by the emissions sensor 522 comprises a single gas extraction well. In some embodiments, the region monitored by the emissions sensor 522 comprises multiple gas extraction wells. The region monitored by the emissions sensor 522 may be a portion of the landfill 502 (e.g., 20%, 33%, 50%, more than 50%, etc.) or the entirety of the landfill 502. Although only one emissions sensor 522 is illustrated in FIG. 5A, it should be appreciated that the control system 500 may comprise multiple emissions sensors in some embodiments.

In some embodiments, the gas collection system 512 includes a vacuum source 520. The vacuum 520 generates a negative pressure differential between the gas collection system 512 and the landfill 502. The negative pressure differential causes the landfill gas 506A-C to flow from the landfill 502 to the gas collection system 512 through the wells 508A-C. The vacuum source 520 may be variable. For example, in some embodiments, the vacuum applied to the gas extraction wells 508A-C may be adjusted based on emissions characteristics measurements obtained by the at least one emissions sensor 522 by adjusting the variable vacuum 520.

In some embodiments, the gas collection system 512 may comprise an additional location where extracted landfill gas is stored, and/or where the extracted landfill gas may be treated (e.g., by removing impurities) before being supplied to the power plant 514. In some embodiments, the gas collection system 512 may include a processing plant where the collected landfill gas is treated. The landfill gas may be treated to modify concentration(s) of one or more of the gases that make up the landfill gas. In some embodiments, the processing plant may be configured to treat the landfill gas to increase an energy content of the landfill gas. For example, the landfill gas may include methane, oxygen, carbon dioxide, hydrogen sulfide, nitrogen, and other gases. The processing plant may reduce the concentration(s) of one or more non-methane gases to increase energy content (e.g., energy density) of the collected landfill gas. The power plant 514 may be configured to generate electricity using the extracted landfill gas. For example, the power plant 514 may burn the extracted landfill gas to turn a rotor of an electricity generator or a turbine. Although the gas collection system 512 and the power plant 514 are shown separately in FIG. 5A, in some embodiments, the gas collection system 512 and the power plant 514 may be components of a single system.

The power plant 514 includes one or more sensors 514A which the power plant may use to determine one or more measures of quality of extracted landfill gas. The landfill gas may be collected from multiple wells at the landfill 502, such as wells 508A-C. In some embodiments, the sensor(s) 514A may be configured to measure an energy content (e.g., energy density) of collected landfill gas. For example, the sensor(s) 514A may include a gas chromatograph that measures concentrations of one or more of the gases that make up the collected landfill gas (one or more of oxygen, nitrogen, methane, carbon dioxide, hydrogen sulfide, for example).

In some embodiments, each of the local controllers 510A-C controls extraction of landfill gas locally at a respective one of the gas extraction wells 508A-C. Each of the local controllers 510A-C may be configured to operate to control extraction of landfill gas according to a local control method, for example, to achieve a target of energy content of extracted landfill gas, composition of extracted landfill gas, flow rate of gas extraction, regulatory requirements, and/or other parameters. In some embodiments, the controller may be configured to control a flow rate of landfill gas being extracted from the well. For example, the controller may be configured to control a position of a valve disposed in well-piping of the well which in turn modulates a flow rate of landfill gas being extracted from the well. Example operation of a controller is described above with reference to FIGS. 1-3. A local controller may also be referred to herein as an "in-situ control mechanism."

In some embodiments, the multi-well controller 516 controls extraction of landfill gas globally across multiple gas extraction wells, including the gas extraction wells 508A-C. In some embodiments, the multi-well controller 516 may be configured to concurrently control extraction of landfill gas from multiple wells. Concurrently controlling extraction of landfill gas from multiple wells may involve causing an adjustment in a valve at a first well during a first time period, and in a valve at a second well during a second time period that at least partially overlaps with the first time period. In some embodiments, the multi-well controller 516 may be configured to concurrently control extraction of landfill gas from multiple wells while a respective local controller 510A-C controls extraction of landfill gas from a respective gas extraction well according to a local control method.

In some embodiments, each of the controllers 510A-C may include a valve whose position controls a flow rate of landfill gas being extracted from a respective well. The multi-well controller 516 may control the positions of the valves of the controllers 510A-C to control, globally, flow rates of landfill gas being extracted from the wells 508A-C. In some embodiments, the multi-well controller 516 may be configured to control the positions of the valves of the controllers 510A-C by transmitting a control variable to each of the controllers 510A-C. Each of the controllers 510A-C uses the control variable to determine an adjustment to make to the degree that the valve being controlled by the controller is open. In some embodiments, the multi-well controller 516 may transmit a valve position adjustment to each of the controllers 510A-C. The controllers 510A-C may be configured to apply the received adjustment to the respective valves. In other embodiments, the local controllers 510A-C may be configured to determine and apply control adjustments to the positions of the respective valves without input from the multi-well controller 516.

In some embodiments, the multi-well controller 516 may comprise at least one computer. The at least one computer may communicate with the controllers 510A-C. In some embodiments, the multi-well controller 516 may be configured to periodically transmit one or more control inputs to the controllers 510A-C. In some embodiments, the multi-well controller 516 may wirelessly transmit the control input(s) to the controllers 510A-C. In some embodiments, the multi-well controller 516 may communicate with the controllers 510A-C over wired connections.

Figure 5B:
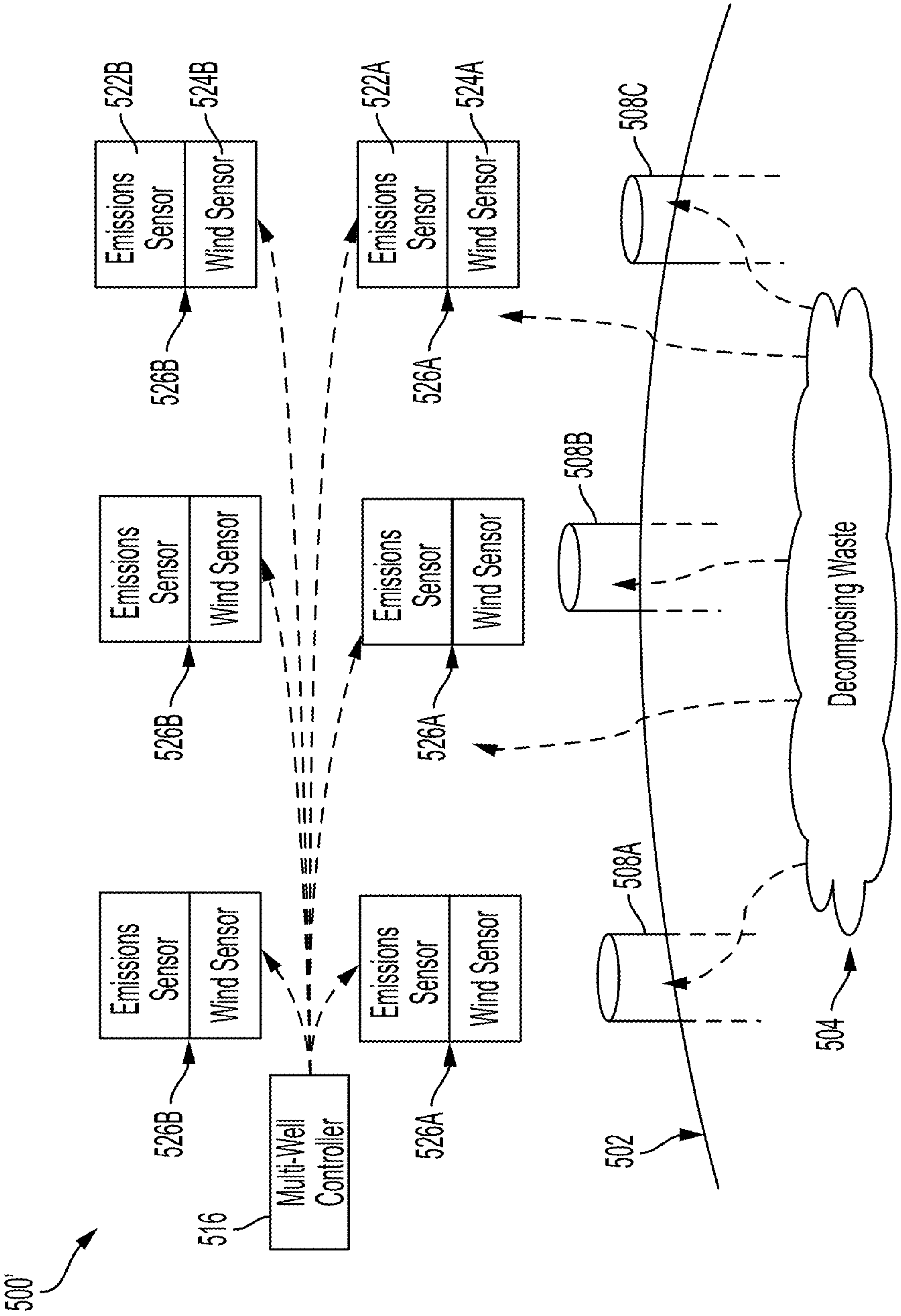
FIG. 5B is a block diagram illustrating further aspects of the example gas extraction system of FIG. 5A, according to some embodiments.

FIG. 5B is a block diagram illustrating further aspects of the example gas extraction system of FIG. 5A, according to some embodiments. As shown in FIG. 5B, in some embodiments, the control system 500' may comprise multiple emissions sensors 522A, 522B. The emissions sensors 522A, 522B may be of the type described herein with respect to emissions sensor 522 in FIG. 5A. For example, the emissions sensors 522A, 522B may be configured to measure a concentration of a gas (e.g., a gas emitted from the landfill as a result of the decomposing waste 504). In some embodiments, the gas comprises a greenhouse gas such as methane, carbon dioxide, hydrogen sulfide, nitrogen and/or benzene.

Each emissions sensor 522A, 522B may be disposed at a height above the surface of the landfill 502. In some embodiments, a first set of emissions sensors 522A are disposed at a same (or substantially the same) first height above the surface of the landfill 502. In some embodiments, the emissions sensors 522A are disposed at different known heights. In some embodiments, a second set of emissions sensors 522B are disposed at respective second heights above the landfill, the second height being greater than the first height, as shown in FIG. 5B. The respective second heights may be the substantially the same, the same, or different. Accordingly, emissions measurements (e.g., a measure of a concentration of a greenhouse gas) may be obtained at multiple locations and/or multiple heights.

In the illustrated embodiment of FIG. 5B, three gas extraction wells 508A-C are shown. In some embodiments, there may be an emissions sensor 522A, 522B disposed above each respective gas extraction well 508A-C. In some embodiments, one or more emissions sensors 522A, 522B may alternatively or additionally be disposed between gas extraction wells 508A-C. For example, one or more emissions sensors 522A, 522B may be disposed at least a minimum distance (e.g., in a direction perpendicular to the height above the surface of the landfill) away from one or more of the gas extraction wells 508A-C. In some embodiments, one or more emissions sensors may be disposed no more than a maximum distance (e.g., in a direction perpendicular to the height above the surface of the landfill) away from one or more of the gas extraction wells 508A-C.

The inventors have recognized that ambient air in a region directly above one of the one or more gas extraction wells 508A-C may contain a higher concentration of greenhouse gasses than ambient air in the region of the landfill on average. Accordingly, obtaining emissions measurements from emissions sensors disposed between the gas extraction wells 508A-C may provide more accurate emissions measurements (e.g., measurements that are more characteristic of the average concentration of a particular greenhouse gas in the region above the surface of the landfill).

In some embodiments, the one or more emissions sensors 522A, 522B may be calibrated to ensure accurate emissions measurements. For example, the calibration techniques described in U.S. patent Ser. No. 11/067,549 entitled "DESIGNS FOR ENHANCED RELIABILITY AND CALIBRATION OF LANDFILL GAS MEASUREMENT AND CONTROL DEVICES" filed on Apr. 4, 2017, and issued on Jul. 20, 2021, which is incorporated by reference herein in its entirety, may be used. For example, in some embodiments, multiple calibration gasses (e.g., a zero and a span) may be used. The inventors have appreciated that ambient air may, in some embodiments, not be a suitable gas for calibrating the emissions sensor given that ambient air may be the target sample to be measured by the emissions sensor. Accordingly, the emissions sensors may, in some embodiments, be calibrated with one or more (e.g., two) calibration gasses other than ambient air.

In some embodiments, one or more of the emissions sensors 522A, 522B may be part of a sensor system 526A, 526B. The sensor system 526A, 526B may comprise additional sensors for measuring characteristics of the ambient air at the height of the emissions sensors 522A, 522B above the surface of the landfill.

In the illustrated embodiment of FIG. 5B, the sensor systems 526A, 526B further comprise wind sensors 524A, 524B. The wind sensors 524A, 524B may measure one or more characteristics of wind in the region of the landfill (e.g., wind speed, wind direction). Any suitable type of wind sensor may be implemented (e.g., an anemometer comprising an ultrasonic transducer such as an ultrasonic transducer anemometer manufactured by Taidacent or Gill Instruments, a sonic anemometer such as a sonic anemometer manufactured by Davis Instruments).

In some embodiments, the sensor systems 526A, 526B may comprise one or more barometric pressure sensors for measuring a pressure of ambient air above the surface of the landfill. In some embodiments, the sensor systems 526A, 526B may comprise one or more temperature sensors for measuring a temperature of ambient air above the surface of the landfill. In some embodiments, the sensor systems 526A, 526B may comprise one or more humidity sensors for measuring a humidity of ambient air above the surface of the landfill. The inventors have recognized that the humidity and temperature of ambient air above the surface of the landfill may impact the percent of water vapor in the ambient air and therefore may impact the concentration of greenhouse gases in the ambient air.

The inventors have recognized that implementing multiple emissions sensors in the control system 500' enables obtaining a measure of gas emissions concentration and/or mass flow rate over an entire region of the landfill. In particular, measurements from each of the sensor systems 526A, 526B may be aggregated to obtain an estimate of greenhouse gas emissions (e.g., a concentration and/or mass flow rate of a greenhouse gas) above the surface of the landfill in a region which may comprise multiple gas extraction wells 508A-C.

The sensor systems 526A, 526B may communicate with multi-well controller 516 (e.g., to transmit instructions from the multi-well controller 516 to sensor systems 526A, 526B and/or to communicate measurements obtained by the sensor systems 526A, 526B to multi-well controller 516). In some embodiments, the multi-well controller 516 is in wired communication with one or more of the sensor systems 526A, 526B. In some embodiments, the multi-well controller 516 wirelessly communicates with one or more of the sensor systems 526A, 526B (e.g., via cellular or radio communications, over Bluetooth, etc.). In some embodiments, the multi-well controller 516 may be configured to use measurements obtained by the sensor systems 526A, 526B in computations (e.g., computations performed over the cloud), as described herein.

b. Example Techniques for Landfill Gas Emissions Monitoring and Control

As described herein, the inventors have recognized that techniques which base control of landfill gas extraction directly on measurements of emissions characteristics may provide for a more efficient reduction greenhouse gas emissions from a landfill while also maintaining the quality of extracted landfill gas. Examples techniques for landfill gas emissions monitoring and control are provided herein, and may be implemented using the control system 500 shown in FIG. 5A, for example. In some embodiments, the emissions-based techniques for landfill gas extraction control may be performed autonomously without the need for manual intervention.

Figure 6A:
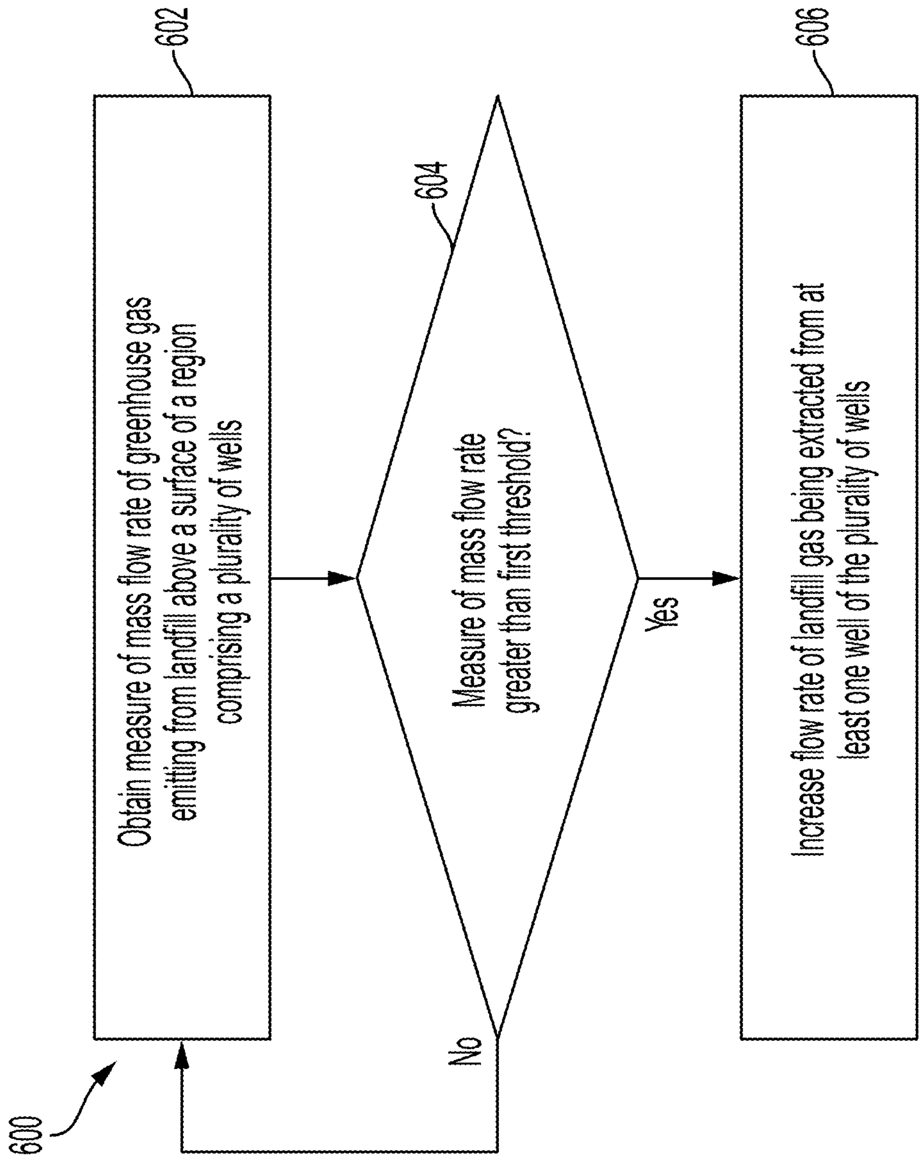
FIG. 6A is a flowchart of an illustrative process for emissions-based control of landfill gas extraction, according to some embodiments.

For example, FIG. 6A is a flowchart of an illustrative process for emissions-based control of landfill gas extraction, according to some embodiments. Process 600 uses a measure of mass flow rate, or mass per unit time, of a greenhouse gas to control a flow rate of at least one well in a landfill comprising a plurality of wells.

Process 600 begins at act 602 where a measure of mass flow rate of a greenhouse gas being emitted from the landfill is obtained. The measure of mass flow rate may be obtained by one or more emissions sensors, for example, emissions sensor 522 described herein. The greenhouse gas may comprise any greenhouse gas desired to be monitored, for example, methane, carbon dioxide, nitrogen, hydrogen sulfide, any other gas present in the emitted landfill gas and/or a combination thereof.

The measure of mass flow rate may be obtained above a surface of the landfill using the one or more emissions sensors. In some embodiments, the measure of mass flow rate is obtained for a region comprising a plurality of wells. In some embodiments, the plurality of wells comprises a portion of wells in the landfill (e.g., 20%, 50% of wells, etc.). In other embodiments, the plurality of wells includes all of the gas extraction wells disposed in the landfill. In some embodiments, the measure of mass flow rate is obtained for a region comprising only a single well.

In some embodiments, one or more sensors (e.g., the emissions sensor 522) may be configured to obtain a flow rate of a greenhouse gas being emitted from the landfill and a density of the greenhouse gas in the region above the surface of the landfill. The measure of mass flow rate may be obtained by multiply the flow rate of the greenhouse gas by the density of the greenhouse gas.

At act 604, the measure of mass flow rate obtained at act 602 is compared to a first threshold to determine whether the measure of mass flow rate is greater than the first threshold. As described herein, the inventors have appreciated that it may be desirable to limit the mass flow rate of greenhouse gasses being emitted from a landfill. Thus, the process 600 may include determining whether a mass flow rate of a particular greenhouse gas exceeds a threshold.

In some embodiments, where the greenhouse gas comprises methane, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises carbon dioxide, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold or any other suitable threshold In some embodiments, where the greenhouse gas comprises nitrogen, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises hydrogen sulfide, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises a combination of constituent gases present in landfill gas (e.g., methane, carbon dioxide, nitrogen, benzene and/or hydrogen sulfide), the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold.

If, at act 604, it is determined that the measure of mass flow rate of the greenhouse gas obtained at act 602 is not greater than (e.g., less than, less than or equal to) the first threshold, no changes may be made to the flow rate of landfill gas being extracted from the plurality of wells (e.g., a position of a valve of the at least one well may be maintained). The process 600 may return through the no branch to act 602 where another measure of mass flow rate is obtained. Alternatively, the process 600 may end.

If, at act 604, it is determined that the measure of mass flow rate of the greenhouse gas obtained at act 602 is greater than the first threshold, the process 600 may proceed through the yes branch to act 606. At act 606, a flow rate of landfill gas being extracted from at least one well of the plurality of wells may be increased. When a flow rate of landfill gas extracted from the landfill via a well is too low, decomposition processes in the landfill generate landfill gas at a rate higher than the rate of landfill gas extraction allowing excess landfill gas accumulates at the bottom of the landfill. The accumulated landfill gas rises to the surface of the landfill and emits into the atmosphere. Increasing the flow rate of landfill gas being extracted from the at least one gas extraction well equilibrates the rate of landfill gas extraction and the rate of landfill gas production to prevent excess landfill gas from accumulating and penetrating the surface of the landfill.

In some embodiments, increasing a flow rate of landfill gas being extracted from the at least one well comprises increasing a degree to which a valve of the at least one well is open. As described herein, a vacuum may be applied to one or more of a plurality of gas extraction wells to generate a negative pressure in well piping. The negative pressure pulls landfill gas from the landfill into the well piping and through the well to a collection point. A valve may be disposed in the well piping to control the pressure applied to a portion of the well piping through which landfill gas can enter (referred to as a portion of the well piping upstream of the valve). A portion of well piping between the vacuum source and the valve may be referred to as the portion of well piping downstream of the valve. Increasing a degree to which the valve is open increases pressure upstream of the valve while lowering pressure downstream of the valve. The increased pressure upstream of the valve pulls more landfill gas into the well piping thereby increasing a flow rate of landfill gas being extracted by the at least one well. In some embodiments, the flow rate of landfill gas extraction may additionally or alternatively be adjusted by increasing or decreasing a vacuum applied by the control system.

As described herein, at act 606, the flow rate of landfill gas being extracted from at least one well may be adjusted. In some embodiments, act 606 comprises adjusting the flow rate of a single well. In some embodiments, act 606 comprises adjusting the flow rate of multiple wells (e.g., a portion of or all of the wells in the region from which the emissions measurement was obtained, a portion or all of the wells in the landfill). Techniques for selecting which wells to adjust in response to determining that the measure of mass flow rate obtained at act 604 is greater than the first threshold are further described herein.

In some embodiments, an error check may be performed before increasing the flow rate of the at least one well at act 606. For example, before increasing the flow rate of the at least one well, it may be determined that it is safe to do so, for example, by checking a concentration of the landfill gas being extracted from the at least one well in comparison to a target and/or one or more thresholds, checking a pressure of the well piping downstream and/or upstream of the valve in comparison to a target and/or one or more thresholds, checking a liquid level in the at least one well in comparison to a target and/or one or more thresholds, etc. Further aspects of techniques for performing an error check before increasing the flow rate of the at least one well are described herein.

Subsequent to act 606, the process may return to act 602 where another measure of mass flow rate of the greenhouse gas is obtained. Alternatively, the process 600 may end. The process 600 may be initiated and repeated in response to a user command, in some embodiments. In some embodiments, the process may be initiated and repeated autonomously. For example, the process 600 may be performed at least once per month, at least one per week, at least once per day, at least once per hour, etc.

Figure 6B:
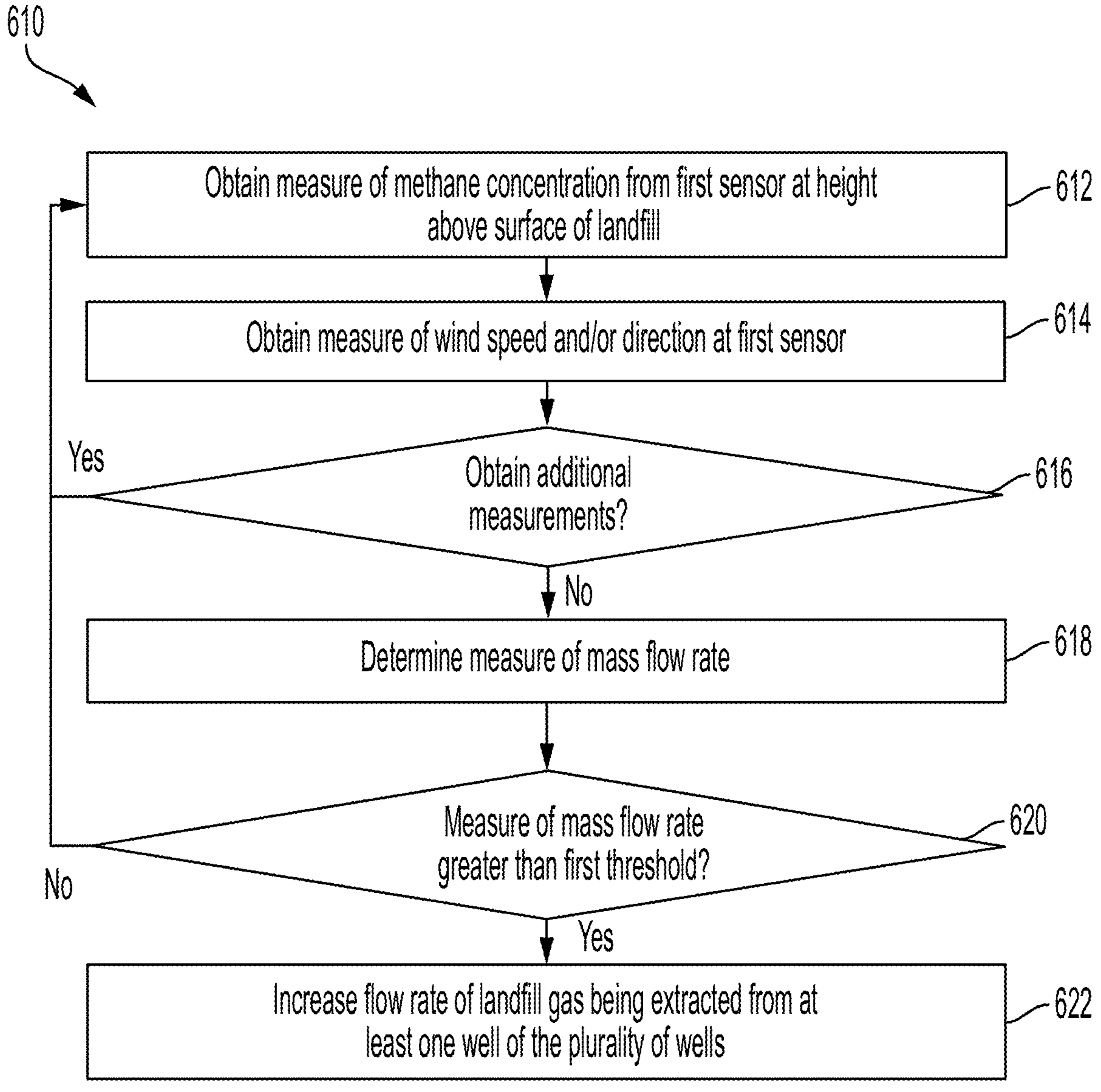
FIG. 6B is a flowchart of an illustrative process for emissions-based control of landfill gas extraction using a measure of mass flow rate, according to some embodiments.
Figure 6C:
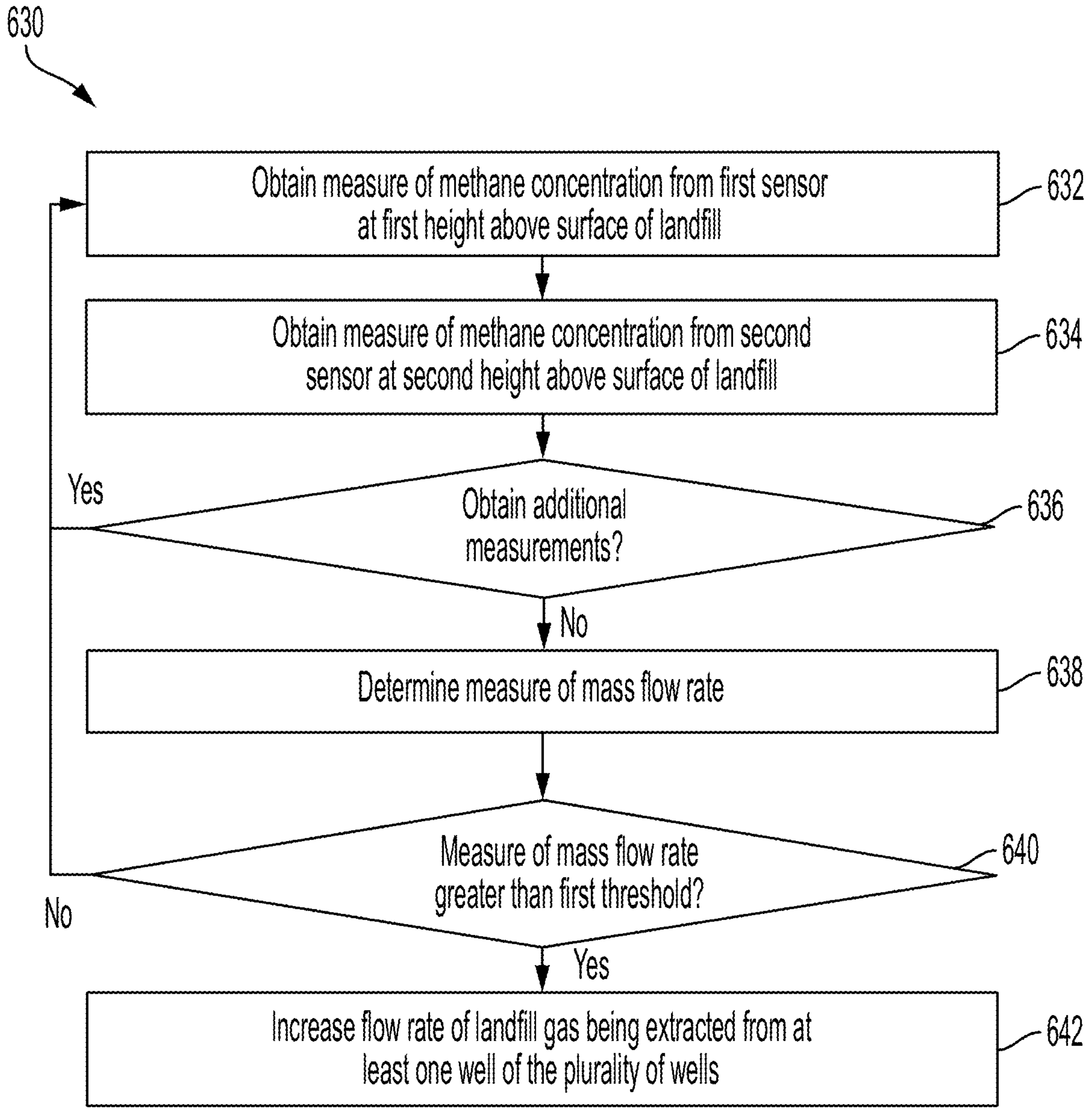
FIG. 6C is a flowchart of another illustrative process for emissions-based control of landfill gas extraction using a measure of mass flow rate, according to some embodiments.

FIGS. 6B-6C illustrate flowcharts of illustrative processes for emissions-based control of landfill gas extraction, according to some embodiments. In particular, FIGS. 6B-6C illustrate example processes for controlling landfill gas extraction based on multiple emissions measurements obtained by a plurality of emissions sensors disposed in the region of the landfill. The processes 610 and 630 shown in FIGS. 6B-6C may be performed using the sensor systems 524A, 524B shown in FIG. 5B, for example.

FIG. 6B is a flowchart of an illustrative process for emissions-based control of landfill gas extraction using a measure of mass flow rate across a landfill, according to some embodiments. Process 610 may begin at act 612, where a measure of methane concentration is obtained from a first sensor at a height above a surface of the landfill. For example, a first emissions sensor may be disposed above a surface of a region of the landfill. The first emissions sensor may be configured to obtain a concentration of methane from a sample of ambient air in the region of the landfill.

Although the example processes 610 and 630 are described herein with respect to methane, it should be understood that the processes 610 and 630 could be performed for other greenhouse gasses such as carbon dioxide, hydrogen sulfide, nitrogen and/or benzene.

At act 614, a measure of wind speed and/or wind direction may be obtained. For example, the measure of wind speed and/or direction may be obtained using one of wind sensors 524A, 524B described herein with respect to FIG. 5B. In some embodiments, only a measure of wind speed or wind direction is obtained at act 614. In other embodiments, a measure of both wind speed and direction is obtained.

At act 616, it may be determined whether to obtain additional measurements of methane concentration and wind speed and/or direction. For example, as described herein, a landfill may have multiple sensor systems (e.g., comprising an emissions sensor and a wind sensor) disposed at different locations in the region of the landfill. Each of the sensor systems may be disposed at a same height so that measurements obtained by each sensor system may be compared with each other. Acts 612-614 may be performed for a first sensor system of a plurality of sensor systems disposed in a region of a landfill and thereafter repeated for one or more of the remaining sensor systems disposed in the region of the landfill. Accordingly, if there are additional measurements to be obtained from the not yet sampled sensor systems, the process 610 may return through the yes branch to act 612. Otherwise, the process may proceed through the no branch to act 618, At act 618, a measure of mass flow rate of methane may be determined based on the measures of methane concentration and wind speed and/or direction obtained at acts 612-614. In instances where multiple measures of methane concentration and wind speed and/or direction were obtained at acts 612-614, the measure of mass flow rate may be considered to represent an aggregate mass flow rate from a region of the landfill comprising the sensor systems from which measurements were obtained.

For example for a fixed height (above the surface of the landfill) and known area (of the region of the landfill being measured, a measure of aggregate mass flow rate of a greenhouse gas for the region of the landfill may be determined based on measurements of gas concentration and wind speed and/or direction obtained at the fixed height. In particular, a measure of greenhouse gas concentration at a fixed distance above the surface may be multiplied by a wind speed taken at the fixed distance to obtain a measure of the flow rate of the greenhouse gas at the point the measurements were obtained. Factoring in the wind direction allows for determining the amount and direction of the greenhouse gas flow rate. With multiple measurements of gas concentration and wind speed and/or direction taken at different locations in the landfill, an average flow rate of the greenhouse gas for the landfill may be obtained by summing the flow rate vectors (where wind direction is considered) and dividing the total by the number of measurements pairs (concentration and wind characteristic) obtained. The aggregate mass flow rate may be obtained by factoring in the area over which the measurements were obtained (e.g., by dividing the measure of aggregate flow rate by the total area considered).

In some embodiments, one or more additional characteristics may be taken into account when determining the measure of mass flow rate at act 618. For example, in some embodiments, one or more measures of ambient air pressure, ambient air humidity, and/or ambient air temperature may be obtained and used to further refine the determination of the measure of mass flow rate at act 618.

At act 620, it is determined whether the measure of mass flow rate is greater than a first threshold. For example, act 620 may be performed in the same manner as act 604 described herein with respect to process 600. If it is determined, at act 620, that the measure of mass flow rate is not greater than the first threshold, the process 610 may proceed through the no branch to act 612, where additional measurements of methane concentration are obtained. If it is determined, at act 620, that the measure of mass flow rate is greater than the first threshold, the process 610 may proceed through the yes branch to act 622.

At act 622, a flow rate of landfill gas being extracted from at least one gas extraction well of a plurality of gas extraction wells in the region of the landfill may be increased. For example, act 620 may be performed in the same manner as act 606 described herein with respect to process 600.

FIG. 6C is a flowchart of another illustrative process for emissions-based control of landfill gas extraction using a measure of mass flow rate across a landfill, according to some embodiments. Process 630 may begin at act 632, where a measure of methane concentration in ambient air is obtained from a first sensor at a first height above a surface of the landfill. For example, a first emissions sensor may be disposed above a surface of a region of the landfill. The first emissions sensor may be configured to obtain a concentration of methane from a sample of ambient air in the region of the landfill.

At act 634, a measure of methane concentration in ambient air is obtained from a second sensor at a second height above a surface of the landfill. The second height may be greater than the first height. Accordingly, acts 632-634 provide methane concentration measurements at two different heights above the surface of the landfill. The inventors have recognized that in cases where no wind is present, a measure of wind speed and/or direction may not be helpful in determining a measure of mass flow rate of a greenhouse gas present in ambient air above a surface of the landfill. Instead of measuring a characteristic of wind which may not be present, the dissipation of the greenhouse gas may be determined by measuring the concentration of the greenhouse gas at two different heights above the surface of the landfill.

At act 636, it may be determined whether to obtain additional measurements of methane concentration from the first and second sensors. For example, as described herein, a landfill may have multiple sensor systems (e.g., multiple sets of sensor systems having emissions sensors at first and second heights) disposed at different locations in the region of the landfill. Acts 632-634 may be performed for a first set of sensor systems of a plurality of sets of sensor systems disposed in a region of a landfill and thereafter repeated for one or more of the remaining sets of sensor systems disposed in the region of the landfill. Accordingly, if there are additional measurements to be obtained from the not yet sampled sensor systems, the process 630 may return through the yes branch to act 632. Otherwise, the process may proceed through the no branch to act 638, At act 638, a measure of mass flow rate of methane may be determined based on the measures of methane concentration obtained at acts 632-634 from the first and second sensors. In instances where multiple sets of measures of methane concentration were obtained at acts 632-634, the measure of mass flow rate may be considered to represent an aggregate mass flow rate from a region of the landfill comprising the sensor systems from which measurements were obtained.

The measure of mass flow rate of the greenhouse gas may be determined as described herein with respect to act 618 in process 610, except wind speed and/or direction may not be taken into account. Instead, dissipation of the greenhouse gas in the atmosphere may be approximated by obtaining the measurements of greenhouse gas concentration at two different heights above a point on the landfill surface and considering the difference between the two measurements. The approximated dissipation may than be used in place of wind speed in determining a mass flow rate of the greenhouse gas.

In some embodiments, one or more additional characteristics may be taken into account when determining the measure of mass flow rate at act 638. For example, in some embodiments, one or more measures of ambient air pressure, ambient air humidity, and/or ambient air temperature may be obtained and used to further refine the determination of the measure of mass flow rate at act 638.

At act 640, it is determined whether the measure of mass flow rate is greater than a first threshold. For example, act 640 may be performed in the same manner as act 604 described herein with respect to process 600. If it is determined, at act 640, that the measure of mass flow rate is not greater than the first threshold, the process 630 may proceed through the no branch to act 632, where additional measurements of methane concentration are obtained. If it is determined, at act 640, that the measure of mass flow rate is greater than the first threshold, the process 630 may proceed through the yes branch to act 642.

At act 642, a flow rate of landfill gas being extracted from at least one gas extraction well of a plurality of gas extraction wells in the region of the landfill may be increased. For example, act 642 may be performed in the same manner as act 606 described herein with respect to process 600.

Although processes 610 and 630 are based herein on mass flow rates, in some embodiments, the processes 610 and 630 may be performed based on emissions gas concentrations alone (e.g., an aggregate concentration of methane, carbon dioxide, hydrogen sulfide, nitrogen, and/or benzene). Further aspects of a process for controlling landfill gas extraction based on emissions gas concentration measurements are described herein, for example, with respect to process 700 shown in FIG. 7.

Figure 7:
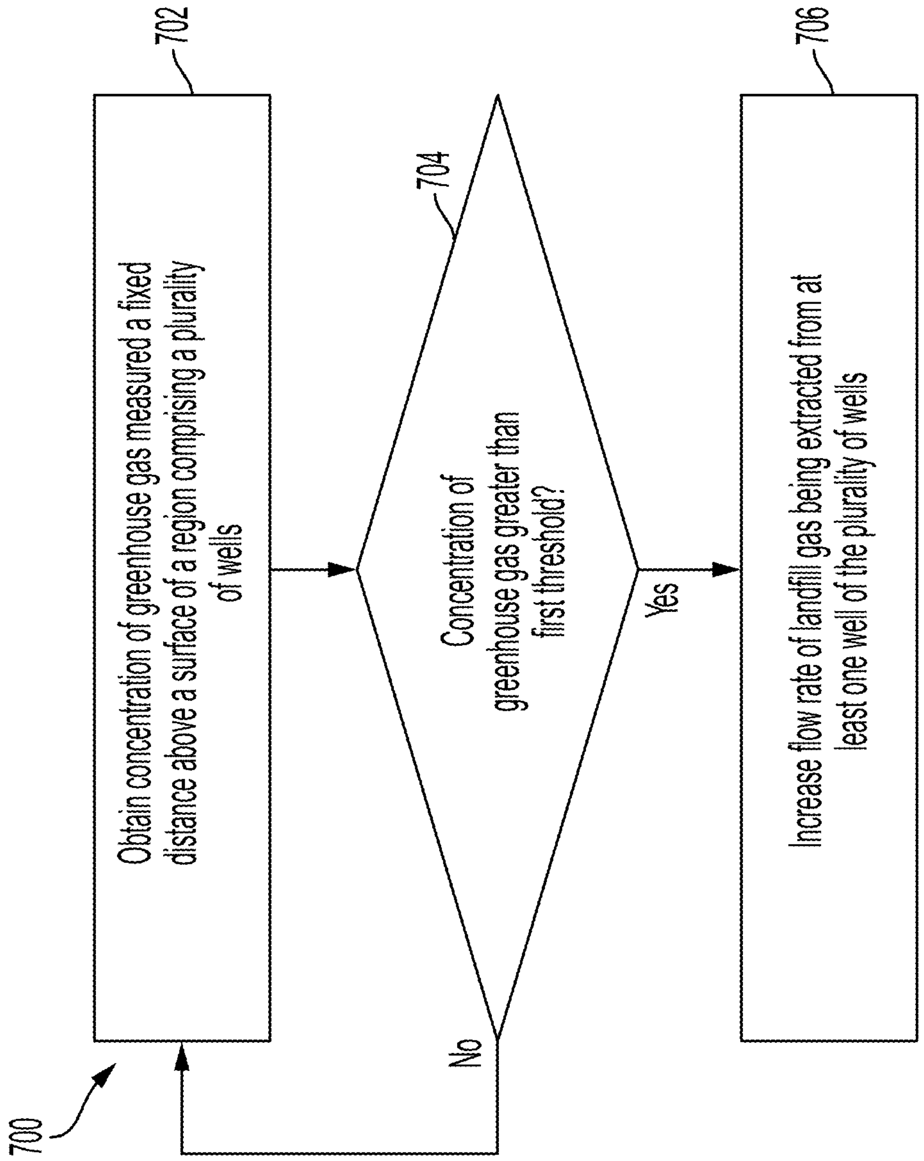
FIG. 7 is a flowchart of another illustrative process for emissions-based control of landfill gas extraction, according to some embodiments.

FIG. 7 is a flowchart of another illustrative process for emissions-based control of landfill gas extraction, according to some embodiments. Process 700 uses a concentration of a greenhouse gas measured a fixed distance about a surface of the landfill to control a flow rate of at least one well in the landfill.

Process 700 begins at act 702 where a measure of a concentration of a greenhouse gas being emitted from the landfill measured a fixed distance above the surface of the landfill is obtained. The measure of greenhouse gas concentration may be obtained by one or more emissions sensors, for example, emissions sensor 522 described herein. The greenhouse gas may comprise any greenhouse gas desired to be monitored, for example, methane, carbon dioxide, nitrogen, hydrogen sulfide, any other gas present in the emitted landfill gas and/or a combination thereof.

As described herein, the measure of greenhouse gas concentration may be obtained at a fixed distance above a surface of the landfill using the one or more emissions sensors. In some embodiments, the measure of greenhouse gas concentration is obtained for a region comprising a plurality of wells. In some embodiments, the plurality of wells comprises a portion of wells in the landfill (e.g., 20%, 50% of wells, etc.). In other embodiments, the plurality of wells includes all of the gas extraction wells disposed in the landfill. In some embodiments, the measure of greenhouse gas concentration is obtained for a region comprising only a single well.

At act 704, the measure of greenhouse gas concentration obtained at act 702 is compared to a first threshold to determine whether the measure of greenhouse gas concentration is greater than the first threshold. As described herein, the inventors have appreciated that it may be desirable to limit the concentration of greenhouse gasses present in the atmosphere at a fixed distance above the surface of the landfill. Thus, the process 700 may include determining whether a concentration of a particular greenhouse gas exceeds a threshold at a particular distance above the landfill surface.

In some embodiments, where the greenhouse gas comprises methane, the first threshold comprises 0 ppm methane, 10 ppm methane, 100 ppm methane, 200 ppm methane, 250 ppm methane, 300 ppm methane, 400 ppm methane, 500 ppm methane, 900 ppm, 1000 ppm methane or any other suitable threshold. In some embodiments, where the greenhouse gas comprises carbon dioxide, the first threshold comprises 0 ppm carbon dioxide, 10 ppm carbon dioxide, 100 ppm carbon dioxide, 200 ppm carbon dioxide, 300 ppm carbon dioxide, 400 ppm carbon dioxide, 500 ppm, 1000 ppm carbon dioxide or any other suitable threshold In some embodiments, where the greenhouse gas comprises nitrogen, the first threshold comprises 0 ppm nitrogen, 10 ppm nitrogen, 100 ppm nitrogen, 200 ppm nitrogen, 300 ppm nitrogen, 400 ppm nitrogen, 500 ppm nitrogen or any other suitable threshold. In some embodiments, where the greenhouse gas comprises hydrogen sulfide, the first threshold comprises 0 ppm hydrogen sulfide, 10 ppm hydrogen sulfide, 100 ppm hydrogen sulfide, 200 ppm hydrogen sulfide, 300 ppm hydrogen sulfide, 400 ppm hydrogen sulfide, 500 ppm hydrogen sulfide or any other suitable threshold. In some embodiments, where the greenhouse gas comprises a combination of constituent gases present in landfill gas (e.g., methane, carbon dioxide, nitrogen, and/or hydrogen sulfide), the first threshold comprises 0 ppm combined gas, 10 ppm combined gas, 100 ppm combined gas, 200 ppm combined gas, 300 ppm combined gas, 400 ppm combined gas, 500 ppm combined gas or any other suitable threshold. In some embodiments, the first threshold comprises a range, for example, between 0 and 500 ppm, between 0 and 1000 ppm, between 10 and 100 ppm, etc.

If, at act 704, it is determined that the measure of greenhouse gas concentration obtained at act 702 is not greater than (e.g., less than, less than or equal to) the first threshold, no changes may be made to the flow rate of landfill gas being extracted from the plurality of wells (e.g., a position of a valve of the at least one well may be maintained). The process 700 may return through the no branch to act 702 where another measure of greenhouse gas concentration is obtained. Alternatively, the process 700 may end.

If, at act 704, it is determined that the measure of greenhouse gas concentration obtained at act 702 is greater than the first threshold, the process 700 may proceed through the yes branch to act 706. At act 706, a flow rate of landfill gas being extracted from at least one well of the plurality of wells may be increased. As described herein, increasing the flow rate of landfill gas being extracted from the at least one gas extraction well equilibrates the rate of landfill gas extraction and the rate of landfill gas production to prevent excess landfill gas from accumulating and penetrating the surface of the landfill.

In some embodiments, increasing a flow rate of landfill gas being extracted from the at least one well comprises increasing a degree to which a valve of the at least one well is open. In some embodiments, the flow rate of landfill gas extraction may additionally or alternatively be adjusted by increasing or decreasing a vacuum applied by the control system. As described herein, in some embodiments, an error check may be performed prior to increasing the flow rate of landfill gas extraction from the at least one well to ensure that increasing the flow rate will not have a negative impact on the landfill gas quality and/or the gas extraction system.

In some embodiments, act 706 comprises adjusting the flow rate of a single well. In some embodiments, act 706 comprises adjusting the flow rate of multiple wells (e.g., a portion of or all of the wells in the region from which the emissions measurement was obtained, a portion or all of the wells in the landfill). Techniques for selecting which wells to adjust in response to determining that the measure of greenhouse gas concentration obtained at act 704 is greater than the first threshold are further described herein.

Subsequent to act 706, the process may return to act 702 where another measure of greenhouse gas concentration is obtained. Alternatively, the process 700 may end. The process 700 may be initiated and repeated in response to a user command, in some embodiments. In some embodiments, the process may be initiated and repeated autonomously. For example, the process 700 may be performed at least once per month, at least one per week, at least once per day, at least once per hour, etc.

c. Well Selection

As described herein, the emissions-based control methods include increasing a flow rate of landfill gas being extracted form at least one well of a plurality of wells in response to determining that an emissions characteristic exceeds a threshold. Techniques for determining which wells of the plurality of wells to adjust are further described herein.

In some embodiments, increasing the flow rate of at least one well comprises increasing the flow rate of all wells in the region from which the emissions characteristic measurement is obtained. In some embodiments, flow rates of gas extraction wells in a buffer region may also be increased. The buffer region may be external to the region from which the emissions characteristic is obtained. In some embodiments, the buffer region comprises an area surrounding the region from which the emissions characteristic measurement is obtained. The size of the buffer region may be described as a percentage of the area of the region from which the emissions characteristic measurement is obtained. For example, in some embodiments, the buffer region has a size that is 10%, 20%, 25%, 30%, 40%, 50%, etc., the size of the region from which the emissions characteristic measurement is obtained.

In some embodiments, the at least one well is selected based on one or more characteristics of the landfill gas extraction well and/or the landfill gas being extracted via the gas extraction well. For example, in some embodiments, selecting which wells of the plurality of wells to adjust is based on a composition of the landfill gas being extracted from the plurality of wells.

Figure 8A:
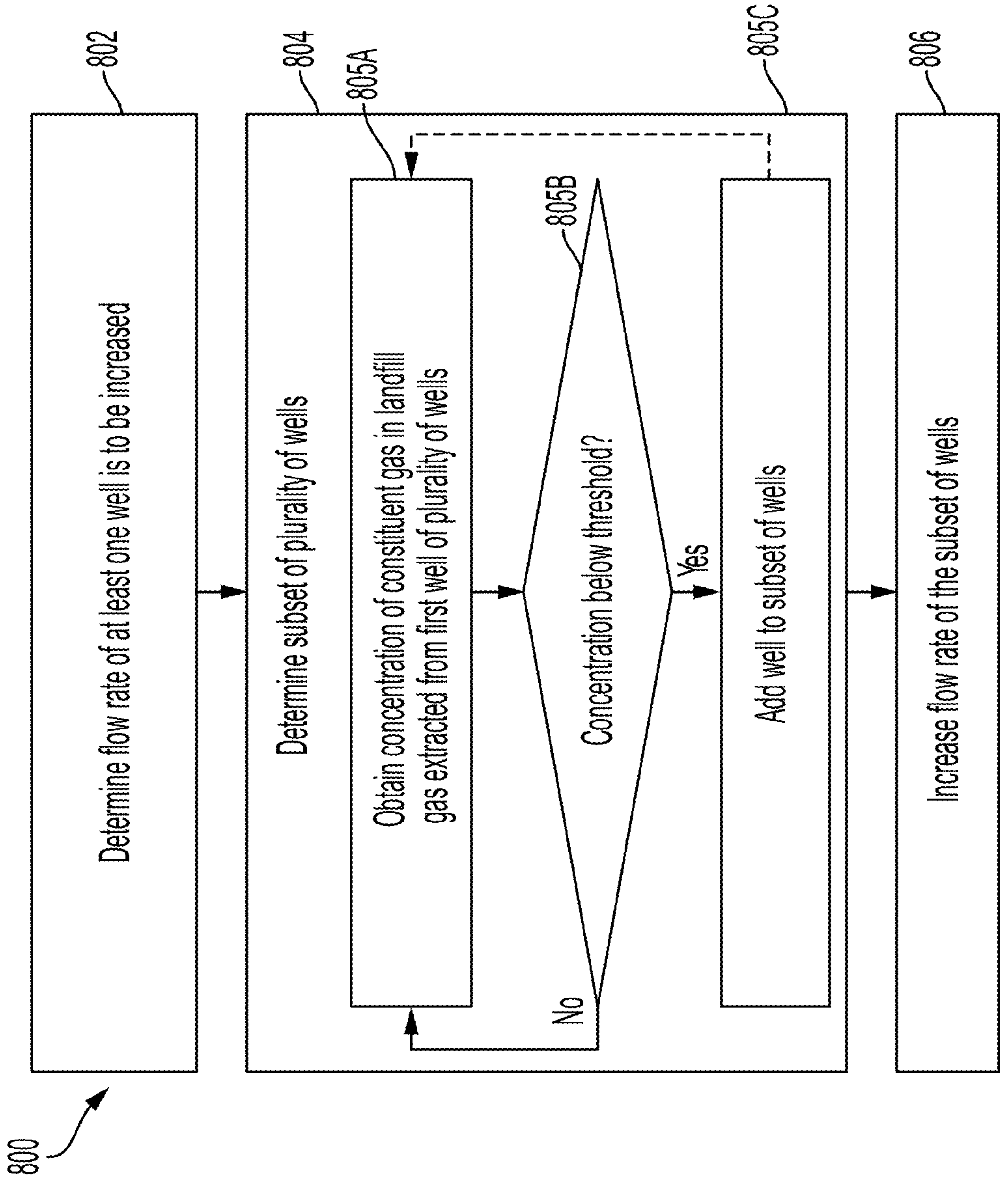
FIG. 8A is an example flowchart of an example process for selecting one or more wells to adjust during emissions-based control of landfill gas extraction, according to some embodiments.
Figure 8B:
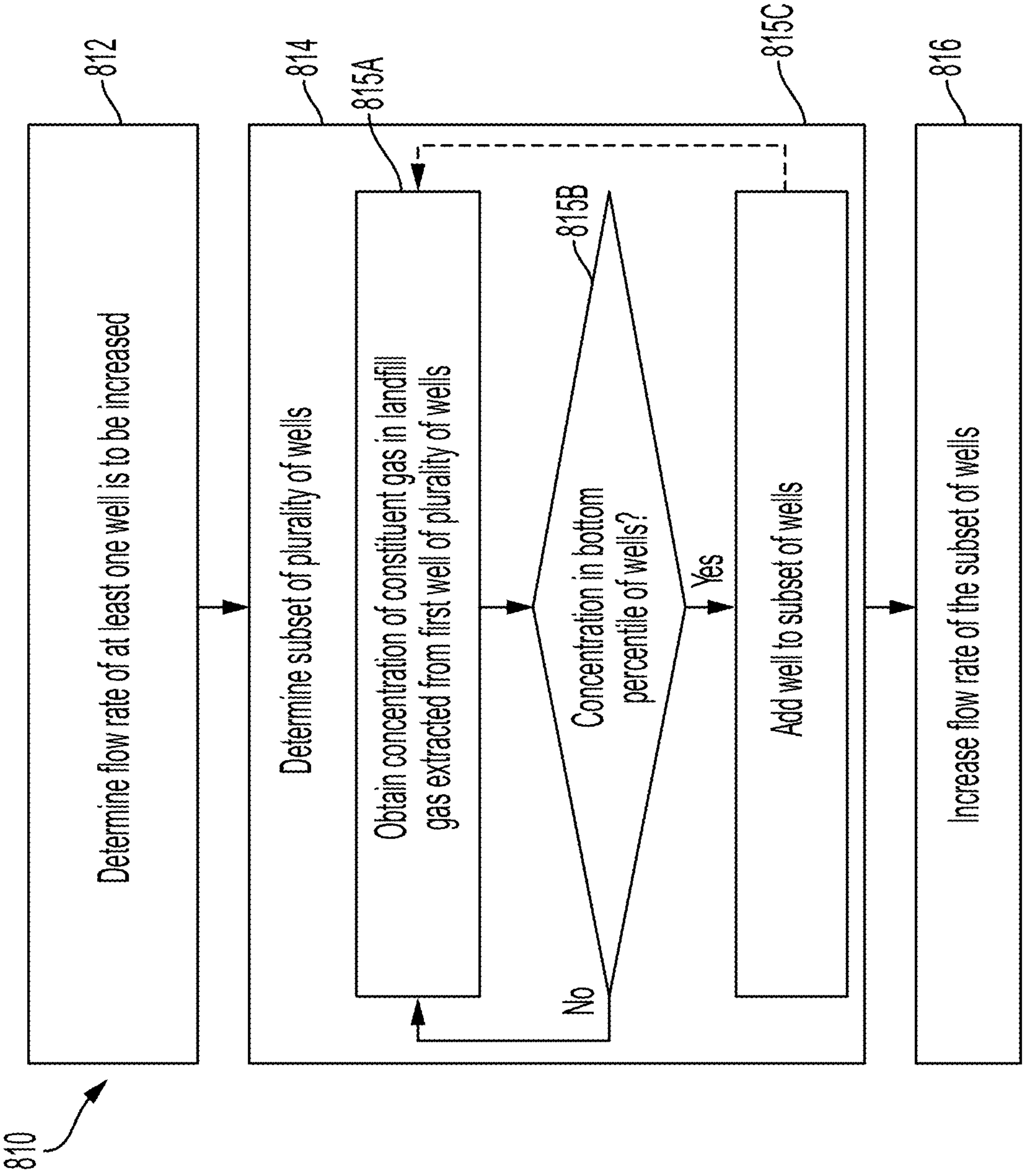
FIG. 8B is another example flowchart of an example process for selecting one or more wells to adjust during emissions-based control of landfill gas extraction, according to some embodiments.

FIGS. 8A-8B are flowcharts of example processes for selecting one or more wells to adjust during emissions-based control of landfill gas extraction, according to some embodiments. In particular, FIG. 8A illustrates a process 800 for selecting one or more wells to increase landfill gas extraction flow rates of which is based on whether a concentration of a constituent gas in the landfill gas being extracted from the plurality of wells is above or below a threshold.

Process 800 begins at act 802, where it is determined that a flow rate of at least one well of a plurality of wells is to be increased, for example, at act 606 and/or act 706 of processes 600 and 700. At act 804, a subset of wells to increase gas extraction flow rates of is selected. Act 804 of process 800 illustrates an example implementation for determining which wells to include in the subset of wells.

At act 804, wells which have a concentration of a constituent gas that is above an upper threshold (e.g., for methane, carbon dioxide, etc.) or below a lower threshold (e.g., for oxygen, balance gas, etc.) are selected. In particular, at act 805A, a concentration of a constituent gas in landfill gas being extracted from a first well of the plurality of wells is obtained. The constituent gas may be, for example, oxygen, balance gas, methane carbon dioxide, or any constituent gas in the landfill gas being extracted from the landfill.

At act 805B, the constituent gas concentration is compared to a threshold. In the illustrated embodiment, at act 805B, the constituent gas concentration is compared to an upper threshold to determine whether the constituent gas concentration is less than the upper threshold. Such a comparison may be performed where the constituent gas comprises oxygen and/or balance gas, for example. The inventors have appreciated that it is undesirable to increase flow rates of gas extraction wells extracting landfill gas with high oxygen or balance gas concentrations, as increasing the flow rate for such wells may cause more oxygen to be pulled into the landfill from above the surface of the landfill. Doing so may deteriorate the quality of the extracted landfill gas by reducing the concentration of methane in the extracted landfill gas (due to oxygen's ability to impair or destroy conditions necessary for the production of methane) and may potentially result in underground fires. Thus, only wells extracting landfill gas having oxygen and/or balance gas concentrations below an upper threshold may be selected for adjustment.

Although not shown in the illustrated embodiment, act 805B may additionally or alternatively comprise comparing the concentration of the constituent gas obtained at act 805A to an upper threshold, to determine whether the concentration of the constituent gas is greater than the upper threshold. For example, it may be desirable to increase the flow rate of wells extracting landfill gas having methane and/or carbon dioxide concentrations which are among the highest for the plurality of wells as the wells having the highest methane and/or carbon dioxide content are most likely to produce leaks of greenhouse gas into the atmosphere. Thus, at act 805B, it may be determined whether the concentration of methane and/or carbon dioxide of the landfill gas being extracted from the first well is above an upper threshold.

If, at act 805B, the concentration of the constituent gas obtained at act 805A is not below the lower threshold and/or above the upper threshold, the process may return through the no branch to act 805A where a concentration of the constituent gas for a second well is obtained. Alternatively, the process 800 may end. If, at act 805B, the concentration of the constituent gas obtained at act 805A is below the lower threshold and/or above the upper threshold, the process may proceed through the yes branch to act 805C where the first well is added to the subset of wells. Act 804 may be repeated until all wells of the plurality of wells are considered.

Once the subset of wells is determined at act 804, flow rates of landfill gas being extracted from the subset of wells may be increased at act 806. Process 800 shown in FIG. 8A is therefore a threshold-based approach. Accordingly, in some embodiments, all wells of the plurality of wells may be added to the subset of wells for which flow rate is increased. In some embodiments, only a portion of the plurality of wells are added to the subset of wells for which flow rate is increased. In some embodiments, no wells are added to the subset of wells for which flow rate is increased. In such embodiments, an alert may be transmitted to an operator to indicate that it is not possible to autonomously increase a flow rate of at least one well, and further input is required.

FIG. 8B illustrates another example process 810 for selecting one or more wells to increase landfill gas extraction flow rates of. The approach shown in process 810 selects a portion of wells of the plurality having the "best" or "worst" concentrations of a constituent gas to adjust a flow rate of.

Process 810 begins at act 812 where it is determined that a flow rate of at least one well of a plurality of wells is to be increased, for example, at act 606 and/or act 706 of processes 600 and 700. At act 814, a subset of wells to increase gas extraction flow rates of is selected. Act 814 of process 810 illustrates another example implementation for determining which wells to include in the subset of wells.

At act 814, a percentage of wells which have a concentration of a constituent gas that is in the bottom percentile (e.g., for methane, carbon dioxide, etc.) or the top percentile (e.g., for oxygen, balance gas, etc.) of the plurality of wells are selected. In particular, at act 815A, a concentration of a constituent gas in landfill gas being extracted from a first well of the plurality of wells is obtained. The constituent gas may be, for example, oxygen, balance gas, methane carbon dioxide, or any constituent gas in the landfill gas being extracted from the landfill.

At act 815B, it is determined whether the concentration of the constituent gas for the first well is in the bottom or top percentile of wells. In the illustrated embodiment, at act 815B, the constituent gas concentration is analyzed to determine whether the constituent gas concentration is in a bottom percentile among the plurality of wells (e.g., the bottom 50% of concentrations among the plurality of wells, the bottom 20% of concentrations among the plurality of wells). Such a comparison to the bottom percentile of concentrations may be performed where the constituent gas comprises oxygen and/or balance gas, for example. As described herein, the inventors have appreciated that it is undesirable to increase flow rates of gas extraction wells extracting landfill gas with high oxygen or balance gas concentrations, thus, only wells extracting landfill gas having oxygen and/or balance gas concentrations in a bottom percentile of concentrations may be selected for adjustment.

Although not shown in the illustrated embodiment, act 815B may additionally or alternatively comprise analyzing the concentration of the constituent gas obtained at act 815A to determine whether the concentration of the constituent gas is among an upper percentile of concentrations (e.g., the top 50% of concentrations among the plurality of wells, among the top 20% of concentrations among the plurality of wells). As described herein, it may be desirable to increase the flow rate of wells extracting landfill gas having methane and/or carbon dioxide concentrations which are among the highest for the plurality of wells.

If, at act 815B, the concentration of the constituent gas obtained at act 815A is not among the bottom or top percentiles of wells, the process may return through the no branch to act 815A where a concentration of the constituent gas for a second well is obtained. Alternatively, the process 810 may end. If, at act 815B, the concentration of the constituent gas obtained at act 805A is among the bottom or top percentiles of wells, the process may proceed through the yes branch to act 815C where the first well is added to the subset of wells. Act 814 may be repeated until all wells of the plurality of wells are considered.

Once the subset of wells is determined at act 814, flow rates of landfill gas being extracted from the subset of wells may be increased at act 816. Process 810 shown in FIG. 8B is therefore a percentile-based approach. Accordingly, a flow rate of at least one well of the plurality of wells is adjusted according to process 810 while a flow rate of at least one other well of the plurality of wells is unchanged.

Although the processes illustrated in FIGS. 8A-8B are described with respect to constituent gas concentrations, it should be appreciated that other characteristics of a gas extraction well and/or extracted landfill gas may be used to select which wells of the plurality of wells to adjust. For example, in some embodiments, landfill gas extraction wells having the lowest upstream pressure are selected (e.g., having an upstream pressure less than a threshold and/or among the bottom percentile of measured upstream pressures for the plurality of wells). In some embodiments, landfill gas extraction wells having the lowest flow rate are selected (e.g., having a flow rate less than a threshold and/or among the bottom percentile of flow rates for the plurality of wells). In some embodiments, landfill gas extraction wells having the lowest valve position (e.g., opened to the least degree) are selected (e.g., having a valve position less than a threshold and/or among the bottom percentile of valve positions for the plurality of wells).

d. Flow Rate Adjustment Selection

As described herein, the emissions-based control methods include increasing a flow rate of landfill gas being extracted form at least one well of a plurality of wells in response to determining that an emissions characteristic exceeds a threshold. In some embodiments, the adjustment made to the flow rate of the at least one well is a default adjustment which is independent of the well to which the adjustment is applied and/or the emissions characteristic measurement. In some embodiments, adjustments applied to the flow rate of the plurality of wells may be configurable by a user via a user interface, as described herein.

In some embodiments, the adjustment made to the flow rate of the at least one well is dependent on characteristics of the at one well, characteristics of landfill gas being extracted from the at least one well, and/or the emissions characteristic measurement. For example, increasing the flow rate of landfill gas being extracted from the at least one well may comprise (1) determining a scaling factor by which to proportionally adjust a degree to which a valve of the first well is opened or closed; and (2) adjusting the flow rate of the landfill gas being extracted from the first well according to the scaling factor.

In some embodiments, the adjustment applied to the at least one well varies depending on the well to which the adjustment is applied. For example, different wells may react differently to various changes. The flow rate adjustment may be tuned based on unique characteristics of the well. For example, a constituent gas concentration (such as methane concentration, for example) in landfill gas being extracted from a first well may be more sensitive to changes in flow rate than landfill gas being extracted from a second well. In particular, the constituent gas concentration may increase or decrease by a larger amount in response to a change in flow rate as compared to a constituent gas concentration of landfill gas at other wells. In some embodiments, the sensitivity of the landfill gas composition to a change in flow rate for a particular well may be based, at least in part, on the ground cover in a region of the well (e.g., a depth of the ground cover, a density of the ground cover).

In some embodiments, characteristics such as the current valve position and/or applied upstream and/or downstream pressure in the well piping vary from well to well. A scaling factor applied to the flow rate adjustment made to a well may be based at least in part on such characteristics. For example, where a well characteristic is closer to a target value a small adjustment to the flow rate may be made while when a well characteristic is further from a target value, a larger adjustment to the flow rate may be made.

In some embodiments, the adjustment applied to the at least one well varies depending on the emissions characteristic measurement. In some embodiments, a scaling factor applied to the flow rate adjustment made to a well may be based at least in part on a difference between the emissions characteristic measurement (e.g., mass flow rate of a greenhouse gas, concentration of a greenhouse gas measured a fixed distance above the surface of the landfill) and a target value.

In some embodiments, the adjustment applied to the at least one well varies depending on characteristics of the landfill gas being extracted from the at least one well. For example, a scaling factor applied to the flow rate adjustment may be based at least in part on a difference between a landfill gas characteristic (e.g., a constituent gas concentration) and a target value.

e. User Interface and Reporting

The control system for performing emissions-based landfill gas extraction may be configured to report and/or store information regarding aspects of the landfill gas extraction techniques. For example, in some embodiments, the emissions-based techniques described herein further comprise storing information (e.g., emissions characteristic measurements, landfill gas characteristic measurements, valve adjustments performed) in a local and/or remote storage of a remote system. In some embodiments, the remote system further comprises a processor for processing the information stored in the remote storage. For example, in some embodiments, some or all aspects of the emissions-based techniques described herein are performed by a processor of the remote system.

In some embodiments, the emissions-based techniques further comprise reporting information to one or more users. For example, information (e.g., emissions characteristic measurements, landfill gas characteristic measurements, valve adjustments performed) may be reported to one or more users. In some embodiments, an alert (such as a text message, phone call, email, push notification, alarm and/or other alert) may be transmitted to one or more users. In some embodiments, the alert may be generated when a landfill gas leak or other problematic condition is present at the landfill. In some embodiments, an additional alert may be transmitted when an emissions characteristic measurement remains above a threshold after corrective action to address the exceedance is taken.

In some embodiments, the control system for performing emissions-based landfill gas extraction techniques further comprises a user interface. The user interface may be configured to display information related to the emissions-based landfill gas extraction techniques (e.g., emissions characteristic measurements, landfill gas characteristic measurements, valve adjustments performed). In some embodiments, the user interface is configured to receive an input from a user. For example, the user interface may allow a user to customize one or more aspects of the landfill gas extraction techniques (e.g., setting thresholds, setting alarms, setting valve adjustment values, selecting an emissions-based technique to perform, selecting a region to apply an emissions-based technique, selecting a sampling frequency, etc.). In some embodiments, the user interface displays a digital map of the landfill displaying the plurality of wells. The digital map may provide a visual indication of conditions associated with the plurality of wells, including whether a leak has occurred.

IV. Systems and Techniques for Estimating Gas Emissions

According to some aspects of the technology described herein, there is provided systems and techniques for estimating amounts of gas emissions from a landfill. As described herein, the inventors have recognized that in order to manage gas emissions from a landfill, it is helpful to understand the quantities and/or location(s) of these emissions. For example, large quantities of gas emissions may prompt corrective action. Understanding the location of increased gas emissions can assist an operator in determining where to implement corrective action.

As described herein, it may not be feasible or even possible to measure gas emissions with point measurements across an entire region for which emissions monitoring is desired. Accordingly, the inventors have developed a gas emissions model that estimates a measure of gas emissions in a region of a landfill based on a plurality of measures (e.g., measurements, measures derived based on one or more measurements) of landfill conditions, as well as atmospheric conditions, such as wind speed and direction, barometric pressure, ambient temperature, topographic features of the landfill, and/or characteristics at selected locations in the landfill. The plurality of measures may be input into the gas emissions model and the gas emissions model may process the input measures to provide an estimate of gas emissions in the region of the landfill. In some embodiments, the estimate of gas emissions may comprise an aggregate estimate of total gas emissions in the region of the landfill. In other embodiments, the estimate of gas emissions may comprise a point estimate of gas emissions at a location in the region of the landfill (e.g., to identify a gas leak in the landfill cover), including locations where no measures, of the plurality of measures input into the model, have been taken. In other embodiments, the estimate of gas emissions may compromise an estimate of emissions per area of the landfill. Accordingly, the gas emissions model described herein provides for interpolating measures of gas emissions throughout the landfill.

As described herein, the gas emissions model for providing an estimate of gas emissions may be based on a plurality of measures input into the gas emissions model. A number of different values of landfill conditions and/or characteristics that may be input into the gas emissions model to provide an estimate of gas emissions in a region or in aggregate of a landfill are further described herein. In some embodiments, one or more other values in addition to those described herein may be input into the gas emissions model. Any number of the values described herein may be used.

In some embodiments, the one or more measures may be obtained at different locations throughout the region of the landfill. For example, one or more measures may be obtained at one or more heights above the surface at gas collection points (e.g., within a threshold distance of a gas collection point, such as within 1 ft, 2 ft, 3 ft, 4 ft, 5 ft, 10 ft, or less), and for example at 1 ft. above the landfill surface at a collection point, and at 12 ft. above the surface of the landfill at a collection point. In some embodiments, one or more measures may be obtained with no distance separating the measure location and the gas collection point (e.g., the gas collection point and location where the one or more measures are obtained are co-located at the same GPS latitude and longitude coordinates). A gas collection point is a location in the region of the landfill where gas is extracted from the landfill. For example, each gas collection point may comprise a gas extraction well disposed at least partially below a surface of the landfill. As described herein, the gas extraction well may include perforations in sides of the well such that when a vacuum is applied to the gas extraction well, landfill gas below the surface of the landfill can be extracted from the landfill through well piping coupled to the gas extraction well. One or more gas collection points may further include a control system 112 as described herein. The one or more measures input into the gas emissions model may be obtained within the threshold distance of gas collection points with a control system 112 or without a control system 112.

In some embodiments, the one or more measures may be obtained at locations other than gas collection points (e.g., locations distanced from gas collection points). For example, one or more measures may be obtained at locations among gas collection points. The locations among gas collection points may be distanced from gas collection points, at locations where no gas collection occurs (e.g., where no wells are located). In some embodiments, the locations among gas collection points are spaced equidistantly from respective nearest neighbor gas collection points. In some embodiments, sensors for obtaining the one or more measures at locations other than gas collection points may be spaced in a grid spacing. For example, such sensors may be located approximately equidistantly from neighboring sensors disposed at locations other than gas collection points.

In some embodiments, the one or more measures may be obtained by one or more sensors disposed at a centralized point of the landfill. For example, the one or more sensors may be placed at approximately the center of the region of the landfill being monitored. In some embodiments, the one or more sensors may be place at a high point of the region of the landfill being monitored (e.g., a location having a height higher than other locations (e.g., all other locations) in the region of the landfill landfill).

As described herein, the one or more measurements may be obtained by one or more sensors. In some embodiments, the one or more sensors may be disposed in freestanding modules (e.g., modules not coupled to existing equipment in the landfill). In some embodiments, the one or more sensors may be disposed in modules retrofit to existing equipment in the landfill (e.g., landfill gas extraction equipment, such as the equipment described herein). In some embodiments, the one or more sensors may be at least partially battery powered. In some embodiments, the one or more sensors may be at least partially solar powered. In some embodiments, the one or more sensors may be at least partially powered with power supplied from a power grid and/or other power source. In some embodiments, the one or more sensors may be permanently installed in the landfill. In some embodiments, the one or more sensors may be removable and easily moved for repositioning.

Figure 11:
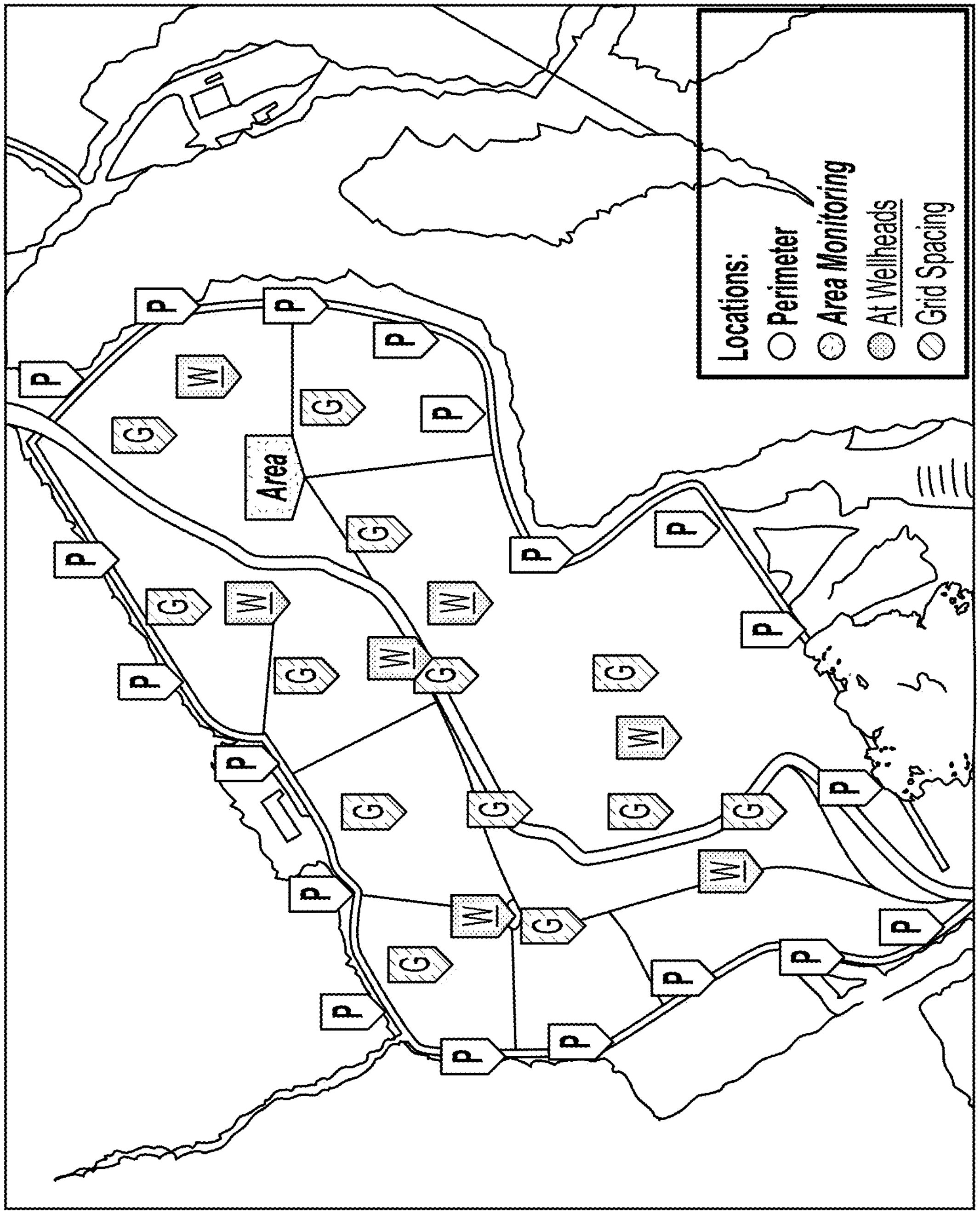
FIG. 11 illustrates an example layout of sensor locations in a region of a landfill, according to some embodiments.

FIG. 11 illustrates an example layout of sensor locations in a region of a landfill, according to some embodiments. As shown in FIG. 11, a plurality of sensors for obtaining the one or more measurements described herein are disposed within a threshold distance of gas collection points (labeled "W" at wellheads in FIG. 11). Other sensors may be distanced from the gas collection points. As shown in FIG. 11, a plurality of sensors are disposed along a perimeter of the landfill (labeled "P" in FIG. 11). Other sensors are disposed throughout the landfill, distanced from the gas collection points, in a grid spacing (labeled "G" in FIG. 11). Sensor modules disposed in the grid spacing may be spaced equidistantly apart, in some embodiments. In some embodiments, the respective sensors may be spaced with a density such that at least one sensor measurement is obtained for every ½ acre of the landfill region. However, other spacings are possible. In some embodiments, for example areas where gas decomposition and/or emissions is more active and/or areas where the gas extraction wells were more recently installed, a tighter (e.g., denser) grid spacing of sensor modules is possible. In areas which are less active and/or which have gas extraction wells that were not recently installed, a looser (e.g., less dense) grid spacing of sensor modules is possible. One or more sensors may be disposed at centralized locations in the landfill region, as described herein. For example, an area sensor for performing area monitoring (labeled "Area" in FIG. 11) is disposed at a topographical maximum of the landfill shown in FIG. 11. In some embodiments, one or more sensors may be placed near structures in the landfill which may require monitoring (e.g., as such structures could be sources of gas emissions). For example, in some embodiments, one or more sensors may be placed at or adjacent to maintenance building(s), an energy plant (e.g., a powerplant), digester(s), flare(s), and/or any other onsite equipment at the landfill which may be desired to monitor.

Although not illustrated in FIG. 11, in some embodiments, one or more sensors may be disposed outside of the perimeter (e.g., boundary) of the landfill, which may be off the property of the landfill. Such sensors may be highly sensitive and/or optimized for measuring further downwind in a plume of gas (e.g., methane) emitting from the landfill.

In some embodiments, one or more measures of a concentration of a gas in the air in the region of the landfill may be obtained. For example, the gas may be a greenhouse gas such as methane or carbon dioxide. In some embodiments, the gas may be a gas present in landfill gas generated from decomposing waste beneath the surface of a landfill, such as methane, carbon dioxide, nitrogen, oxygen, and/or hydrogen sulfide. In some embodiments, the gas may be a combination of different gasses (e.g., balance gas). In some embodiments, the one or more measures of gas concentration may be in the form of a value representing a number of parts per million (ppm) of the particular gas in the atmosphere where a sample to be measured is obtained. In some embodiments, the one or more measures of gas concentration may be in the form of a value representing a percentage out of 100% that the particular gas represents in a sample obtained from the atmosphere in the region of the landfill. In some embodiments, the one or more measures of gas concentration may comprise a measurement of gas concentration at a point in the atmosphere. In some embodiments, the one or more measures of gas concentration may comprise a measure of gas concentration summed over an area or along a line from the sensor to a visual background. In such embodiments, the measure of gas concentration may represent an aggregate total amount of gas present in the area or along the line.

In some embodiments, the one or more measures may include atmospheric information. For example, the one or more measures may comprise a measure of wind speed. In some embodiments, the one or more measures may comprise a measure of wind direction. In some embodiments, the one or more measures may comprise a measure of barometric (atmospheric) pressure. In some embodiments, the one or more measures may comprise a measure of atmospheric temperature. In some embodiments, the one or more measures may comprise a measure of humidity in the atmosphere in the region of the landfill. In some embodiments, the one or more measures may include a measure of an amount of rainfall over a period of time in the region of the landfill.

In some embodiments, certain characteristics of the landfill region may be measured at a single location in the region of the landfill. For example, the inventors have recognized that certain characteristics of the landfill region, such as barometric pressure and/or ambient (atmospheric) temperature, may be approximately the same throughout the landfill region. Accordingly, such characteristics, such as barometric pressure and/or ambient temperature may be measured by a single unit at a single location in the region of the landfill. The barometric pressure and/or ambient temperature at other locations in the region of the landfill may be approximated as equal to the respective measured barometric pressure and/or ambient temperature at the single location in the region of the landfill.

In some embodiments, the one or more measures may include measures of gas concentration in gas extracted from the landfill within a threshold distance of gas collection points. For example, the one or more measures may comprise one or more measures of a concentration of a constituent gas in gas extracted from the landfill. The constituent gas may comprise one or more of methane, carbon dioxide, oxygen, nitrogen, balance gas (e.g., which may be approximated by calculating 100%—methane concentration—oxygen concentration—carbon dioxide concentration in the extracted gas), hydrogen sulfide, or other trace gases. The one or more measures of gas concentration in gas extracted from the landfill within the threshold distance of gas collection points may comprise a percentage in some embodiments, and/or in some embodiments a value representing a number of ppm of the constituent gas in the gas extracted from the landfill at the gas collection points.

In some embodiments, the one or more measures may include a measure of distance between locations at which other measures are obtained. For example, the one or more measures may include a distance between a location at which one of the one or more measures of a condition and/or characteristic of the landfill is obtained and a nearest neighbor location at which another of the one or more measures is obtained.

In some embodiments, the one or more measures may include a distance between a gas collection point and a nearest neighbor gas collection point. In some embodiments, the one or more measures may include a distance between a location where one or more measures of a condition and/or characteristic of the landfill is obtained (e.g., a gas collection point, a location distanced from gas collection points) and a nearest neighbor gas collection point. Understanding distances to nearest neighbor gas collection points may assist in understanding whether sufficient vacuum is applied to the landfill at the location where a measure is obtained.

In some embodiments, the one or more measures may be obtained at different heights. The height at which a measure is obtained may be measured relative to a reference level. The reference level may be a surface of the landfill, in some embodiments. In some embodiments, the reference level may be sea level, so that the measured height comprises an absolute height that can be compared to heights at different locations in the landfill despite different topographies (e.g., local hills and valleys) throughout the landfill. In some embodiments, the heights at which the one or more measures of conditions and/or characteristics of the landfill are obtained may be input into the gas emissions model. The heights at which the one or more measures are obtained may be associated with the measure obtained at that height before being input into the gas emissions model.

As described herein, the one or more measures may be obtained at different heights above the reference level (e.g., a surface of the landfill, sea level, etc.). In some embodiments, measures may be obtained at multiple heights for one particular location in the landfill (e.g., one GPS location comprising a longitude and latitude coordinate). In some embodiments, the height at which a measure is obtained depends on the type of location where the measure is obtained. In some embodiments, measures obtained within the threshold distance of gas collection points may be obtained at approximately 6-8 ft above the reference level (e.g., the surface of the landfill). In some embodiments, measures obtained at locations distanced from gas collection points may be obtained at approximately 12 ft above the reference level (e.g., the surface of the landfill).

In some embodiments, the one or more measures may comprise a measure of an amount of one or more volatile organic compounds (VOCs) in the region of the landfill. For example, the volatile organic compound(s) may include benzene, ethylene glycol, formaldehyde, methylene chloride, tetrachloroethylene, toluene, xylene, and/or 1,3-butadiene. Amounts of one or more VOCs may be measured with a gas sensor, as described herein. A volatile organic compound as described herein may be a non-methane organic compound in some embodiments, or a compound including methane, ethane, and/or carbon dioxide. For example, a gas sensor configured to measure an amount of one or more VOCs may be configured to measure methane, ethane, and/or carbon dioxide.

In some embodiments, the one or more measures may comprise a measure of an amount of one or more particles. For example, the one or more particles may include PM2.5 and/or PM10.

The one or more measures of gas concentration may be measured in one or more different ways. In some embodiments, the one or more measures of gas concentration (e.g., methane concentration) may be open-air measurements obtained by one or more sensors that are exposed directly to ambient atmosphere and measures the concentration of gas that is blown across the sensor face. In some embodiments, the one or more measures of gas concentration may be measured by one or more sensors disposed in a chamber, as described herein. The chamber may be coupled to a pump that draws a sample of gas from the atmosphere into the chamber. The one or more sensors disposed in the chamber may obtain a static measurement of gas concentration of the gas sample that has been drawn into the chamber by the pump. In some embodiments, the one or more sensors disposed in the chamber may obtain a dynamic measurement of gas concentration of the gas sample that has been drawn into the chamber by the pump. For example, the one or more sensors may be operated to obtain a measurement of gas concentration while the gas sample is flowing (e.g., flowing through a tube via activation of the pump). The timing of activating the pump, the duration of a hold period for the gas sample during which the one or more measures are obtained, the measurement frequency, and/or number of measurements may be varied in some embodiments.

In some embodiments, a time stamp may be obtained each of the one or more of the one or more measures obtained as described herein. In some embodiments, measures of different landfill characteristics and/or conditions may be obtained at a same time and in the same location. Accordingly, different landfill characteristics and/or conditions may be correlated in time and location to each other.

In some embodiments, measures of the same landfill characteristic and/or condition may be obtained at the same time, but in different locations. Accordingly, the same landfill characteristic and/or condition may be correlated in time but different in location. Such measures may provide a "snapshot" of the conditions across multiple points in a landfill at a single point in time. In some embodiments, measures of different landfill characteristic and/or conditions may be obtained at the same time but in different locations.

In some embodiments, measures of the same landfill characteristic and/or condition may be obtained at the same location, but at different times. Accordingly, the same landfill characteristic and/or condition may be correlated in location, but different in time. Such measures may facilitate comparing change in the same characteristic and/or condition over time. In some embodiments, measures of different landfill characteristic and/or conditions may be obtained at the same location but at different times.

As described herein, multiple measures may be input into the gas emissions model and processed by the gas emissions model in order to determine an estimate of gas emissions in the region of the landfill. In some embodiments, one or more gas physical property values, such as gas density, may be input into the gas emissions model. In some embodiments, multiple measures of a single variable obtained at the same location may be input into the gas emissions model. In some embodiments, one or more measures of a single variable obtained at multiple different locations and/or heights may be input into the gas emissions model. In some embodiments, measures of a single variable may be obtained at a same location and height at different points in time. Such measures may be obtained continuously or at particular frequency (e.g., monthly, weekly, daily, hourly, every minute, or more or less frequently).

In some embodiments, one or more measures of multiple different variables measured at the same location may be input into the gas emissions model. In some embodiments, one or more measures of multiple variables obtained at multiple locations and/or heights may be input into the gas emissions model. Accordingly, the gas emissions model may determine an estimate of gas emissions in a region of a landfill based on one or multiple measures of one or multiple variables (e.g., conditions and/or characteristics) obtained at one or multiple locations and/or heights at one or more times.

The gas emissions model may be used to determine, based on the one or more inputs described herein, a measure of gas emissions in a region of the landfill. In some embodiments, the region of the landfill comprises the entirety of the landfill. In some embodiments, the region of the landfill consists of a portion less than the entirety of the landfill (e.g., a region comprising a single gas collection point, a region comprising multiple but fewer than all of the gas collection points in the landfill). The region of the landfill may include some or all of the locations where measures input into the gas emissions model are taken. In some embodiments, the region of the landfill comprises a location where no measures input into the gas emissions model are taken, such that an estimate of gas emissions may be provided even for locations where no measure data (e.g., sensor data) is available.

The gas emissions model may be used to process one or more of the measures input to the gas emissions model to obtain a respective output indicative of an estimate of gas emissions, as described herein. The gas emissions model may combine the one or more measures input to the model to estimate gas emissions in the region of the landfill. In some embodiments, the gas emissions model combines raw gas data (e.g., methane concentration measures of air obtained at points throughout the landfill region) with environmental characteristics (e.g., wind speed, wind direction, and/or other atmospheric measures described herein) to estimate gas emissions from the landfill. In some embodiments, The gas emissions model may comprise one or more equations. Each of the one or more equations may comprise one or more variables and/or parameters. Processing the plurality of measures using the gas emissions model may comprise inputting values of the plurality of measures to the one or more variables and calculating an estimate of gas emissions by solving the one or more equations. In some embodiments, one or more values of information obtained (e.g., by retrieving such information from an external source) but not measured directly by the control system described herein may be input to the one or more variables of the gas emissions model.

In some embodiments, the gas emissions model may be based on an assumption that the landfill continuously emits low-level emissions throughout the region of the landfill. In some embodiments, the gas emissions model may be based on an assumption that gas emissions from the landfill are the result of specific plumes of leaks emanating from certain locations in the region of the landfill. In such embodiments, the model may comprise an air dispersion model, including a Gaussian Dispersion model, such as a Gaussian Plume model. An air dispersion model simulates the transport, dispersion, and transformation of pollutants (e.g., greenhouse gasses) in the atmosphere. An air dispersion model provides a means of estimating downwind air pollution concentrations, given information about the emissions (e.g., measures of gas concentration in the atmosphere) and nature of the atmosphere (e.g., wind characteristics such as wind speed and direction). The model may be based on a Generalized Dispersion Equation for a Continuous Point-Source Plume, as described in Beychok, Milton R. (2005). Fundamentals Of Stack Gas Dispersion (4th ed.). ISBN 0-9644588-0-2. (Chapter 8, page 124). For example, the model may comprise the following equation:

$$C = \frac{Q}{u} \times \frac{f}{\sigma_y \sqrt{2\pi}} \times \frac{(g_1 + g_2 + g_3)}{\sigma_z \sqrt{2\pi}}$$

wherein:

f is the crosswind dispersion parameter and is equal to exp $$\left[-y^2/\left(2\sigma_y^2\right)\right];$$

g is the vertical dispersion parameter and is equal to $g_1+g_2+g_3$;

$g_1$ represents vertical dispersion with no reflections and is equal to exp $$\left[-(z-H)^2/\left(2\sigma_z^2\right)\right];$$

$g_2$ represents vertical dispersion for reflection from the ground and is equal to exp $$\left[-(z+H)^2/\left(2\sigma_z^2\right)\right];$$

$g_3$ represents vertical dispersion for reflection from an inversion aloft and is equal to $$\sum_{m=1}^{\infty}\left\{\exp\left[-(z-H-2\ \mathrm{mL})^2/\left(2\sigma_z^2\right)\right]+\exp\left[-(z+H+2\ \mathrm{mL})^2/\left(2\sigma_z^2\right)\right]+\exp\left[-(z+H-2\ \mathrm{mL})^2/\left(2\sigma_z^2\right)\right]+\exp\left[-(z-H+2\ \mathrm{mL})^2/\left(2\sigma_z^2\right)\right]\right\};$$

C is the concentration of emissions, in $g/m^3$, at any receptor located: x meters downwind from the emission source point, y meters crosswind from the emission plume centerline, and z meters above ground level;

Q is the source pollutant emission rate, in g/s;

u is the horizontal wind velocity along the plume centerline, in m/s;

H is the height of emission plume centerline above ground level, in m;

$\sigma_z$ is the vertical standard deviation of the emission distribution, in m;

$\sigma_y$ is the horizontal standard deviation of the emission distribution, in m;

L is the height from ground level to bottom of the inversion aloft, in m; and exp is the exponential function.

For example, any of the models described in Venkratram, A. and J. Thé (2003) Introduction to Gaussian Plume models. Chapter 7A of AIR QUALITY MODELING Theories, Methodologies, Computational Techniques, and Available Databases and Software. Vol. I-Fundamentals (Published by the EnviroComp Institute and the Air & Waste Management Association); Dispersion models, World Meteorological Organization; and/or Srivastava, A. and B. Padma S. Rao (2011) Air Quality-models and Applications, Urban Air Pollution modeling (Published by IntechOpen) may be used. Examples of air pollution models in current use include ADMS 3 developed in the United Kingdom, AERMOD developed in the United States, AUSPLUME developed in Australia, CALPUFF developed in the United States, DISPERSION2 developed in Sweden, ISC3 developed in the United States, LADM developed in Australia, NAME developed in the United Kingdom, MERCURE developed in France, and RIMPUFF developed in Denmark.

In some embodiments, the gas emissions model may comprise a Lagrangian Stochastic model. Lagrangian Stochastic models may be useful, as they are more stable in the presence of turbulent air flow and take into account at least some turbulence. The Lagrangian Stochastic model may compute random paths of marked fluid elements through turbulent flow, based on knowledge of velocity statistics.

In some embodiments, the measures input into the gas emissions model may comprise instantaneous measurements of a landfill condition or characteristic (e.g., as described herein). In some embodiments, the measures input into the gas emissions model may comprise measurements averaged over a period of time. In some embodiments, the measures input into the gas emissions model may be measures of peak measurements of a landfill condition or characteristic (e.g., as described herein) over a period of time. For example, over a period of one hour, the highest methane concentration value measured may be selected as the methane concentration measure that is input into the gas emissions model. The period of time may be short (e.g., on the order of seconds, such as less than 1 second). In other embodiments, the period of time may be longer (e.g., over a minute or multiple minutes, over an hour or multiple hours).

The one or more measures may be conditioned before being input into the gas emissions model. For example, the one or more measures may be conditioned to correct measures for a given wind direction at the time the measures were obtained. In some embodiments, one or more measures may be combined with one or more other measures (e.g., nearby measures). In some embodiments, the one or more measures may be conditioned based on another reference measure (e.g., to correct a baseline for a sensor that operates on a comparison principle).

As described herein, the estimate of gas emissions may comprise an aggregate estimate of total gas emissions from the landfill and/or a region of the landfill that is less than the full area of the landfill. In other embodiments, the estimate of gas emissions may comprise a point estimate of gas emissions at a particular location in the region of the landfill (e.g., to identify a gas leak in the landfill cover). The point estimate may be a value representing an amount of gas emissions and/or a location at which an identified leak is detected based on the point estimate of gas emissions. In some embodiments, the estimate of gas emissions may comprise a value representing a measure of gas emissions emanating from the landfill at a point in time and/or over a period of time (e.g., a concentration of one or more greenhouse gasses). In some embodiments, the estimate of gas emissions may comprise a flow rate of gas emissions emanating from the landfill at a point in time and/or over a period of time. In some embodiments, the estimate of gas emissions may comprise a direction of gas emissions at a point in time and/or over a period of time. In some embodiments, the estimate of gas emissions may be used to determine locations having the highest amount of gas emissions (e.g., to determine where leaks in the landfill cover may be present).

In some embodiments, the estimate of gas emissions may be displayed. For example, the estimate of gas emissions may be displayed via a display screen (e.g., on a computer and/or a mobile computing device such as a smartphone, a tablet, a laptop, etc.). As described herein, displaying the estimate of gas emissions may comprise outputting a graphical display of the region of the landfill (e.g., a map of the region of the landfill) having the estimate of gas emissions superimposed on the graphical display. The estimate of gas emissions may be superimposed on the graphical display at locations in the region of the landfill to which the estimate of gas emissions corresponds.

In some embodiments, a display screen may be configured to display measure data and/or gas emissions estimates. In some embodiments, the display may include a time stamp corresponding to a measure of a characteristic of the landfill region (e.g., gas concentration, atmospheric conditions such as barometric pressure, temperature, wind speed, and/or direction, etc.), the measure of the characteristic of the landfill region, and/or location data regarding where the measure was obtained (e.g., GPS coordinate data and/or a height at which the measure was obtained).

In some embodiments, there is provided a technique for performing a corrective action based on an estimate of gas emissions determined by the measure system and gas emissions model described herein. For example, when it is determined that the estimate of gas emissions output by the gas emissions model is not equal to a target, outside of a range, greater than and/or equal to an upper threshold for gas emissions, and/or less than and/or equal to a lower threshold for gas emissions, a corrective action may be performed. In some embodiments, the corrective action may be performed automatically (e.g., without further user interaction) based on the determined estimate of gas emissions output by the gas emissions model.

The corrective action may be applied to any suitable number of gas collection points. For example, in some embodiments, the corrective action is applied to all gas collection points (e.g., wells). In some embodiments, the corrective action is applied to a portion of the gas collection points. In some embodiments, the corrective action is applied to a subset of gas collection points. The subset of gas collection points may be selected based on characteristics of the gas collection points (e.g., concentration of extracted gas, liquid level), including an output of the gas emissions model. In some embodiments, the corrective action is applied to gas collection points with high gas emissions (e.g., gas emissions above a threshold), as determined by the gas emissions model.

In some embodiments, the corrective action may comprise one or more adjustments to a flow rate of landfill gas being extracted from the landfill at one or more of the plurality of gas collection points. The one or more adjustments to flow rate may include adjusting flow rates of multiple wells. In some embodiments, the one or more adjustments to flow rate may include adjusting flow rates of a well at each gas collection point. In some embodiments, the one or more adjustments to flow rate may include adjusting flow rates at each gas collection point at which a measure input into the gas emissions model is obtained. In some embodiments, the one or more adjustments to flow rate may include adjusting flow rates at a subset of wells (e.g., according to the techniques described herein for adjusting flow rate from a subset of wells). For example, an adjustment to flow rate may be applied at wells having a concentration of methane in gas extracted from those wells that exceeds a threshold. In some embodiments, the one or more adjustments to flow rate may be applied to wells located in a portion of the landfill with high gas emissions (e.g., in areas with a gas emissions measure, such as methane concentration and/or flow rate, that exceeds a threshold). In some embodiments, the adjustment to flow may be scaled (e.g., at each well by applying a scaling factor) based on the estimate of gas emissions (e.g., at respective ones of the gas collection points).

In some embodiments, the corrective action may comprise removing liquid from one or more gas extraction wells located at gas collection points. For example, the corrective action may include activating a pump to remove liquid from one or more of the gas extraction wells, as described herein. In some embodiments, liquid may be removed from wells at each gas collection point. In some embodiments, liquid may be removed from wells at gas collection points at which a measure input into the gas emissions model is obtained. In some embodiments, liquid may be removed from a subset set of wells. For example, liquid may be removed from wells at gas collection points which have a liquid level that exceeds a threshold. In some embodiments, liquid may be removed from wells located in portions of the landfill with high gas emissions (e.g., in areas with a gas emissions measure, such as methane concentration and/or flow rate, that exceeds a threshold).

In some embodiments, the corrective action comprises adjusting an amount of vacuum applied to two or more of the plurality of gas collection points. For example, the corrective action may include adjusting (e.g., increasing) a centralized vacuum, such as vacuum 520 shown in FIG. 5A, based on the determined gas emissions.

In some embodiments, the corrective action comprises adding, remediating, and/or changing a material covering one or more surfaces of one or more of the plurality of gas collection points (e.g., dirt, clay, membrane, etc.). For example, increased gas emissions may indicate the presence of gas leaks in a cover material which may be addressed by adding to the cover material and/or changing the type of cover material. In some embodiments, the corrective action comprises adding cover to locations in the landfill where gas leaks are identified.

In some embodiments, the corrective action comprises repairing and/or replacing one or more components of gas extraction equipment. For example, the corrective action may include remediation of well infrastructure problems such as loose fittings, cracked Kanaflex or hoses, broken sample portions, broken or disconnected piping, and/or replacement of wellheads that have popped off due to increased (e.g., positive) pressure at the wellhead.

In some embodiments, the corrective action may include changing a size of a wellhead. Changing the size of the wellhead may allow for better gas collection, for example, by increasing the size of the wellhead to increase the amount of gas extracted from the landfill. For example, the wellhead may be increased in size from 2" to 3", 3" to 4", or any other suitable change.

In some embodiments, the corrective action may include adding (e.g., by drilling) new wells, for example, in areas with high gas emissions. In some embodiments, the corrective action may include modifying and/or recommending a modification to the spacing of wells in a wellfield. In some embodiments, the corrective action comprises adding vertical wells and/or increasing vertical well spacing. In some embodiments, the corrective action comprises adding horizontal wells and/or increasing horizontal well spacing (e.g., by spacing horizontal wells closer laterally and/or closer vertically in layers as waste is added to the landfill). In some embodiments, the corrective action may include leachate recirculation treatment of waste. In some embodiments, the corrective action may include applying a nitrogen or other subsurface chemical treatment to the waste in the landfill. In some embodiments, the corrective action may include modifying the waste in the landfill (e.g., shredding waste) to adjust the density of waste in the landfill. In some embodiments, the corrective action may include applying sealing around a gas collection point (e.g., sealing around a base of a wellhead penetration into the ground). In some embodiments, the corrective action comprises adding temporary gas collection in active areas in the landfill (e.g., where waste is being disposed).

Figure 9:
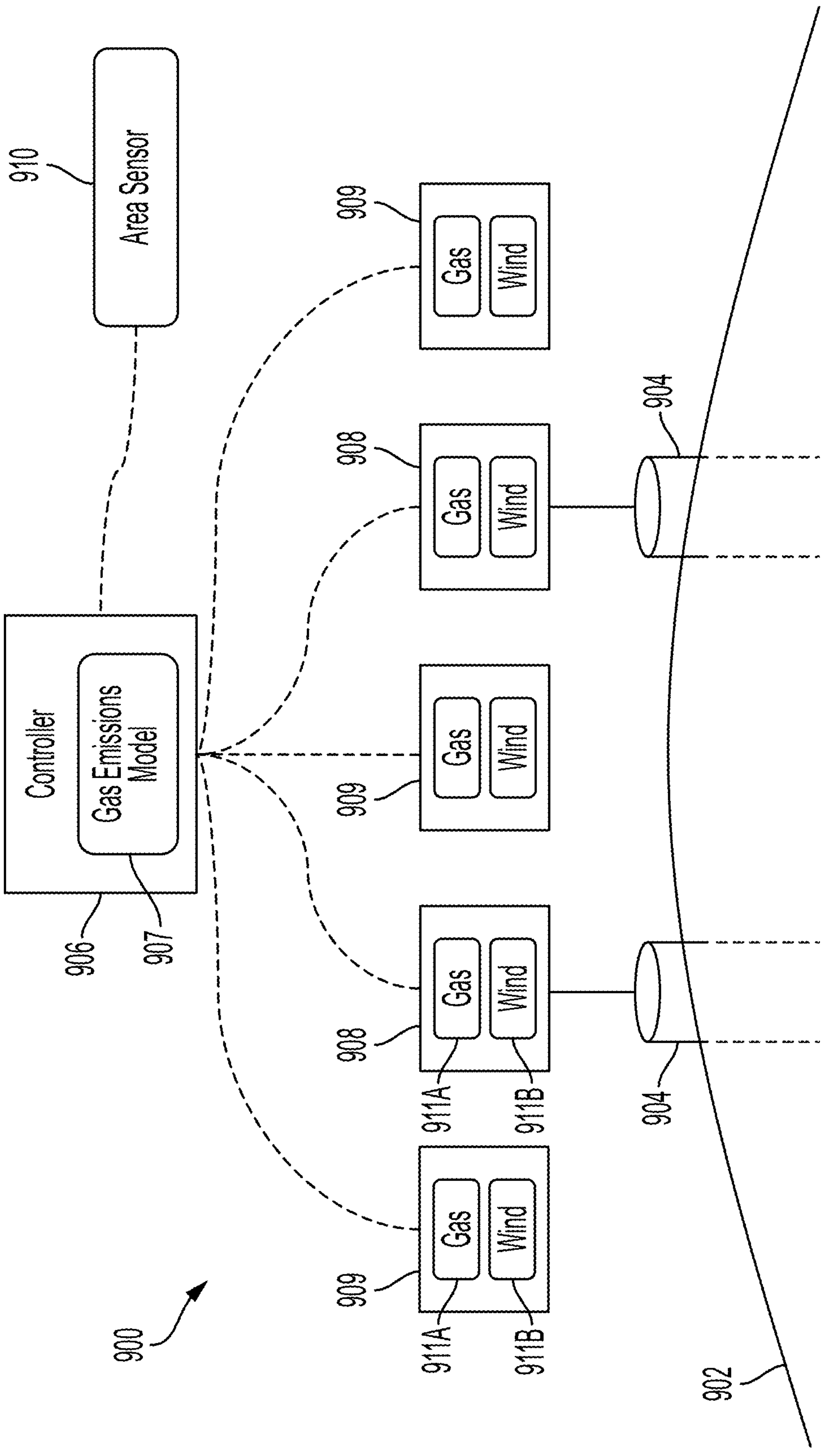
FIG. 9 illustrates an example system for determining an estimate of gas emissions in a region of a landfill, according to some embodiments.

As described herein, systems and techniques are provided for determining an estimate of gas emissions in a region of a landfill. FIG. 9 illustrates an example system for determining an estimate of gas emissions in a region of a landfill, according to some embodiments.

As shown in FIG. 9, the system 900 is disposed in the environment of a landfill 902. The landfill 902 comprises decomposing waste that generates landfill gas. Landfill gas generated by the decomposing waste in the landfill 902 is extracted via a plurality of wells 904. For example, as described herein, a gas extraction well comprises perforations through which generated landfill gas can be drawn in to the well. When a vacuum is applied to the wells, the landfill gas can be collected via the wells and delivered to a gas collection system (e.g., a powerplant) through well piping (not shown).

As described herein, landfill gas, if not extracted, may escape through a surface of the landfill into the atmosphere. Landfill gas contains harmful gasses such as methane and carbon dioxide. In order to reduce the amount of such harmful gasses from being emitted into the atmosphere, the landfill gas is extracted via the wells 904 described herein. However, at least some landfill gas may escape from the landfill (e.g., due to leaks in the landfill surface and/or insufficient gas extraction). In order to manage gas emissions from a landfill, the system 900 monitors landfill conditions and/or characteristics using the gas emissions model described herein and may perform one or more corrective actions based on determined estimates of gas emissions in a region of the landfill.

The system 900 comprises a controller 906. The controller 906 is configured to receive a plurality of measures of landfill conditions and/or characteristics. For example, controller 906 receives measures from sensors 910-911B described herein. In some embodiments, the controller 906 may control one or more sensors to obtain measurements. As shown in the illustrated embodiment, the controller 906 may be located remotely from one or more of the sensors. For example, the controller 906 may be located at a physical location different from locations at which the one or more measures are obtained. In some embodiments, the controller 906 is located outside of the region of the landfill. The controller 906 may communicate with the sensors via wired and/or wireless connection(s). Example wireless connections include cell, Wi-Fi, LoRaWAN, and/or any other suitable connection.

The controller 906 may input one or more of the measures into a gas emissions model 907. As described herein, the gas emissions model 907 determines, using the one or more input measures, an estimate of gas emissions from the landfill. The controller 906 may perform one or more corrective actions, as described herein, based on the determined estimate of gas emissions.

System 900 further comprises a plurality of sensor modules 908-909. Each sensor module may comprise one or more sensors for obtaining a measurement of a characteristic of the landfill. Respective ones of the one or more sensors may transmit (e.g., via a transmitter associated with respective sensor modules) obtained measurements to one or more locations, such as the controller and/or a data storage. In some embodiments, the data obtained by the one or more sensors may be stored in at least one data store that is part of a cloud computing environment.

The one or more sensors may obtain data in response to a command (e.g., from a user) and/or at a scheduled frequency (e.g., monthly, weekly, daily, hourly, every minute, or more or less frequently). The sensors may report such data in response to a command (e.g., from a user) and/or at a scheduled frequency (e.g., monthly, weekly, daily, hourly, every minute, or more or less frequently).

As described herein, at least some of the one or more measures input into the gas emissions model may be obtained within the threshold distance of the gas collection points in some embodiments. Sensor modules 908 are illustrated being located at gas collection points (with wells 904). Others of the one or more measures input into the gas emissions model may be obtained at locations other than at the gas collection points, such as locations among and/or between the gas collection points. Sensor modules 909 are located within the region of the landfill at locations other than at the gas collection points.

In the illustrated embodiment of FIG. 9, each of the sensor modules 908-909 include a gas sensor 911A. Gas sensor 911A may be configured to measure a concentration of gas in a sample obtained from the atmosphere. Gas sensor 911A may be any suitable type of sensor (e.g., non-dispersive infrared (NDIR) sensors, mid infrared optical sensors, catalytic beads, electrochemical sensors, pellistors, photoionization detectors, zirconium oxide sensors, thermal conductivity detectors, an optical sensor such as a spectrometer, an infrared sensor, a camera, a hyperspectral imaging device, a light detection and ranging (LiDAR) sensor, and/or any other sensing technology). Example gas concentration sensors include sensors such as the Terra Air and Earth View.

Figure 12C:
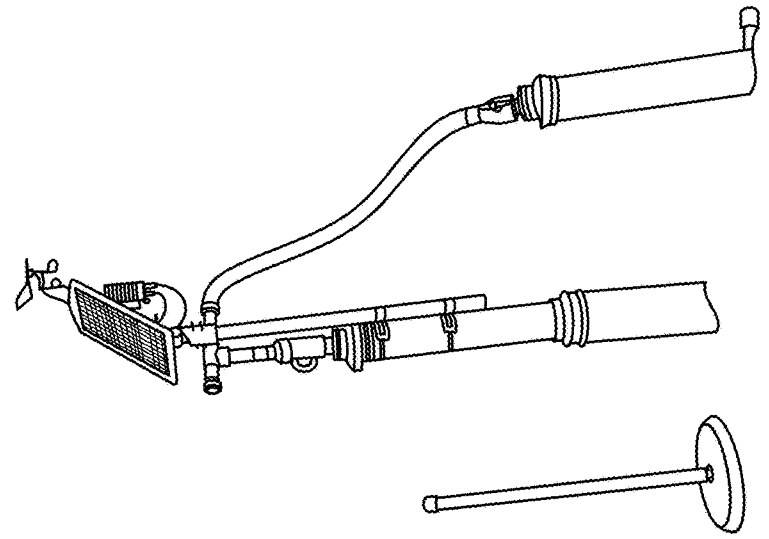
FIG. 12C illustrates another example device for obtaining measurements at gas collection points, according to some embodiments.
Figure 12B:
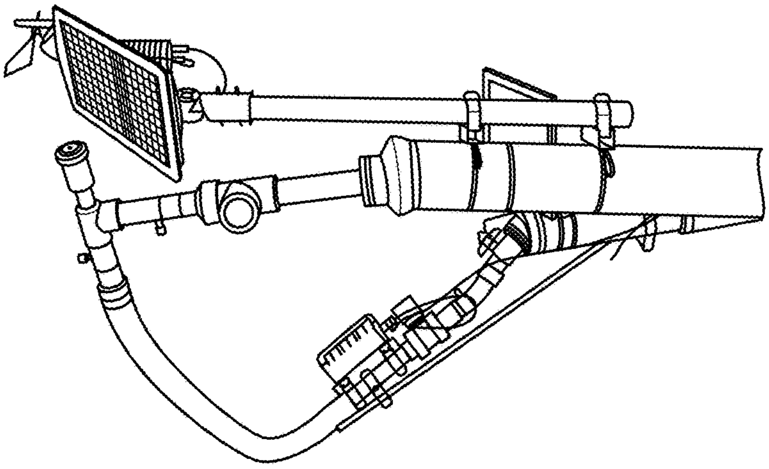
FIG. 12B illustrates another example device for obtaining measurements at gas collection points, according to some embodiments.
Figure 12A:
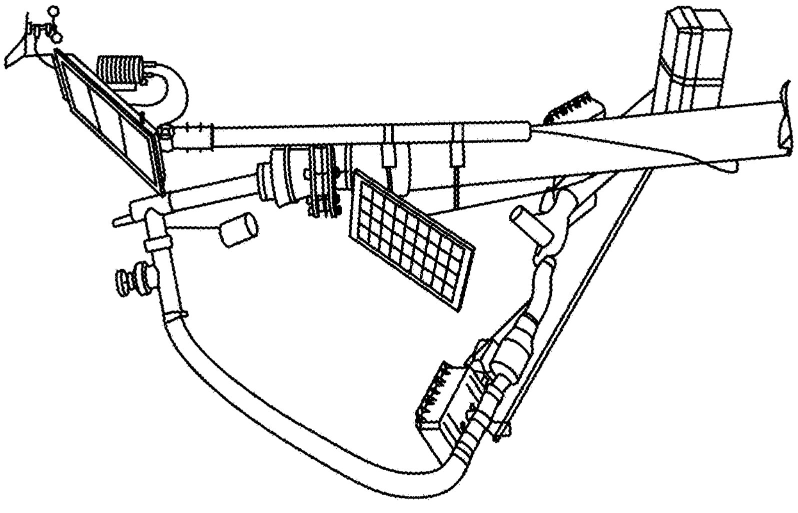
FIG. 12A illustrates an example device for obtaining measurements at gas collection points, according to some embodiments.
Figure 13B:
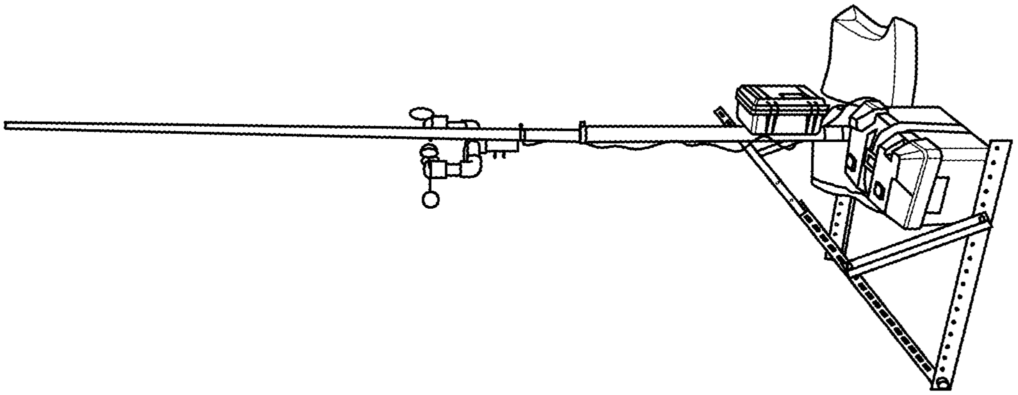
FIG. 13B illustrates another example device for obtaining measurements at locations other than gas collection points, according to some embodiments.
Figure 13A:
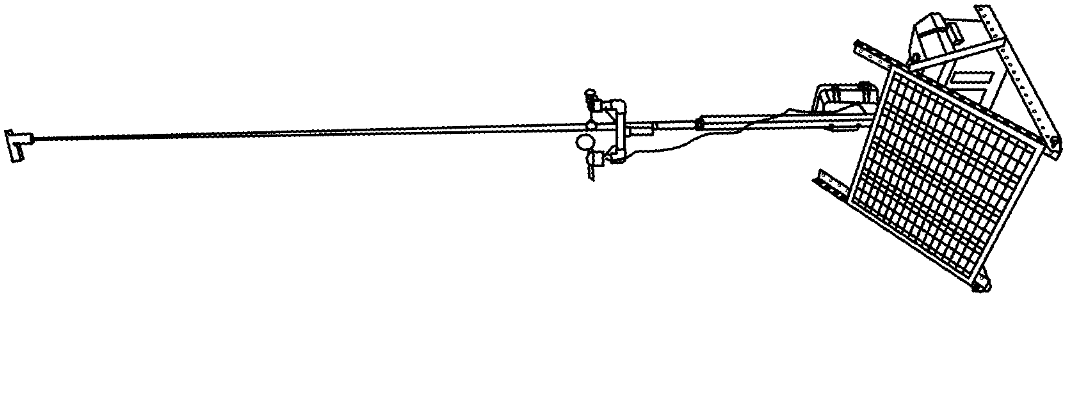
FIG. 13A illustrates an example device for obtaining measurements at locations other than gas collection points, according to some embodiments.
Figure 14:
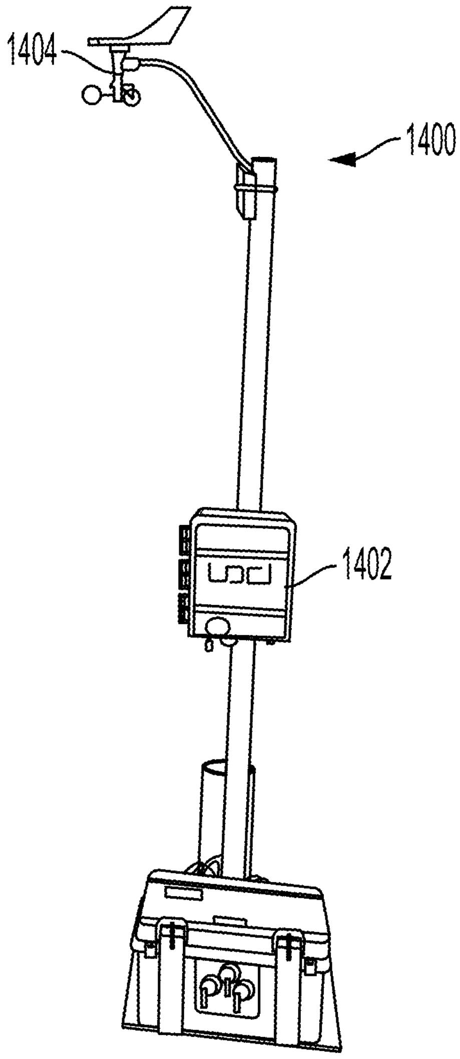
FIG. 14 illustrates an example device for obtaining measurements at a location other than a gas collection point, according to some embodiments.

FIGS. 12A-12C illustrate examples of devices for obtaining measurements at gas collection points, according to some embodiments. FIGS. 13A-13B illustrate examples of devices for obtaining measurements at locations other than gas collection points, according to some embodiments. FIG. 14 illustrates an example device for obtaining measurements at a location other than a gas collection point, according to some embodiments. As shown in FIG. 14, and example sensor unit 1400 may comprise a wind sensor configured to measure wind speed and/or direction and a sensor chamber 1402 comprising one or more additional sensors for measuring a condition and/or characteristic of the landfill (e.g., gas concentration, temperature, pressure, as described herein). As shown in FIG. 14, the sensor chamber 1402 and the wind sensor 1404 are co-located (e.g., the same latitude and longitude coordinates, although at different heights). In other embodiments, the wind sensor and sensor chamber may be near each other, but disposed at different latitude and longitude coordinates.

In some embodiments, the gas sensors may be rated for obtaining a measurement between 0-10,000 ppm. In some embodiments, the gas sensors may be rated for obtaining a measurement between 0-50,000 ppm. In some embodiments, the gas sensors may be rated for obtaining a measurement between 0-100,000 ppm.

Sensor modules 908-909 further include wind sensor 911B. Wind sensor 911B may be configured to measure wind speed and/or direction. The measure of wind speed may include one or more components such as a first component parallel to the surface of the landfill (e.g., horizontal along an x-axis), a second component parallel to the surface of the landfill and perpendicular to the first component (e.g., horizontal along a y-axis), a third component perpendicular to the surface of the landfill (e.g., vertical along a z-axis), and/or a combination of the first, second, and/or third components). Wind sensor 911B may be any suitable type of wind sensor (e.g., an anemometer comprising an ultrasonic transducer such as an ultrasonic transducer anemometer manufactured by Taidacent or Gill Instruments, a sonic anemometer such as a sonic anemometer manufactured by Davis Instruments, etc.).

Although in the illustrated embodiment of FIG. 9 sensor modules are illustrated as including a gas sensor and a wind sensor, one or more other sensors may be additionally or alternatively be included in one or both of the sensor modules 908-909. In some embodiments, sensor modules 908 and/or 909 may include one or more additional sensors for obtaining measurements of landfill characteristics to be input into the gas emissions model, as described herein.

In the illustrated embodiment, the sensor modules 908-909 further comprises respective housings inside of which the sensors 911A-911B are disposed. In some embodiments, a sample of air is input into the housing of a sensor module via an input port. For example, a sample of air may be drawn into the sensor module housing using an applied vacuum pressure. The gas sensor(s) 911A and/or wind sensor(s) 911B may analyze the sample to obtain the measurements described herein. The sample may be output back into the atmosphere via an output port. In some embodiments, the gas sensor(s) 911A and wind sensor(s) 911B may obtain measurements from the same sample. In other embodiments, at least one of the sensors (e.g., wind sensor 911B) may be disposed outside of a housing of the modules.

Measurements obtained by the sensors described herein and input into the gas emissions model may be associated with the height and/or location at which the measurements were obtained. In some embodiments, measurements may be associated (e.g., by tagging the measurement data) with the particular sensor module that obtained the measurement. In some embodiments, multiple measurements obtained at the same sensor module, time, height, and/or location may be associated with each other. For example, measures of environmental characteristics such as wind speed and direction may be associated with a measure of gas concentration obtained at approximately the same time, height and/or location. The information regarding association of measures with contextual information and/or other measures may be input to and used by the gas emissions model in determining the estimate of gas emissions.

System 900 further comprises an area sensor 910. The area sensor 910 may be configured to obtain gas concentration measurements. The gas concentration measurements obtained by area sensor 910 may be blanket measures representative of gas concentration over an area and/or a line. Accordingly, the measurements obtained by area sensor 910 may be representative of gas concentration at multiple points throughout the landfill. The area sensor 910 may analyze an amount of absorption at a particular wavelength (e.g., a characteristic wavelength for a gas being analyzed. The area sensor 910 may sum up the amount of absorption for the characteristic wavelength along a line or over an area to provide an aggregate amount of the gas along the line or in the area. In some embodiments, the controller 906 may obtain one or more measures of gas concentration obtained by the area sensor 910 and input the measure(s) into the gas emissions model to determine the estimate of gas emissions. In some embodiments, one or more measurements of gas concentration obtained by the area sensor 910 (e.g., one or more measurements of gas concentration over a line and/or one or more measurements of gas concentration over an area) and one or more point source measurements may be input into the gas emissions model to determine the estimate of gas emissions based on a combination of multiple types of measures.

Area sensor 910 may be implemented with any suitable type of sensor, including a camera or an optical-based sensor (e.g., a laser light sensor, a visible light sensor, an infrared light sensor). In some embodiments, the area sensor 910 may be placed in a centralized location within the landfill, such as an approximate center of the region of the landfill being monitored and/or a highpoint of the region of the landfill being monitored.

In some embodiments, the area sensor 910 and/or an additional sensor of the system 900 may be a sensor capable of obtaining high density/coverage measurements with high sensitivity. For example, the area sensor 910 and/or an additional sensor of the system 900 may be a drone or satellite sensor.

In some embodiments, the system 900 may further receive one or more measurements obtained with a handheld measurement device operated by a user. Such measurements may be used to supplement and/or verify measurements obtained by the sensors of the system 900. In some embodiments, the handheld measurement device may comprise a laser sensor, an optical sensor, an NDIR sensor, or a flame ionization sensor. In some embodiments, the handheld measurement devices may be used to reactively verify elevated methane concentrations measured by other sensors of the system and/or estimated by the gas emissions model described herein. In some instances, an operator may use the handheld measurement device to obtain measurements of gas concentration at locations where the operator performs routine service at a location in the landfill to proactively measure methane and determine if any elevated methane (or other gas) concentration is detected.

Figure 10:
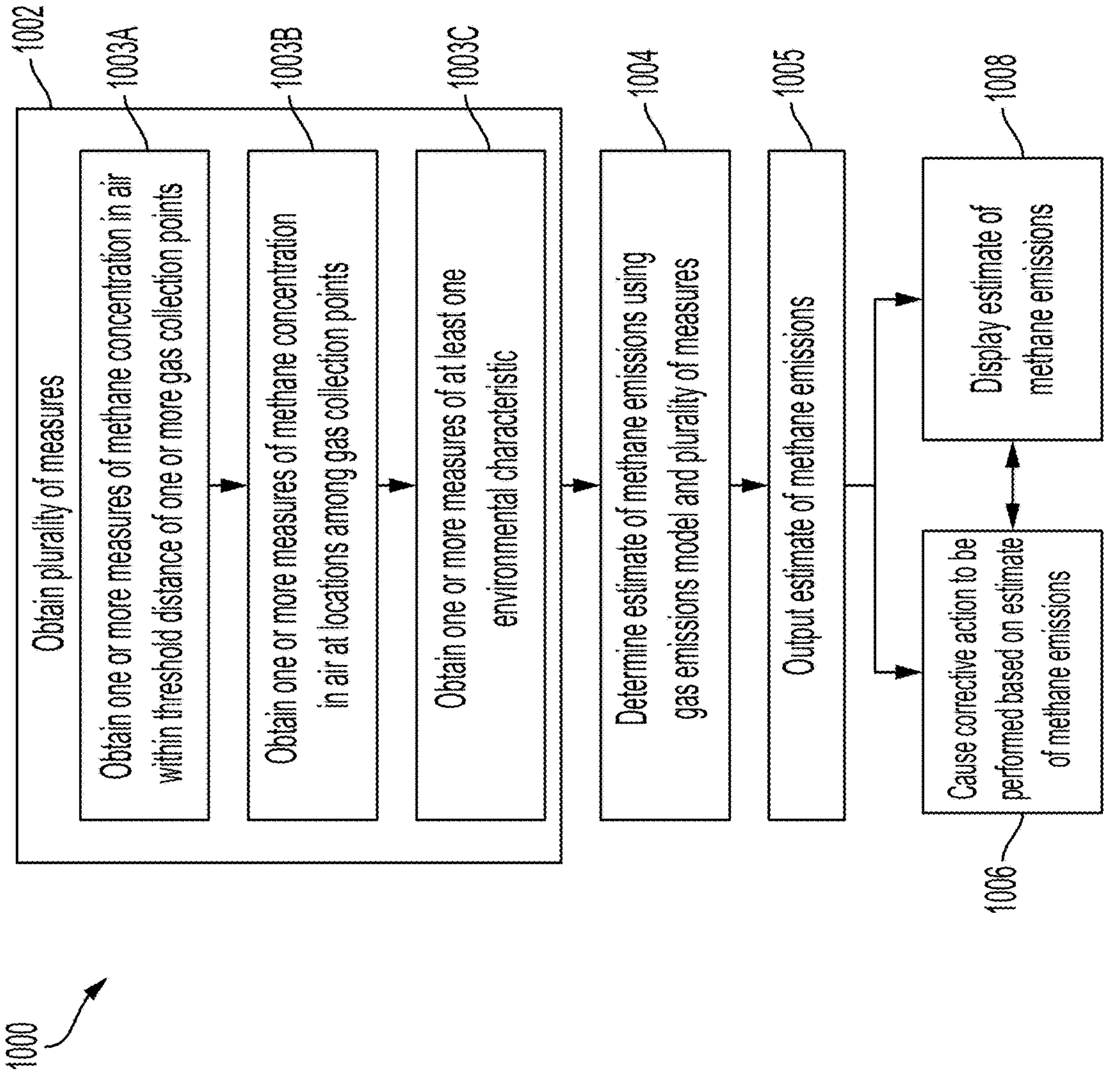
FIG. 10 is a flowchart of an example process for determining an estimate of gas emissions in a region of a landfill, according to some embodiments.

The techniques for determining an estimate of gas emissions may be embodied as a method. FIG. 10 illustrates an example method 1000 for determining an estimate of gas emissions in a region of a landfill, according to some embodiments. Method 1000 is an illustrative example of a method for determining an estimate of methane emissions in a region of a landfill using a gas emissions model and measures of methane and at least one environmental characteristic (e.g., wind speed and/or direction, a measure of atmospheric stability). It should be appreciated that the gas emissions model may be used with additional or alternative measures (e.g., gas data and/or information regarding characteristics of gas such as gas density) as inputs, as described herein. In addition, while the gas emissions model is used in the example method 1000 to estimate methane emissions from the landfill, in other embodiments the gas emissions model may be used to additionally or alternatively estimate other gas emissions.

The method 1000 begins at act 1002 where a plurality of measures are obtained. In the illustrated example, one or more measures of methane concentration and one or more measures of at least one environmental characteristic are obtained. In particular, at act 1003A, one or more measures of concentration of methane in air are obtained at one or more gas collection points. For example, act 1003A may be performed using controller 906 and gas sensor 911A of sensor module 908 of system 900. Act 1003A may be performed at multiple gas collection points throughout the region of the landfill. In some embodiments, multiple measures of concentration of methane in air may be obtained at each of the gas collection points where methane concentration in the air is measured.

At act 1003B one or more measures of concentration of methane in air are obtained at one or more locations among gas collection points. For example, act 1003B may be performed using controller 906 and gas sensor 911A of sensor module 909 of system 900. Act 1003B may be performed at multiple locations throughout the region of the landfill. In some embodiments, multiple measures of concentration of methane in air may be obtained at each of the locations among (e.g., distanced from) the gas collection points where methane concentration in the air is measured.

At act 1003C, one or more measures of at least one environmental characteristic are obtained. The at least one environmental characteristic may comprise one or more measures of a wind characteristic such as wind speed, wind direction, and/or turbulence. The environmental characteristic may additionally or alternatively be a metric related to an atmospheric boundary layer and its stability, such as a thickness of a planetary boundary layer, a surface stability class, a Turner stability class, a Richardson number, and/or a sensible heat transfer fluid layer (e.g., a measure of sensible heat transfer and/or sensible heat flux). In some embodiments, the environmental characteristic is atmospheric stability. Atmospheric stability may be defined in terms of the tendency of a parcel of air to move upward or downward after it has been displaced vertically by a small amount. A measure of atmospheric stability may be defined according to any suitable classification scheme, including, without limitation, the Pasquill scheme (which uses solar radiation and wind speed to estimate stability), a Richardson number (which calculates the ratio of vertical temperature gradient to the squared vertical gradient of the wind speed, and may include the Businger version), a vertical temperature gradient, the Islitzer and Slade scale adopted by the U.S. Nuclear Regulatory Commission (which is based on standard deviations in horizontal wind direction), and/or the Pasquill-Gifford scale (which uses the Monin-Obukov length). The environmental characteristic may be used to categorize the state of the environment in the landfill where other measures (e.g., gas concentration measures) are obtained. The environmental characteristic may be a combination of any number of the characteristics described above. The environmental characteristic may be a combination of a wind characteristic, temperature, solar radiation, and/or cloud cover, as one example.

For example, act 1003C may be performed using controller 906 and wind sensor 911B of system 900. A measure of wind speed may include one or more components such as a first component parallel to the surface of the landfill (e.g., horizontal along an x-axis), a second component parallel to the surface of the landfill and perpendicular to the first component (e.g., horizontal along a y-axis), a third component perpendicular to the surface of the landfill (e.g., vertical along a z-axis), and/or a combination of the first, second, and/or third components).

In some embodiments, the one or more measures of the at least one environmental characteristic are obtained at the gas collection points (e.g., at sensor modules 908 of system 900). In some embodiments, the one or more measures of the at least one environmental characteristic are additionally or alternatively obtained at the locations distanced from the gas collection points (e.g., at sensor modules 909 of system 900). Act 1003C may be performed at multiple locations throughout the region of the landfill. In some embodiments, multiple measures of the at least one environmental characteristic may be obtained at each of the locations where the at least one environmental characteristic is measured.

The method 1000 may then proceed to act 1004. At act 1004, an estimate of methane emissions from the region of the landfill is determined using a gas emissions model and the plurality of measures obtained at act 1002. For example, act 1004 may comprise inputting the plurality of measures into the gas emissions model and processing the plurality of measures with the gas emissions model to obtain the estimate of methane emissions in the region of the landfill. In some embodiments, one or more other measures or information may be input into the gas emissions model, such as locations where the measures were obtained, height (e.g., relative to a reference level) at which the measures where obtained, a time that the measures were obtained, location of gas extraction wells throughout the region of the landfill (e.g., including spacing of the gas extraction wells), or any other information which may assist the gas emissions model in determining the estimate of gas emissions. The gas emissions model may process the one or more other measures or information input into the gas emissions model to determine the estimate of gas emissions.

As described herein, the estimate of gas emissions determined at act 1004 may comprise an aggregate estimate of total gas emissions in the region of the landfill. In other embodiments, the estimate of gas emissions may comprise a point estimate of gas emissions at a particular location in the region of the landfill (e.g., to identify a gas leak in the landfill cover). In some embodiments, the estimate of gas emissions may comprise a value representing a measure of gas emissions emanating from the landfill at a point in time and/or over a period of time (e.g., a concentration of one or more greenhouse gasses). In some embodiments, the estimate of gas emissions may comprise a flow rate of gas emissions emanating from the landfill at a point in time and/or over a period of time. In some embodiments, the estimate of gas emissions may comprise a direction of gas emissions at a point in time and/or over a period of time.

At act 1005, the estimate of methane emissions is output from the gas emissions model. In some embodiments, outputting the estimate of methane emissions comprises generating a report including the estimate of methane emissions. In some embodiments, outputting the estimate of methane emissions may comprise displaying the estimate of methane emissions.

Accordingly, in some embodiments, the method may proceed to act 1008 where the estimate of methane emissions is displayed. For example, the estimate of methane emissions may be displayed by outputting the estimate of methane emissions to a display screen. In some embodiments the display screen may comprise a user interface. In some embodiments, displaying the estimate of methane emissions may comprise outputting a graphical display of the region of the landfill (e.g., a map of the region of the landfill). The estimate of methane emissions superimposed thereon. In some embodiments, such as where the estimate of methane emissions is associated with a particular point or area of the landfill, estimates of methane emissions may be displayed on the graphical display of the region of the landfill by superimposing the estimates at the particular locations on the map to which the estimates correspond. The inventors have recognized that displaying the estimate of methane emissions by overlaying the estimate(s) on a graphical display (e.g., a map) of the landfill may allow operators to more easily visualize where emissions are occurring.

In some embodiments, the estimate of methane emissions comprises an estimate of methane emissions over time. In some embodiments, displaying the estimate of methane emissions may include displaying multiple estimates of methane emissions at different points in time. For example, the graphical display may allow a user to select a particular point in time and a user interface may update the graphical display to display the estimate of methane emissions for the selected time. In some embodiments, the graphical display may comprise a time series of displays which represents how the estimates of methane emissions change over time. Each display of the time series may provide a graphical display of the estimate of methane emissions at a particular point in time.

In some embodiments, the method 1000 may proceed additionally or alternatively to act 1006 where a corrective action is caused to be performed based on the estimate of methane emissions determined at act 1004. The corrective action may be caused to be performed depending on the determined estimate of gas emissions obtained at act 1004. For example, in some embodiments, the corrective action may be caused to be performed in response to determining that the estimate of methane emissions is not equal to a target. in some embodiments, the corrective action may be performed in response to determining that the estimate of methane emissions is greater than and/or equal to a threshold (e.g., 10 ppm, 50 ppm, 100 ppm, 200 ppm, 250 ppm, 300 ppm, 400 ppm, 500 ppm, 600 ppm, 700 ppm, 800 ppm, 900 ppm, 1000 ppm). In some embodiments, the threshold may be a measure of emissions over a period of time for a particular area (e.g., 0.1 lb. methane per hour per square foot, 0.2 lb. methane per hour per square foot, 0.3 lb. methane per hour per square foot, 0.4 lb. methane per hour per square foot, 0.5 lb. methane per hour per square foot, 1 lb. methane per hour per square foot). In some embodiments, the threshold may comprise repeated measures over a threshold over a period of time, such as a threshold number of measures over a threshold concentration (e.g., in ppm) over a period of time. For example, the threshold may comprise ten measures of methane concentration greater than or equal to 500 ppm in five minutes or less in some embodiments. In some embodiments, the threshold may comprise two measures of methane concentration greater than or equal to 200 ppm in two minutes or less. In some embodiments, the corrective action may be performed in response to determining that the estimate of methane emissions is outside of a desired range.

The corrective action may aim to address (e.g., alleviate) the amount of gas emissions from the landfill. For example, the corrective action may be taken to reduce the amount of gas emissions from the landfill when it is determined that the amount of gas emissions is too high. The corrective action may include any of the corrective actions described herein, such as adjusting a flow rate of landfill gas extracted from one or more wells (e.g., by adjusting a position of a valve disposed in well piping), removing liquid from one or more wells (e.g., via a pump), or any other suitable action. For example, in response to determining that the amount of gas emissions is too high (e.g., the estimate of gas emissions as determined by the gas emissions model is greater than, or greater or equal to, an upper threshold), a flow rate of landfill gas being extracted from one or more wells may be adjusted (e.g., increased). In some embodiments, multiple corrective actions may be performed. In some embodiments, the corrective action performed may vary depending on the estimate of methane emissions (e.g., the amount of estimated methane emissions and/or the location of estimated methane emissions). In some embodiments, no corrective action may be performed (e.g., in response to determining that the estimated methane concentration is not greater than a threshold or outside of a range).

In some embodiments, a first corrective action may be caused to be performed (e.g., any of the corrective actions described herein). In some embodiments, a second corrective action (e.g., any of the corrective actions described herein) different than the first corrective action may be caused to be performed subsequent to the first corrective action. In some embodiments, the second corrective action may be caused to be performed in response to determining that the estimate of gas emissions is still greater than or equal to the threshold after performing the first corrective action (e.g., which may be after a requisite length of time, such as 24 hours, has passed). Accordingly, performing the second corrective action may provide for escalating the remedial measure performed in response to high gas emissions when the first corrective action does not sufficiently address the high gas emissions. In some embodiments, the second corrective action may be performed with (e.g., subsequent to or concurrently with) the first corrective action without determining a second estimate of gas emissions subsequent to performing the first corrective action. In some embodiments, the first corrective action may comprise generating an alert (e.g., an alarm, an electronic alert such as a push notification and/or a display on a user interface). In some embodiments, the second corrective action may comprise increasing a system vacuum, removing liquid from one or more gas collection wells and/or servicing a liquid removal pump, remediating surface leaks, and/or drilling additional gas collection wells.

After act 1006 and/or act 1008, the method 1000 may return to act 1002 to obtain a new plurality of measures and to repeat the method 1000. In some embodiments, method 1000 may be repeated at a scheduled frequency (e.g., monthly, weekly, daily, hourly, or more or less frequently). In some embodiments, the method 1000 may be performed in response to a trigger, such as a user command or a change in landfill gas conditions (e.g., rising barometric pressure). Alternatively, the process 1000 may end.

V. Systems and Techniques for Monitoring Extracted Gas and Emissions

As described herein, the inventors have recognized that it may be beneficial to utilize equipment already installed at a landfill to implement the emissions monitoring techniques described herein. At least some gas extraction wells in a landfill may be equipped already with equipment for monitoring gas extractions, such as control system 112, for example. According to some aspects of the technology described herein, systems for monitoring gas extractions may be modified to further monitor gas emissions.

Figure 15A:
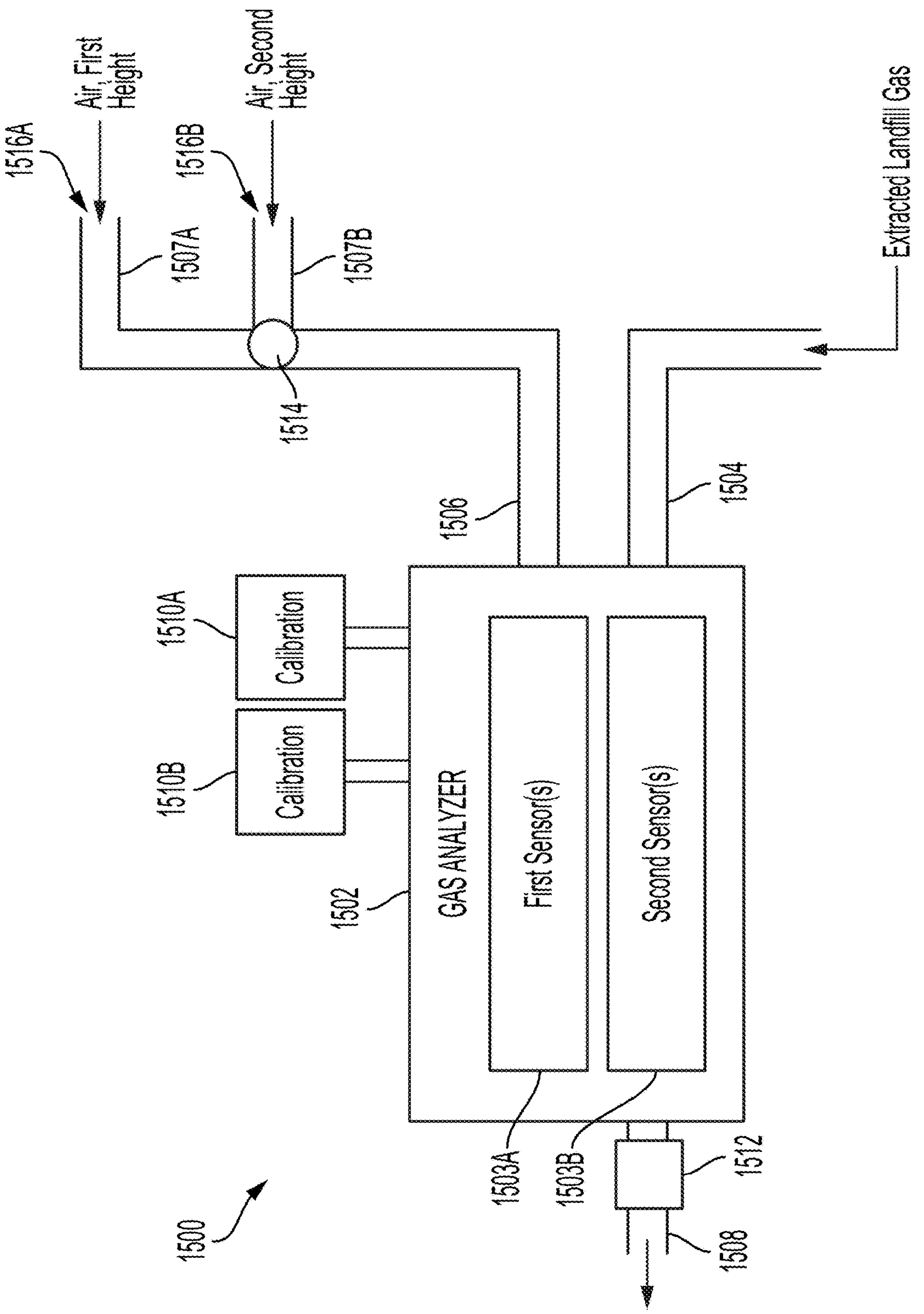
FIG. 15A illustrates an example system for measuring characteristics of extracted gas and emissions, according to some embodiments.

FIG. 15A illustrates an example system 1500 for measuring characteristics of extracted gas and emissions, according to some embodiments. System 1500 may be coupled to a well in a landfill. In some embodiments, each well in a landfill may be coupled to a system such as system 1500.

Gas extracted from the landfill via a gas extraction well may be directed through piping 1504 to a gas analyzer 1502. The gas analyzer 1502 may be configured in the same manner as gas analyzer 202. In some embodiments, gas analyzer 1502 may comprise additional components relative to gas analyzer 202, as described herein (e.g., second sensors 1503B). The extracted landfill gas may be diverted into the gas analyzer 1502 from a landfill gas flow path between the gas extraction well and a gas collection system (e.g., gas collection system 512). Extracted gas may be drawn into the gas analyzer through an input port of a chamber of the gas analyzer 1502 coupled to piping 1504.

One or more samples of air may also be drawn into the gas analyzer 1502. In particular, air from the atmosphere may be drawn into the gas analyzer through an input port in the chamber of the gas analyzer 1502 coupled to piping 1506. In the illustrated embodiment of FIG. 15A, air may be drawn in at multiple sample heights above a reference level (e.g., sea level, a surface of the landfill). For example, air at a first height is drawn into the gas analyzer via a port 1516A in portion 1507A of the piping 1506 and air at a second height is drawn into the gas analyzer via a port 1516B in a portion 1507B of the piping 1506. The system 1500 may comprise at least one valve 1514 in the piping 1506 to control which portion 1507A-B of the piping 1506 delivers air to the gas analyzer. For example, a controller, such as controller 1106, may be configured to control respective the at least one valve 1514 to selectively open and/or block portions 1507A-B from an input port to the gas analyzer 1502. Accordingly, the system 1500 may be configured to selectively expose sensors in the gas analyzer 1502 to samples of air obtained from different heights. In the illustrated embodiment, the at least one valve 1514 comprises a three-way valve configured to selectively expose ports 1516A-B to the gas analyzer 1502. In some embodiments, the at least one valve comprises a first valve disposed in the portion 1507A of the piping 1506 and a second valve disposed in the portion 1507B of the piping 1506. Although the system 1500 in the illustrated embodiment of FIG. 15A is shown with piping configured to receive samples of air from two different heights, modification of the system is possible to allow for receiving samples of air from more than two different heights, or a single height.

Although in the illustrated embodiment piping 1506 and 1504 are illustrated as separate portions of piping, in some embodiments the system 1500 comprises a single portion of piping and at least one valve disposed therein for selecting a source of gas (from ambient air or extracted landfill gas) to enter the gas analyzer 1502.

The gas analyzer 1502 comprises a chamber which may house one or more sensors. In the illustrated embodiment, the chamber comprises first sensor(s) 1503A and second sensor(s) 1503B. First sensor(s) 1503A may be configured to measure one or more characteristics of the gas extracted from the gas extraction well received through piping 1504. First sensor(s) 1503A may comprise a single sensor in some embodiments. In other embodiments, first sensor(s) 1503A may comprise multiple sensors configured to measure the same or different characteristics of the gas extracted from the landfill.

In some embodiments, first sensor(s) 1503A may comprise a gas sensor configured to measure a concentration of a constituent gas (e.g., methane, oxygen, carbon dioxide, nitrogen, hydrogen sulfide, balance gas, VOCs, a combination thereof, etc.) in the gas extracted from the landfill. First sensor(s) 1503A may be any suitable gas sensor, such as non-dispersive infrared (NDIR) sensors, MEMS sensors, mid infrared optical sensors, catalytic beads, electrochemical sensors, pellistors, photoionization detectors, metal oxide sensors (e.g., zirconium oxide sensors), thermal conductivity detectors, an optical sensor such as a spectrometer, an infrared sensor, a camera, a hyperspectral imaging device, a light detection and ranging (LiDAR) sensor, and/or any other sensing technology.

In some embodiments, first sensor(s) 1503A may be configured to return a value that represents a percentage out of 100% that the constituent gas represents in the sample of gas extracted from the landfill. In some embodiments, first sensor(s) 1503A may be capable of measuring the constituent gas concentration within a range of 0-70%. In some embodiments, first sensor(s) 1503A may be capable of measuring the constituent gas concentration within a range of 0-100%. In some embodiments, first sensor(s) 1503A may be configured to return a value that represents a number of ppm of the constituent gas in the sample of gas extracted from the landfill. In some embodiments, first sensor(s) 1503A may be capable of measuring the constituent gas concentration within a range of 0-10,000 ppm. In some embodiments, first sensor(s) 1503A may be capable of measuring the constituent gas concentration within a range of 0-50,000 ppm. In some embodiments, first sensor(s) 1503A may be capable of measuring the constituent gas concentration within a range of 0-100,000 ppm.

Second sensor(s) 1503B may be configured to measure one or more characteristics of the sample(s) of air received through piping 1506. Second sensor(s) 1503B may comprise a single sensor in some embodiments. In other embodiments, second sensor(s) 1503B may comprise multiple sensors configured to measure the same or different characteristics of the sample(s) of air.

In some embodiments, second sensor(s) 1503B may comprise a gas sensor configured to measure a concentration of a constituent gas (e.g., methane, oxygen, carbon dioxide, nitrogen, hydrogen sulfide, balance gas, VOCs, a combination thereof, etc.) in the sample(s) of air. Second sensor(s) 1503B may be any suitable gas sensor, such as non-dispersive infrared (NDIR) sensors, MEMS sensors, mid infrared optical sensors, catalytic beads, electrochemical sensors, pellistors, photoionization detectors, metal oxide sensors (e.g., zirconium oxide sensors), thermal conductivity detectors, an optical sensor such as a spectrometer, an infrared sensor, a camera, a hyperspectral imaging device, a light detection and ranging (LiDAR) sensor, and/or any other sensing technology.

In some embodiments, second sensor(s) 1503B may be configured to return a value that represents a percentage out of 100% that the constituent gas represents in the sample of air. In some embodiments, second sensor(s) 1503B may be capable of measuring the constituent gas concentration within a range of 0-70%. In some embodiments, second sensor(s) 1503B may be capable of measuring the constituent gas concentration within a range of 0-100%. In some embodiments, second sensor(s) 1503B may be configured to return a value that represents a number of ppm of the constituent gas in the sample of air. In some embodiments, second sensor(s) 1503B may be capable of measuring the constituent gas concentration within a range of 0-10,000 ppm. In some embodiments, second sensor(s) 1503B may be capable of measuring the constituent gas concentration within a range of 0-50,000 ppm. In some embodiments, second sensor(s) 1503B may be capable of measuring the constituent gas concentration within a range of 0-100,000 ppm.

First and second sensors 1503A-B may be disposed in the same chamber of the gas analyzer 1502. The inventors have recognized that locating sensors for measuring characteristics of extracted landfill gas and sensors for measuring characteristics of samples of air may be beneficial. For example, components for maintaining the sensors, such as chamber insulation and/or active heating elements for maintaining the sensor and/or chamber temperature, may be required for only one chamber as opposed to multiple chambers. In some embodiments, the first and second sensors 1503A-B may be calibrated with one or more of the same calibration gasses, including with the same sources (e.g., cannisters) of calibration gas. In some embodiments, the first and second sensors 1503A-B may be powered by one or more of the same power sources. In some embodiments, first and second sensors 1503A-B may comprise a same sensor or set of sensors that measure both the characteristics of extracted landfill gas and characteristics of air.

The system 1500 may comprise one or more sources of gas of known composition for calibrating the first and/or second sensors 1503A-B. In the illustrated embodiment, system 1500 comprises a first gas of known composition 1510A and a second gas of known composition 1510B. One or both of the first and second sensors 1503A-B may be calibrated with the two sources of gas of known composition 1510A-B. The sources of gas of known composition 1510A-B are coupled to the chamber of gas analyzer 1502. The system 1500 may comprise one or more valves which, when opened, allow the first and/or second sensors 1503A-B to be exposed to the respective ones of the sources of gas of known composition 1510A-B for calibration. The one or more valves may be configured such that one or both of first and second sensors 1503A-B are exposed independently to a respective one of the sources of gas of known composition 1510A-B. Calibration of one or both of first and second sensors 1503A-B with one or both of the sources of gas of known composition 1510A-B may be performed remotely. Calibration of one or both of first and second sensors 1503A-B with one or both of the sources of gas of known composition 1510A-B may be performed automatically (e.g., on-demand in response to an indication, such as an indication from a user, and/or may be performed at a scheduled frequency according to scheduled intervals).

First and second sensors 1503A-B may be calibrated using any of the calibration techniques described in U.S. patent Ser. No. 11/067,549 entitled "DESIGNS FOR ENHANCED RELIABILITY AND CALIBRATION OF LANDFILL GAS MEASUREMENT AND CONTROL DEVICES" filed on Apr. 4, 2017, and issued on Jul. 20, 2021, which is incorporated by reference herein in its entirety, may be used. For example, in some embodiments, multiple calibration gasses (e.g., a zero and a span) may be used. The inventors have appreciated that ambient air may, in some embodiments, not be a suitable gas for calibrating the emissions sensor given that ambient air may be the target sample to be measured by the sensor(s). Accordingly, one or both of the first and second sensors may, in some embodiments, be calibrated with one or more (e.g., two) calibration gasses other than ambient air.

In some embodiments, the sources of gas of known composition 1510A-B may have the same composition. In other embodiments, the sources of gas of known composition 1510A-B may have different compositions. In some embodiments, at least one of the sources of gas of known composition comprises a gas with 0% methane concentration (e.g., 100% $N_2$). In some embodiments, the system 1500 may be configured to perform a one-point calibration of one or both of sensors 1503A-B using the gas with 0% methane concentration. In some embodiments, at least one of the sources of gas of known composition comprises at least some methane (e.g., 5000 ppm methane). The amount of methane concentration in the source of gas of known composition may be near or equal to an upper span of methane for the sensor being calibrated. In some embodiments, one or both of the sources of gas of known composition comprises 5000 ppm methane. In some embodiments, one or both of the sources of gas of known composition comprises 5000 ppm methane and 99.5% $N_2$.

In some embodiments, one or more of the sensors of the system described herein may be calibrated using a single-point calibration technique. The single-point calibration technique may be performed using (1) a measured gas concentration determined by the one or more sensors of the system and (2) a measured gas concentration obtained by a handheld instrument operating according to a known method for measuring surface emissions of greenhouse gasses (e.g., methane), such a method for measuring surface emissions of methane established by federal and state regulations (e.g., by the Environmental Protection Agency). The measured gas concentration obtained by the handheld instrument may be obtained at the same time and for a gas sample obtained at the same location and same height above the surface of the landfill as the gas sample that is measured by the one or more sensors of the system. Based on a detected different between a gas concentration measured by the one or more sensors of the system and a gas concentration measured by the handheld instrument, a scaling factor may be applied to measurements obtained by the one or more sensors of the system. The single-point calibration of the one or more sensors may be performed on demand (e.g., in response to a user input) and/or at defined time intervals (e.g., weekly, monthly, quarterly, or any other suitable frequency). The scaling factor applied to measurements obtained by the one or more sensors of the system may be updated based on a most recent calibration measurement.

Like gas analyzer 202, gas analyzer 1502 may purge samples of gas in the chamber of the gas analyzer 1502 with ambient air from the atmosphere. In some embodiments, the system 1500 may purge the chamber of the gas analyzer 1502 with air via piping 1506. In some embodiments, the chamber comprises a separate port for receiving ambient air to purge the chamber. In some embodiments, the system 1500 may utilize an existing purge port on a system such as gas analyzer 202 to obtain a sample of air to analyze with first and/or second sensors 1503A-B. The gas analyzer 1502 may comprise an exit port 1508 for gas exiting the chamber.

As described herein, gas characteristics may be measured according to one or more different measurement techniques. The system 1500 may comprise a pump 1512 for pulling a gas sample into a chamber of the gas analyzer 1502. In some embodiments, the pump 1512 may be used for dynamically measuring a characteristic of a gas sample (e.g., while the gas sample is flowing through a tube). In the illustrated embodiment of FIG. 15A, the pump is disposed in the exit port 1508. The pump and/or one or more additional pumps may additionally or alternatively be disposed elsewhere in the system 1500, such as within the gas analyzer 1502, within piping 1504, and/or piping 1506.

Although in the illustrated embodiment piping 1504 and 1506 are shown as two separate pipings, in some embodiments, the piping may be a single piping with portions of the piping being selectively blocked and opened by valves. The piping may include one or more pretreatment mechanisms for conditioning a gas sample prior to entering the chamber of the gas analyzer 1502.

The system 1500 therefore may provide for sensing of multiple samples obtained from different sources and/or heights. In particular, the system 1500 provides for sampling gas extracted from a landfill via piping 1504 and sampling air from the atmosphere via piping 1506. Air from the atmosphere may be sampled at multiple different heights (e.g., via portions 1507A-B). A controller of the system 1500 may be configured to selectively expose sensors of the gas analyzer 1502 to the different samples. For example, a controller of system 1500 may selectively control valves disposed in piping 1504, 1506 to control which samples may enter the chamber of the gas analyzer 1502 at a particular time.

Figure 15B:
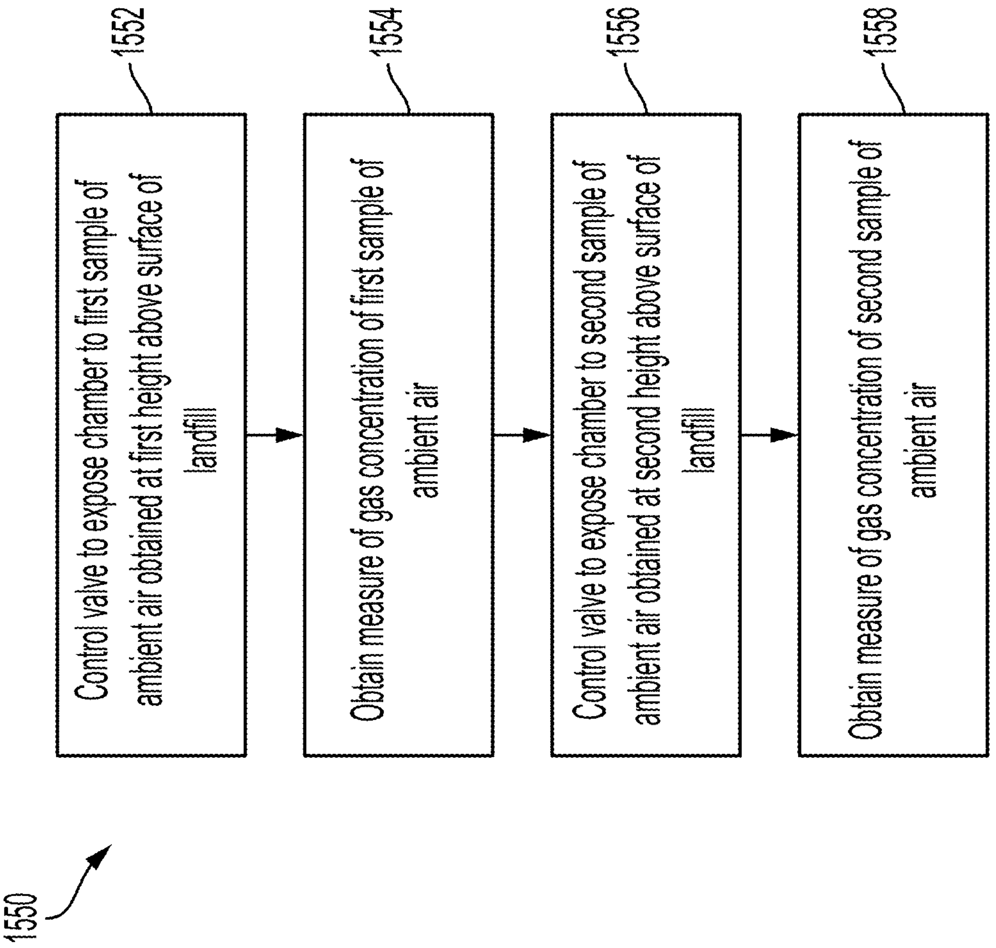
FIG. 15B illustrates an example method for measuring characteristics of extracted gas and emissions, according to some embodiments.

FIG. 15B illustrates an example method for measuring characteristics of extracted gas and emissions, according to some embodiments. The example process 1550 illustrated in FIG. 15B can be implemented by the system 1500 illustrated and described with respect to FIG. 15A.

The example process 1550 may begin at act 1552, where a valve is controlled to expose a chamber, and in particular at least one sensor disposed in the chamber, to a first sample of ambient air obtained at a first height above a surface of the landfill. For example, act 1552 may be performed by controlling valve 1514 to allow a first sample of ambient air to enter piping 1506 via port 1516A.

The process 1550 may proceed to act 1554 where a measure of gas concentration of the first sample of ambient air is obtained. For example, the measure of the gas concentration of the first sample may be obtained using first and/or second sensor(s) 1503A-B. The measure of gas concentration may be a measure of a concentration of a constituent gas (e.g., e.g., methane, oxygen, carbon dioxide, nitrogen, hydrogen sulfide, balance gas, VOCs, a combination thereof, etc.) in the first sample of ambient air.

At act 1556, a valve is controlled to expose the chamber, and in particular at least one sensor disposed in the chamber, to a second sample of ambient air obtained at a second height above the surface of the landfill. The second height may be different than the first height. For example, act 1556 may be performed by controlling valve 1514 to allow a second sample of ambient air to enter piping 1506 via port 1516B.

The process 1550 may proceed to act 1558 where a measure of gas concentration of the second sample of ambient air is obtained. For example, the measure of the gas concentration of the second sample may be obtained using first and/or second sensor(s) 1503A-B. The measure of gas concentration may be a measure of a concentration of a constituent gas (e.g., e.g., methane, oxygen, carbon dioxide, nitrogen, hydrogen sulfide, balance gas, VOCs, a combination thereof, etc.) in the second sample of ambient air.

In some embodiments, the process 1550 may include one or more acts. For example, in some embodiments, the process 1550 comprises controlling the at least one valve to allow a sample of landfill gas extracted from a landfill to enter the chamber and/or obtaining a measure of a gas concentration of the sample of landfill gas.

VI. Techniques for Determining Whether to Input Measures into Gas Emissions Model As described herein, the inventors have recognized that certain measures may be less reliable such that it may not be desirable to input these measures into the gas emissions model. For example, inputting certain measures into the gas emissions model may result in a less accurate gas emissions estimate output from the model.

Measures may be less reliable during certain conditions. For example, during conditions of increased or decreased air turbulence may render measures obtained during these conditions less reliable, at least in part because they may provide a poor representation of landfill characteristics and/or conditions (e.g., gas concentration) in other areas of the landfill. Increased and/or decreased turbulence may be a result of the particular topography of the landfill and/or the surrounding area.

In conditions of increased air turbulence, a vertical (z-axis) component of air flow may be increased. Turbulence may be considered in contrast to laminar flow which may have little to no vertical (z-axis) component of air flow. Turbulence may result in air flow which is highly variable, changing, and includes the presence of vortices and/or eddy currents.

In some embodiments, the systems described herein may be configured to obtain one or more measures of turbulence (e.g., with the one or more sensors of the system described herein). For example, using the Pasquill atmospheric stability classes known in the art, the atmosphere may be graded into one of six categories (A-F) based on characteristics such as wind speed, daytime solar radiation, nighttime cloud cover, temperature gradient, and/or fluctuations in wind direction. The systems described herein may be configured to obtain measures of such characteristics and determine a measure of turbulence at a time and location in the region of the landfill.

In some embodiments, wind speed may be considered as a proxy for turbulence. For example, increased wind speed may correspond to increased turbulence and/or decreased wind speed may correspond to decreased turbulence.

During instances of decreased or increased turbulence, measured concentrations of methane at one location in the landfill may not be an accurate representation of methane concentration at other locations in the landfill. Accordingly, some aspects of the technology described herein provide for determining whether to input one or more measures of a landfill condition and/or characteristic into the gas emissions model.

Figure 16:
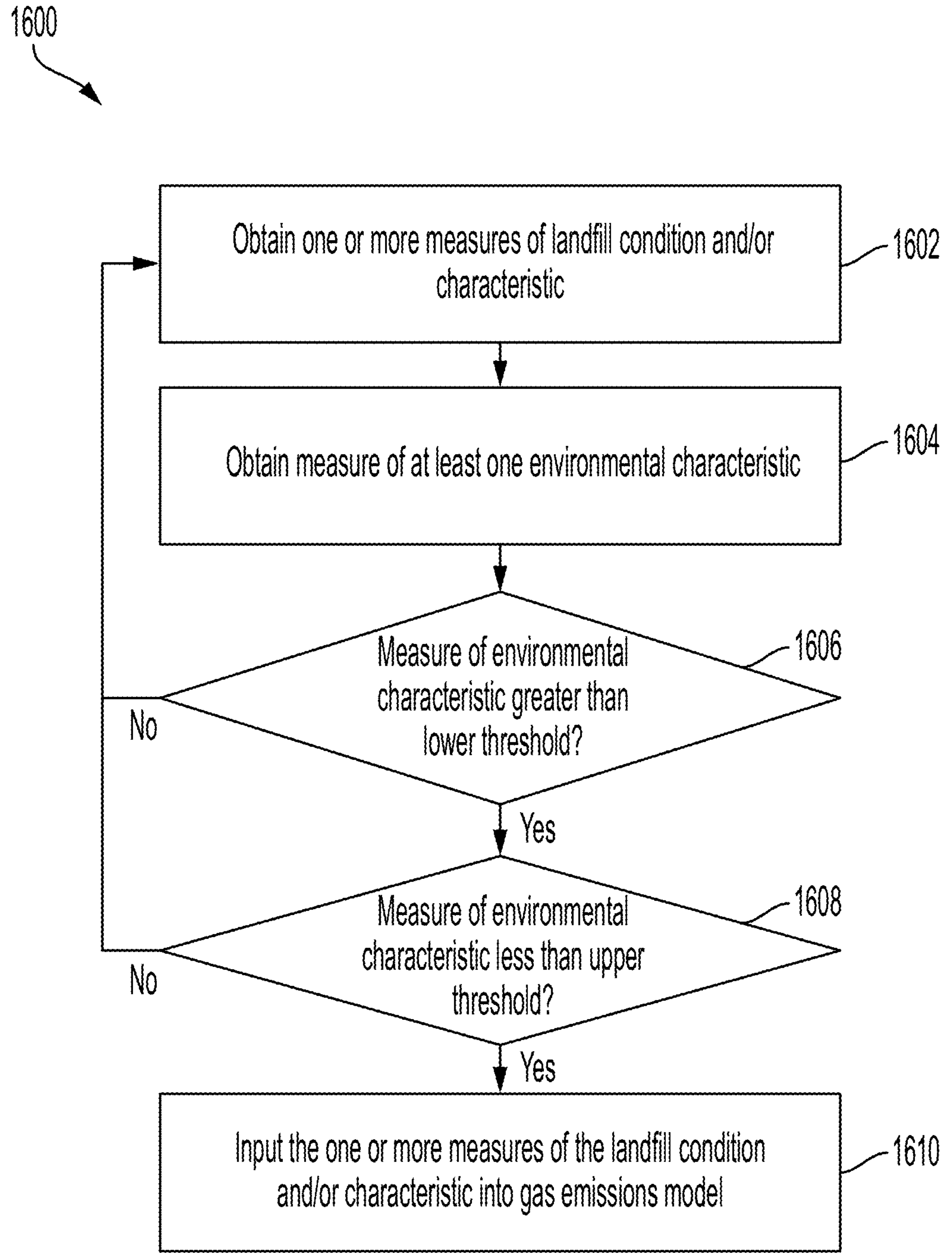
FIG. 16 is a flowchart of an example process for determining whether to input a measure into a gas emission model, according to some embodiments.

FIG. 16 is a flowchart of an example process for determining whether to input a measure into a gas emission model, according to some embodiments. As shown in FIG. 16, the process 1600 includes preconditions that must be met before a measure of a characteristic of the region of the landfill may be input into the gas emissions model described herein. For example, the process 1600 includes determining whether a measure of an environmental characteristic is within a target range prior to using a measure of a landfill characteristic and/or condition in the gas emissions model. The environmental characteristic may be any of the environmental characteristics described herein (e.g., a wind characteristic, a metric related to an atmospheric boundary layer and its stability, etc.).

Process 1600 may begin at act 1602 where one or more measures of a landfill condition and/or characteristic is obtained. The landfill condition and/or characteristic may be any one or more of the landfill conditions and characteristics described herein. In some embodiments, the landfill condition and/or characteristic comprises a concentration of a constituent gas in the atmosphere, such as methane concentration.

At act 1604, a measure of at least one environmental characteristic is obtained. In some embodiments, the environmental characteristic comprises a wind characteristic. The wind characteristic may comprise turbulence in some embodiments. In some embodiments, the wind characteristic comprises wind speed or a component thereof such as a first component parallel to the surface of the landfill (e.g., horizontal along an x-axis), a second component parallel to the surface of the landfill and perpendicular to the first component (e.g., horizontal along a y-axis), a third component perpendicular to the surface of the landfill (e.g., vertical along a z-axis), and/or a combination of the first, second, and/or third components). In some embodiments, the wind characteristic comprises wind direction and/or a wind direction gradient (e.g., rate of change in wind direction over a period of time). In some embodiments, the wind characteristic may comprise a combination of the characteristics described herein.

In some embodiments, environmental characteristic may additionally or alternatively be a metric related to an atmospheric boundary layer and its stability, such as a thickness of a planetary boundary layer, a surface stability class, a Turner stability class, a Richardson number, and/or a sensible heat transfer fluid layer (e.g., a measure of sensible heat transfer and/or sensible heat flux). In some embodiments, the environmental characteristic is atmospheric stability. Atmospheric stability may be defined in terms of the tendency of a parcel of air to move upward or downward after it has been displaced vertically by a small amount. A measure of atmospheric stability may be defined according to any suitable classification scheme, including, without limitation, the Pasquill scheme (which uses solar radiation and wind speed to estimate stability), a Richardson number (which calculates the ratio of vertical temperature gradient to the squared vertical gradient of the wind speed, and may include the Businger version), a vertical temperature gradient, the Islitzer and Slade scale adopted by the U.S. Nuclear Regulatory Commission (which is based on standard deviations in horizontal wind direction), and/or the Pasquill-Gifford scale (which uses the Monin-Obukov length). The environmental characteristic may be used to categorize the state of the environment in the landfill where other measures (e.g., gas concentration measures) are obtained. The environmental characteristic may be a combination of any number of the characteristics described above. The environmental characteristic may be a combination of a wind characteristic, temperature, solar radiation, and/or cloud cover, as one example.

The environmental characteristic may be measured directly or estimated based on measures of other related quantities. For example, a measure of wind speed and/or direction may be made directly using a sensor (e.g., using an anemometer to measure wind speed, using a wind vane to measure wind direction). In some embodiments, turbulence can be estimated using measures of one or more quantities such as wind speed, daytime solar radiation, and nighttime cloud cover, and optionally temperature gradient and/or fluctuations in wind direction.

The measure of the environmental characteristic may be obtained at the same or approximately the same location as the one or more measures obtained at act 1602. The measure of the environmental characteristic may be obtained at the same or approximately the same time as the one or more measures obtained at act 1602. Obtaining the measure of the environmental characteristic at act 1604 and/or obtaining the one or more measures at act 1602 may include obtaining time stamps for each of the respective measures. Where measures are obtained in multiple locations, the measures may be obtained at the same time. As used herein, a same location may comprise the same or approximately the same longitude and latitude coordinates. The measure of the environmental characteristic may be obtained by an environmental sensor such as a wind sensor, including any of the sensors described herein configured to measure wind characteristics such as wind speed and/or wind direction.

The inventors have recognized that certain gasses, such as methane, are lighter than air, and accordingly will rise from an emission source as opposed to spreading throughout the region of the landfill if there is little to no laminar flow (e.g., wind flow parallel to the surface of the landfill). Because methane rises as opposed to spreads in such instances, methane at one location may not be detected by a sensor that is downwind of the emission source, but rather would only be detected by a sensor disposed directly on top of the emission source. In such instances, a measure of gas concentration at one location may not be representative of gas concentration at another location in the region of the landfill since the gas rises as opposed to spreads. Therefore, there may a precondition that a measure of an environmental characteristic such as a wind characteristic obtained at the same or approximately the same time as a measure of gas concentration meet a lower bound in order for the measure of gas concentration to be considered in the gas emissions model.

Accordingly, at act 1606, it is determined whether the measure of the environmental characteristic is greater than a lower threshold. In some embodiments, where the environmental characteristic comprises wind speed, the lower threshold may be 0 mph, 1 mph, 2 mph, 3 mph, 4 mph, 5 mph, or another speed suitable for a lower wind speed threshold. In some embodiments, where the environmental characteristic comprises a Turner stability class, the lower threshold may be 4, 5, 6, 7, or another suitable threshold. In some embodiments, act 1606 may determine whether the measure of the environmental characteristic is greater than or equal to the lower threshold. In some embodiments, act 1606 may comprise determining whether the measure of the environmental characteristic is less than (and/or less than or equal to) an upper threshold If it is determined that the measure of the environmental characteristic is greater than the lower threshold, the process 1600 may proceed through the yes branch to act 1608. If it is determined that the measure of the environmental characteristic is not greater than the lower threshold, then the process may proceed through the no branch to act 1602 where the process 1600 is repeated with a new measure at act 1602. Alternatively, the process may end. In some embodiments, act 1604 may precede act 1602. In instances where the measure of the environmental characteristic is not greater than the lower threshold, the process may determine not to proceed to act 1602. Accordingly, when it is determined that the measure of the environmental characteristic is not greater than the lower threshold, the one or more measures of the landfill condition and/or characteristic are not used as input to the gas emissions model.

The inventors have further recognized that in instances where there is particularly high turbulence and/or strong wind in the region of the landfill, such as during a storm, gas concentration may become diluted. In such instances, a measure of gas concentration at one location may not be representative of gas concentration at another location in the region of the landfill. The inventors have recognized that it is desirable to only use gas concentration measures obtained when gas flow is more laminar and less turbulent in the gas emissions model. Therefore, there may a precondition that a measure of an environmental characteristic obtained at approximately the same time as a measure of gas concentration meet an upper bound in order for the measure of gas concentration to be considered in the gas emissions model.

Accordingly, at act 1608, it is determined whether the measure of the environmental characteristic is less than an upper threshold. When the environmental characteristic comprises wind speed, the upper threshold may be 5 mph, 6 mph, 7 mph, 8 mph, 9 mph, 10 mph, 11 mph, 12 mph, 13 mph, 14 mph, 15 mph, 16 mph, 17 mph, 18 mph, 19 mph, 20 mph, or another speed suitable for an upper wind speed threshold. In some embodiments, where the environmental characteristic is a Turner stability class, the upper threshold may be 4, 5, 6, 7, or another suitable class. In some embodiments, act 1608 may determine whether the measure of the environmental characteristic is less than or equal to the lower threshold.

If it is determined that the measure of the environmental characteristic is less than the upper threshold, the process 1600 may proceed through the yes branch to act 1610. If it is determined that the measure of the environmental characteristic is not less than the lower threshold, then the process may proceed through the no branch to act 1602 where the process 1600 is repeated with a new measure at act 1602. Alternatively, the process may end. In some embodiments, act 1604 may precede act 1602. In instances where the measure of the environmental characteristic is not less than the upper threshold, the process may determine not to proceed to act 1602. Accordingly, when it is determined that the measure of the environmental characteristic is not less than the upper threshold, the one or more measures of the landfill condition and/or characteristic are not used as input to the gas emissions model.

Subsequent to determining that the measure of the environmental characteristic is both greater than the lower threshold at act 1606 and less than the upper threshold at act 1608, the process proceeds to act 1610 where the one or more measures of the landfill condition and/or characteristic are input into the gas emissions model. Accordingly, process 1600 provides a technique for determining whether to input certain measures into the gas emissions model that is based on an environmental characteristic.

The techniques involving thresholds for measures of environmental characteristics may be applied to any of the processes described herein (e.g., processes 600, 610, 630, 700, 1000). For example, an initial condition may be applied prior to using a gas concentration measure in the methods described herein. The initial condition may be a determination that the measure of an environmental characteristic is greater than a lower threshold and/or less than an upper threshold before a gas concentration measure is used in the methods described herein.

The techniques involving thresholds for measures of environmental characteristics may also be applied to operation of one or more components of the system described herein. For example, the inventors have recognized that it is advantageous to power components of the system which facilitate obtaining measures of a gas characteristic when an initial condition based on the environmental characteristic is met. For example, a gas emissions sensor may only be powered when it is determined that the measure of an environmental characteristic is greater than a lower threshold and/or less than an upper threshold. If the initial condition is not met, the gas emissions sensor may not be powered as the inventors have determined that gas emissions measures obtained when the initial condition based on the environmental characteristic is not met may not provide a reliable estimate of greenhouse gas emissions. Accordingly, to reduce power consumption, components of the system which facilitate obtaining a gas emissions measurement are powered on when the initial condition based on the environmental characteristic is met (e.g., in response to a determination that the initial condition is met).

VII. Variable System Vacuum

As described herein, increasing a flow rate of at least one well of the plurality of wells according to the emissions-based landfill gas extraction techniques described herein may comprise increasing a degree to which a valve of the at least one well is open and/or increasing a vacuum applied to the plurality of wells by a system vacuum. In some embodiments, determining how to increase the flow rate of the landfill gas being extracted from the plurality of wells is based on a percentage of the landfill surface for which the emissions characteristic exceeds a threshold. For example, when the emissions characteristic exceeds a threshold across an area equal to 33% or more, 50% or more, etc., of the landfill surface area, the flow rate of the at least one well may be increased by increasing the vacuum applied to the plurality of wells. If, instead, the emissions characteristic exceeds a threshold across an area that is equal to less than 50% of the landfill surface area, the flow rate of the at least one well may be increased by adjusting a degree to which a valve of the at least one well is open.

In some embodiments, adjusting the flow rate by increasing the vacuum applied to the plurality of wells may be performed only once in a particular time period. The inventors have recognized that adjustments to the applied vacuum may result in changes in landfill gas composition and/or landfill gas emissions that vary by each gas extraction well based on a distance between the system vacuum 520 and the individual well. In addition, adjustment to the applied vacuum may take effect over a period of time and may not occur instantaneously. In some embodiments, the control system 500 may wait at least 8 hours before making an additional adjustment to the applied vacuum.

VIII. Example Computing Systems

Figure 17:
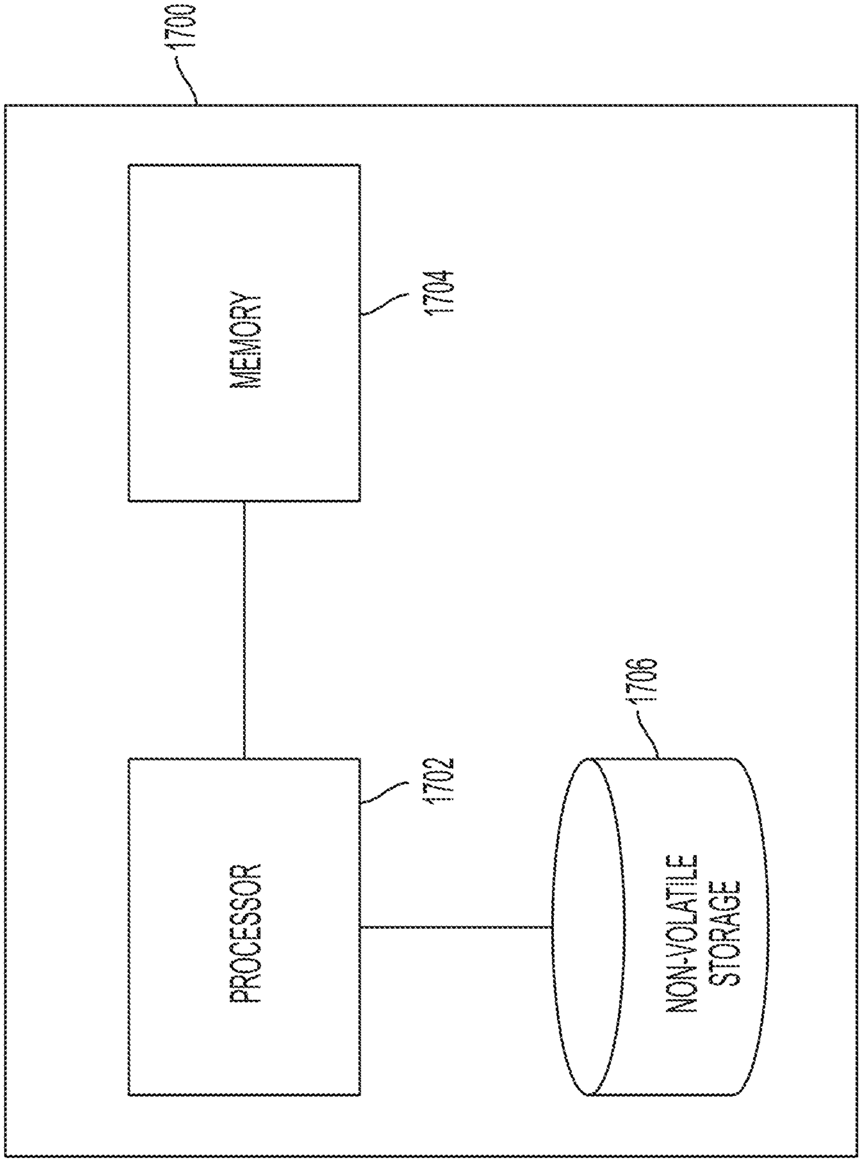
FIG. 17 is a block diagram of an exemplary computer system in which aspects of the present disclosure may be implemented, according to some embodiments.

FIG. 17 shows a block diagram of an example computer system 1700 that may be used to implement embodiments of the technology described herein. The computing device 1100 may include one or more computer hardware processors 1702 and non-transitory computer-readable storage media (e.g., memory 1704 and one or more non-volatile storage devices 1706). The processor(s) 1702 may control writing data to and reading data from (1) the memory 1704; and (2) the non-volatile storage device(s) 1706. To perform any of the functionality described herein, the processor(s) 1702 may execute one or more processor-executable instructions stored in one or more non-transitory computer-readable storage media (e.g., the memory 1704), which may serve as non-transitory computer-readable storage media storing processor-executable instructions for execution by the processor(s) 1702.

IX. Equivalents and Scope

Embodiments of the above-described techniques can be implemented in any of numerous ways. For example, the embodiments may be implemented using hardware, software or a combination thereof. When implemented in software, the software code can be executed on any suitable processor or collection of processors, whether provided in a single computer or distributed among multiple computers. In some embodiments, the functions performed by an In Situ Control Mechanism 200, controller 204, controllers 510A-C, and/or multi-well controller 516 may be implemented as software executed on one or more processors.

Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the technology described herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present technology as described above. As used herein, the term "computer-readable storage medium" encompasses only a computer-readable medium that can be considered to be a manufacture (i.e., article of manufacture)

or a machine. Alternatively or additionally, the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of technology described herein. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, examples of which have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various events/acts are described herein as occurring or being performed at a specified time. One of ordinary skill in the art would understand that such events/acts may occur or be performed at approximately the specified time.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of the technology, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages of the present technology are indicated, it should be appreciated that not every embodiment of the technology will include every described advantage. Some embodiments may not implement any features described as advantageous herein and in some instances. Accordingly, the foregoing description and drawings are by way of example only.

What is claimed is:

1. A control system for determining an estimate of gas emissions in a region of a landfill, the region comprising a plurality of gas collection points, each of the plurality of gas collection points comprising a gas extraction well, the control system comprising:

at least one controller configured to:

obtain a plurality of measures comprising:

a first set of one or more measures of concentration of methane in air, each measure of concentration of methane in the first set obtained at a respective location within a threshold distance of one of the plurality of gas collection points;

a second set of one or more measures of concentration of methane in air, each measure of concentration of methane in the second set obtained at one of a plurality of locations in the region of the landfill among the plurality of gas collection points; and one or more measures of at least one environmental characteristic obtained at one or more locations within the region of the landfill;

determine, by using a gas emissions model to process the plurality of measures, an estimate of methane emissions in the region of the landfill; and output the estimate of methane emissions.

2. The control system of claim 1, wherein outputting the estimate of methane emissions comprises displaying the estimate of methane emissions.

3. The control system of claim 2, wherein displaying the estimate of methane emissions comprises outputting a graphical display of the region of the landfill having the estimate of methane emissions superimposed thereon.

4. The control system of claim 3, wherein the estimate of methane emissions comprises an estimate of methane emissions over time.

5. The control system of claim 1, wherein outputting the estimate of methane emissions comprises generating a report including the estimate of methane emissions.

6. The control system of claim 1, wherein the at least one controller is further configured to cause a corrective action to be performed based on the determined estimate of methane emissions in the region of the landfill.

7. The control system of claim 6, wherein the at least one controller is further configured to determine whether the estimate of methane emissions is greater than a threshold concentration, wherein the at least one controller is configured to cause the corrective action to be performed when it is determined that the estimate of methane emissions is greater than the threshold concentration.

8. The control system of claim 7, wherein the threshold concentration is 100 ppm.

9. The control system of claim 7, wherein the threshold concentration is 500 ppm.

10. The control system of claim 7, wherein the threshold concentration is 0.1 lb. methane per hour per square foot.

11. The control system of claim 6, wherein the corrective action comprises adjusting a flow rate of landfill gas being extracted from the landfill at one or more of the plurality of gas collection points.

12. The control system of claim 6, wherein the corrective action comprises removing liquid from one or more of the gas extraction wells located at respective ones of the plurality of gas collection points.

13. The control system of claim 6, wherein the corrective action comprises adjusting an amount of vacuum applied to two or more of the plurality of gas collection points.

14. The control system of claim 6, wherein the corrective action comprises alerting a user to perform supplemental corrective action and wherein alerting the user to perform the supplemental corrective action comprises providing the user with a message with instructions to perform the supplemental corrective action.

15. The control system of claim 1, wherein:
- wherein the gas emissions model comprises a Gaussian Dispersion model; and
- wherein using the gas emissions model comprises using the Gaussian Dispersion model to determine the estimate of methane emissions in the region of the landfill at least in part by:
  - providing the plurality of measures to the Gaussian Dispersion model as input and processing the plurality of measures using the Gaussian Dispersion model to obtain the estimate of methane emissions as output from the Gaussian Dispersion model.

16. The control system of claim 1, wherein the at least one controller is further configured to:
- prior to processing the plurality of measures with the gas emissions model, determine whether the one or more measures of the at least one environmental characteristic is within a range; and
- when it is determined that the one or more measures of the at least one environmental characteristic are within the range, process the plurality of measures with the gas emissions model to determine the estimate of gas emissions.

17. The control system of claim 1, wherein the at least one environmental characteristic comprises one or more of wind speed, wind direction, turbulence, a thickness of a planetary boundary layer, a surface stability class, a Turner stability class, a Richardson number, and/or a sensible heat transfer fluid layer.

18. The control system of claim 1, further comprising at least one sensor for obtaining at least one of the plurality of measures.

19. A method for determining an estimate of gas emissions in a region of a landfill, the region comprising a plurality of gas collection points, each of the plurality of gas collection points comprising a gas extraction well, the method comprising:
- obtaining a plurality of measures comprising:
  - a first set of one or more measures of concentration of methane in air, each measure of concentration of methane in the first set obtained at a respective location within a threshold distance of one of the plurality of gas collection points;
  - a second set of one or more measures of concentration of methane in air, each measure of concentration of methane in the second set obtained at one of a plurality of locations in the region of the landfill among the plurality of gas collection points; and
  - one or more measures of at least one environmental characteristic obtained at one or more locations within the region of the landfill;
- determining, by using a gas emissions model to process the plurality of measures, an estimate of methane emissions in the region of the landfill; and
- outputting the estimate of methane emissions.

20. At least one non-transitory computer-readable storage medium having instructions encoded thereon, that, when executed by at least one processor, cause the at least one processor to perform a method for determining an estimate of gas emissions in a region of a landfill, the region comprising a plurality of gas collection points, each of the plurality of gas collection points comprising a gas extraction well, the method comprising:
- obtaining a plurality of measures comprising:
  - a first set of one or more measures of concentration of methane in air, each measure of concentration of methane in the first set obtained at a respective location within a threshold distance of one of the plurality of gas collection points;
  - a second set of one or more measures of concentration of methane in air, each measure of concentration of methane in the second set obtained at one of a plurality of locations in the region of the landfill among the plurality of gas collection points; and
  - one or more measures of at least one environmental characteristic obtained at one or more locations within the region of the landfill;
- determining, by using a gas emissions model to process the plurality of measures, an estimate of methane emissions in the region of the landfill; and
- outputting the estimate of methane emissions.

* * * * *